United States Patent [19]
Heidorn et al.

[11] Patent Number: 5,966,686
[45] Date of Patent: *Oct. 12, 1999

[54] METHOD AND SYSTEM FOR COMPUTING SEMANTIC LOGICAL FORMS FROM SYNTAX TREES

[75] Inventors: George Heidorn; Karen Jensen, both of Bellevue, Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/674,610

[22] Filed: Jun. 28, 1996

[51] Int. Cl.$^6$ .................................................. G06F 17/27
[52] U.S. Cl. ............................................. 704/9; 707/104
[58] Field of Search ........................... 704/9, 8, 1, 10; 395/12; 707/100, 101, 102, 104

[56] References Cited

U.S. PATENT DOCUMENTS

| | | | |
|---|---|---|---|
| 5,111,398 | 5/1992 | Nunberg et al. | 704/9 |
| 5,146,406 | 9/1992 | Jensen | 704/9 |
| 5,386,556 | 1/1995 | Hedin et al. | 707/4 |
| 5,406,480 | 4/1995 | Kanno | 704/10 |
| 5,424,947 | 6/1995 | Nagao et al. | 704/9 |

FOREIGN PATENT DOCUMENTS

| | | |
|---|---|---|
| 0413132A2 | 7/1990 | European Pat. Off. . |
| 0413132A3 | 7/1990 | European Pat. Off. . |

OTHER PUBLICATIONS

Geetha,T. V. and Subramanian, R.K., "Natural Language Representation—a Connectionist Approach", Computer and Communication, New Delhi, Aug. 28, 1991, vol. 3, pp. 294–298.

Isahara, Hitoshi and Ishizaki, Shun, "Context Analysis System for Japanese Text", 11$^{th}$ International Conference on Computational Linguistics. Proceedings of Coling '86, Bonn, West Germany, Aug. 25–29, 1986, pp. 244–246.

Winograd, Terry,"Computer Software for Working with Language", *Scientific American*, Sep. 1984, New York, U.S.A., vol. 251, No. 3, pp. 90–101.

Jensen, Karen et al., *Natural Language Processing: The PLNLP Approcach,* Kluwer Academic Publishers, Boston, 1993.

Garside, Roger et al., *The Computational Analysis of English: A Corpus–Based Approach,* Longman, pp. 97–109, 1987.

*Primary Examiner*—Joseph Thomas
*Attorney, Agent, or Firm*—Seed and Berry LLP

[57] ABSTRACT

Methods and computer systems for semantically analyzing natural language sentences. The natural language processing subsystems for morphological and syntactic analysis transform an input sentence into a syntax parse tree. Semantic analysis applies three sets of semantic rules to create a skeletal logical form graph from a syntax parse tree. Semantic analysis then applies two additional sets of semantic rules to provide semantically meaningful labels for the links of the logical form graph, to create additional logical form graph nodes for missing elements, and to unify redundant elements. The final logical form graph represents the complete semantic analysis of an input sentence.

9 Claims, 69 Drawing Sheets

The New Semantic Subsystem

*the* — 203
{
 Adj — 204
   {Lemma — 205  "the"
    Bits        Sing Plur Wa6 Det Art
                B0 Def} — 206
 Adv — 212
   {Lemma      "the"
    Bits       Wa5}

Senses — 207
   — 208
   {Bits       Sing Plur Wa6 Closed
               Det Art Def
    Lemma      "the"
    Cat        Adj
    Infl       Adj-nil
    Defin      "used when it is clearly understood who or what is meant"
    Exs        "We have a cat and a dog. The cat (= our cat) is black and the dog
               (= our dog) white."
               "the history of China (= Chinese history)"
               "The Danes that I know work very hard."
               "Take these letters to the post office (it is understood that you know
               which post office and where it is)"} — 209
 210
   {Lemma     "the"
    Cat       Adv
    Defin     "To that extent; by that much"
    Exs       "the sooner the better."} — 211

*(more sense records)* — 213
}

— 202

*person*
{
 Noun
   {Lemma     "person"
    Bits      Pers3 Sing Humn Mass
              Anim Count Conc C9
              Humn_sr
    Infl      Noun-default}
 Senses
   {Lemma     "person"
    Cat       Noun
    Defin     "A living human being."
    Exs       "chairperson"
              "spokesperson"
              "salesperson."}

*(more sense records)*
}

(PRIOR ART)  Fig. 2

*whom*
{
  Pron

{Lemma    "who"
        Bits      Pers3 Sing Plur Rel Wh
                      Humn Obj Anim}
  Senses {Lemma    "who"
        Bits      Pers3 Sing Plur Rel Wh
                      Closed Humn Obj Anim
        Cat       Pron
        Defin     "(the object form of who, used esp. in writing and careful speech)"
        Exs       "With whom?"
                      "The man with whom he talked."
                      "You saw whom?"
                      "Whom did they see?"
                      "the man (whom) they saw arriving"
                      "a man (whom) you may know of"}
        *(more sense records)*
}

*i*
{
  Noun

{Lemma    "i"
        Bits      Pers3 Sing TakesAn
        Infl      Noun-irreg}
  Pron {Lemma    "I"
        Bits      Sing Nom TakesAn Pers1
                      Humn Anim LexCap}
  Senses {Lemma    "i"
        Cat       Noun
        Infl      Noun-irreg
        Defin     "The ninth letter of the modern English alphabet."}

{Lemma    "I"
        Cat       Pron
        Defin     "Used to refer to oneself as speaker or writer."}
        *(more sense records)*
}

*met*
{
  Verb

{Lemma    "meet"
        Bits      Sing Plur Past
                      Pastpart
        Infl      Verb-meet}
  Senses {Lemma    "meet"
        Bits      Past Pastpart
        Cat       Verb}
}

*(PRIOR ART) Fig. 3*

```
was
{
   Verb
            {Lemma      "be"
             Bits       Pers3 Sing Past Pers1
             Infl       Verb-be } }
   Senses
            {Lemma      "be"
             Bits       Past Pastpart
             Cat        Verb}
            (more sense records)
}
```

```
my
{
   Adj
            {Lemma      "I"
             Bits       Wa5 Det Poss Pers1 Def
                        Gen A0
             Infl       Adj-none }
   Ij
            {Lemma      "my } }
   Senses
            {Lemma      "I"
             Bits       Wa5 Closed Det Poss
                        Pers1 Def Gen A0
             Cat        Adj
             Infl       Adj-none
             Defin      "belonging to me"
             Exs        "my car"
                        "my mother"}

{Cat        Ij
             Defin      "Used as an exclamation of surprise, pleasure, or dismay"
             Exs        "Oh, my! What a tiring day!"}
            (more sense records)
}
```

(PRIOR ART)
*Fig. 4*

*friend*
{
  Noun

|  |  |  |
|---|---|---|
|  | {Lemma | "friend" |
|  | Bits | Pers3 Sing Humn Anim |
|  |  | Count Conc Humn_sr N0 |
|  |  | Wrdy |
|  | Infl | Noun-default |
|  | Vprp | (of to) |
|  | Bitrecs |  |
|  |    {Bits | Humn Count Conc |
|  |    Vprp | (of) } |
|  |  |  |
|  |    {Bits | Humn Count Conc |
|  |    Vprp | (to) } } |

Verb

|  |  |  |
|---|---|---|
|  | {Lemma | "friend" |
|  | Bits | Inf Plur Pres T1 |
|  | Infl | Verb-default } } |

Senses

|  |  |  |
|---|---|---|
|  | {Lemma | "friend" |
|  | Bits | Humn Conc |
|  | Cat | Noun |
|  | Defin | "A person whom one knows, likes, and trusts."} |
|  |  |  |
|  | {Bits | T1 |
|  | Lemma | "friend" |
|  | Cat | Verb |
|  | Infl | Verb-default |
|  | Defin | "To befriend."} |

*(more sense records)*
}

*(PRIOR ART)*

Rule: Noun to Noun Phrase

1. PrLF_NPQuantOf: for NPs like "a number of books," makes "books" the head and "a number of" the modifier 2. PrLF_PPQuantOf: same but for PPs, like "with a number of books"

3. PrLF_notAnaphora: prepares to fill VP anaphora like "John thought he would go but Jim though not _____"

4. PrLF_soAnaphora: prepares to fill VP anaphora like "Mary wondered if it was true but Jane knew so _____"

5. PrLF_toAnaphora: prepares to fill VP anaphora like "Chris wanted to go but Pat didn't want to ____"

6. PrLF_You: supplies the understood "you" in commands like "(You) please close the door"

7. PrLF_HowAbout: supplies the understood "you" in constructions like "How about (you) closing the door"

8. PrLF_We: supplies the understood "we/us" in constructions like "Let's (us) go to the movies"

9. PrLF_I: supplies the understood "I" in, for example, "(I) thank you" or "(I) Have not yet received your letter"

10. PrLF_SubjectMods: connects "we" and "all" in, e.g., "We are all reading the book"; connects "he" and "hungry" in, e.g., "He arrived hungry"

11. PrLF_RightShift: connects "the man" and "who was my friend" in, e.g., "The man arrived who was my friend"

12. PrLF_InfclPP: prepares for correct interpretation in constructions like "a person on whom to rely"

13. PrLF_QuantifierEllipsis: having to do with the resolution of pronoun references 14. PrLF_PossessivePronHead: having to do with the resolution of pronoun references 15. PrLF_PossibleCorefsOfProns: having to do with the resolution of pronoun references 16. PrLF_VPAnaphora: identifies and fills missing arguments in all cases of VP anaphora, e.g., "Sarah likes basketball and I do too"

17. PrLF_DistCoords: distributes elements across coordinated structures, like "They washed ____ and dried the dishes"

*Fig. 27*

PrLF_You

If the Syntax Record
> has the attribute "Infinitive"
> and does not have the attribute "Subject"
>> or    has the attribute "Verb Phrase Invert" and does not have any of the attributes "Object2," "Yes/No/Question," or "Old Subordinate Clause"
>
> and does not meet the "There Subject Test"
> and does not have the "Coordinate Constructions" attribute
> and does not have any premodifiers with the node type "Auxiliary Phrase" or the attribute "Modal Verb"
> and does not have any premodifiers with the lemma "let" or the node type "Adverbial Phrase,"
> and does not have the node type "Abbreviated Clause," "Auxiliary Phrase," "Complement Clause," "Infinitive Clause," "Noun Relative," "Past Participle Clause," or "Relative Clause"
> and does not have a parent with the node type "Past Participle Clause"
> and if the head of the parent has node type "Conjunction,"
>> then the parent does not have a "Subject" attribute and does not have the node type "Auxiliary Phrase," "Complement Clause," "Infinitive," "Noun Relative," or "Relative Clause"
>
> and if there is an Auxiliary Attribute on its Head
>> then for all its Premodifiers their Lemma must not be "neither" nor "so,"
>
> and if it has a Do Modifier,
>> then it must have an Infinitive attribute and either there must not be a Modal on the First Verb Attribute, or the Lemma of its First Verb must be either "dare" or "need,"
>
> and it if has a Perfective attribute,
>> then its Lemma must be do,
>
> and if it has a Verb Phrase Invert attribute,
>> then either there must not be an L9 attribute
>> or there must not be a Comma attribute and for all of its Premodifiers their node type must not be equal to "Prepositional Phrase" and for all of its Premodifiers their node type must either not be "Adverbial Phrase" or there must be a Comma attribute or the node type of their Head must be an Interjection,
>
> and has neither "ect" nor "ect." as its Lemma,
> and if its Lemma is "suffice,"
>> then the Lemma of its Object1 cannot be "it,"
>
> and if its Lemma is "thank,"
>> then the Lemma of its Object1 cannot be "you,"

Then
> create a pronoun record for the lemma "you";
> make the Subject attribute of the syntax record be a copy of the pronoun record and set the Segtype to be "NP," set the node type to be Segtype, and set the head attribute to be the pronoun record;
> and set the premodifiers of the syntax record to be the value of the subject attribute plus all of the original premodifiers and set the Undersubject attribute flag.

*Fig. 28A*

Sentence represented by parse tree: "Please close the door."
Syntax parse tree generated by syntactic subsystem:
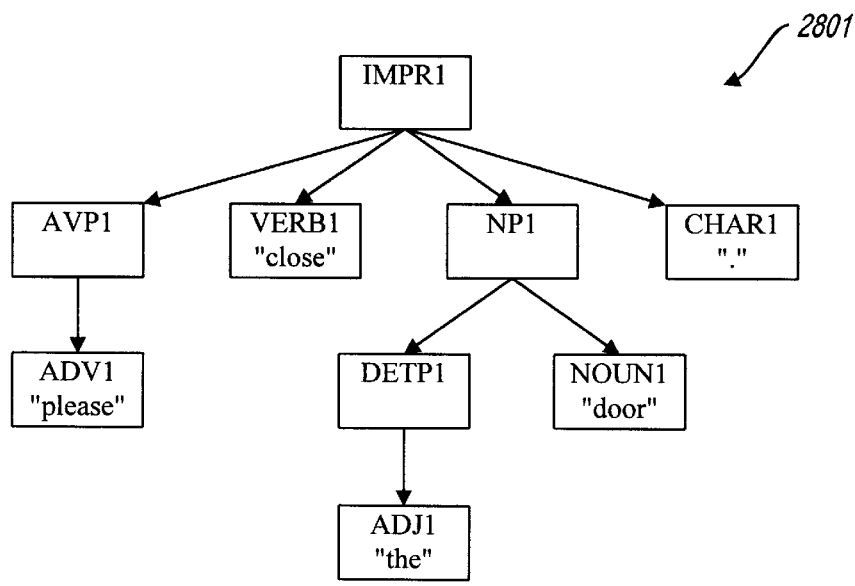
Rule PrLF_You
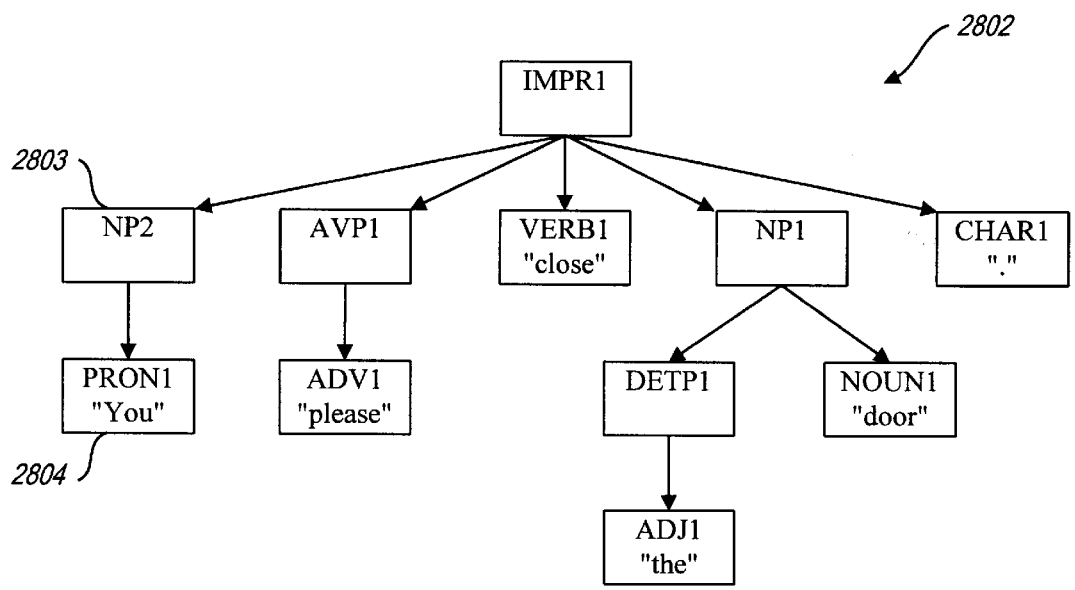
*Fig. 28B*

1. TrLF_LongDist1: locates NPs that are removed from their semantic heads and reattaches them, e.g., "Who did John say that Mary likes_(who)_?"

2. TrLF_LongDist2: performs the same kind of long-distance attachment for AJPs, INFCLs, PPs, PRPRTCLs, PTPRTCLs, SUBCLs 3. TrLF_PhrasalVerb: defines semantic objects of certain verbs when they appear hidden inside PPs: "his hat" is really the semantic object of "took off" in "He took off his hat"

4. TrLF_ControlwNP: e.g., in "Chris told Pat what to eat," "Pat" is really the subject of "eat" and "what" is its object 5. TrLF_ControlwAJP: e.g., in "I find this difficult to believe," "this" is really the object of "believe"

6. TrLF_ForInfcl: used in "for-to" constructions, e.g., in "For Mary to talk to John is easy," "Mary" is really the subject of "talk"

7. TrLF_ForInfclCoords: used in "for-to" constructions that have coordinated PPs 8. TrLF_MoveProp: given our strategy for attachment, it is sometimes necessary to move clauses from a lower to a higher level so that the proper argument structure can be assigned 9. TrLF_ControlatVP: e.g., in "Farmers grow food by using salt water," "farmers" is really the subject of "use salt water"

10. TrLF_PropsAsArgs: some clauses (propositions) can be arguments, e.g., in "Has he to answer the letter?" the object of "has" is "to answer the letter"

11. TrLF_Extraposition: e.g., in "It makes me happy to meet you," the real subject of "makes" is "to meet you" -- "it" is an empty word and must drop out 12. TrLF_FillCoords: fills in missing arguments in coordinated structures 13. TrLF_RedefineSubject: e.g., in "What is John's address?" we interpret "John's address" as the logical subject even though it is not in canonical subject position

*Fig. 29*

TrLF MoveProp

If the syntax Record
- has either a node type of Abbreviated Clause, Infinitive Clause, Present Participle Clause, Past Participle Clause
  - or if it has a Gerund attribute and an Object of a Prepositional Phrase and
    - if it has Premodifiers,
      - then the node type of all Premodifiers must be either Auxiliary Phrase, Adverbial Phrase, or Prepositional Phrase,
    - and the node type of the Head attribute of the Parent is not "verb"
    - and this syntax record is the last of the post modifiers of its parent
    - and this syntax record is not in the coordinates attribute of its parent
    - and among the ancestors of the parent there is a record whose node type of the Head is "Verb" but none of those ancestors can have a Coordinates attribute (this record will later be referred to as "same ancestor")
      - and there should be no For To Prepositional Phrase attribute on the parent,
      - and if the node type equals Infinitive Clause,
        - then there must be either no WH attribute on PP obj of the parent or the syntax record is not equal to the Nominal Relative of the parent,
      - and if the node type is either Present Participle or Past Participle,
        - then its Parent does not have an Object of a Prepositional Phrase,
      - and if the node type is a Present Participle Clause,
        - then there must be an 'ING' Complement on the same ancestor
      - and if the node type is a Past Participle Clause,
        - then there must be a V8 (code from Longman's dictionary) attribute on the same ancestor and if there is an X1 attribute on the syntax record then there must not be an Object 1
      - and there is no B3 attribute on its parent,
      - and this syntax record must follow the head of the same ancestor or there is a passive attribute on the same ancestor
      - and if the Lemma of the Parent is 'certain'
        - then the node type of the parent must not be an Adjective Phrase
      - and if the Lemma of the Preposition is either "as" or "of,"
        - then there must be a To Noun attribute of its Parent
      - and if the Lemma of the same ancestor is either "be" or "become"
        - then either the node type of the Parent must be an Adjective Phrase
          - or there must be a WH attribute on the Parent
          - or there must be both a To Noun attribute on parent and no There Subject Test on the same ancestor
          - or the Lemma of the Parent must be one of the following: "delight," "horror," "joy," "pleasure," "riot," "shame," "surprise," "terror,"

*Fig. 30A*

TrLF MoveProp

Then the syntax record whose attributes will be changed is the same ancestor syntax record (see above);

if the Parent of the syntax record has the Subject attribute and the Parent of syntax record also has the Object attribute, then delete the object attribute from the ancestor;

if the Parent of the syntax record has the Subject attribute and the Parent of the Syntax Record does not also have the Object 1 attribute, then set the Subject attribute of same ancestor to be the syntax record;

if the same ancestor has the DI (Longman code) attribute and there is an Object Complement attribute and no Indirect Object attribute and there is a To Infinitive on the syntax record and the Parent of syntax record is the Object and there is no WH attribute on the Parent of Syntax Record and either there is an Animate attribute on Parent of syntax record or there is a Case attribute on Parent of Syntax Record and the Lemma of the Parent of the syntax record is not "it"

or there is a Human attribute on the Parent of Syntax Record or there is a Proper Name attribute on Parent of syntax record, then make the Indirect Object Attribute on same ancestor equal to that of the Parent of syntax record;

if there is a To Infinitive attribute on the syntax record and no Passive attribute on same ancestor, then make the Predicate Complement attribute equal to the syntax record;

if the Parent of syntax record is in the Propositions attribute of same ancestor, then take that Propositions list and replace the Parent of the syntax record with the syntax record itself in the propositions list;

delete the Infinitive attribute of the Parent of the syntax record;

delete the Alternatives attribute on the syntax record;

reattach the syntax record to the same ancestor.

*Fig. 30B*

Sentence represented by parse tree: "I have no desire to see the movie."
Syntax parse tree prior to applying rule TvLF_MoveProp:
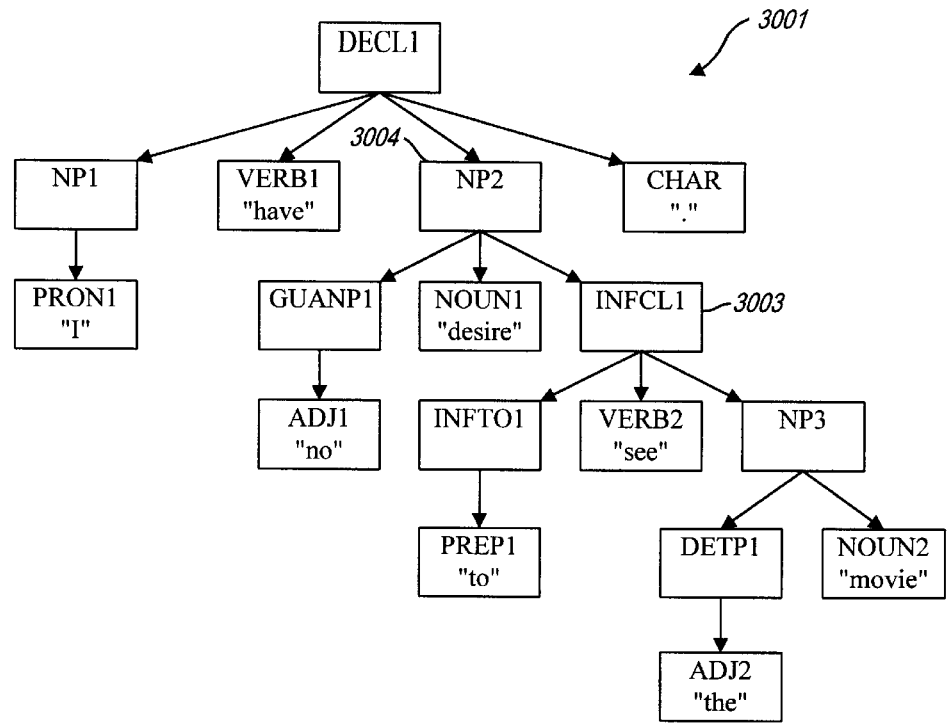
Rule TrLF_MoveProp:
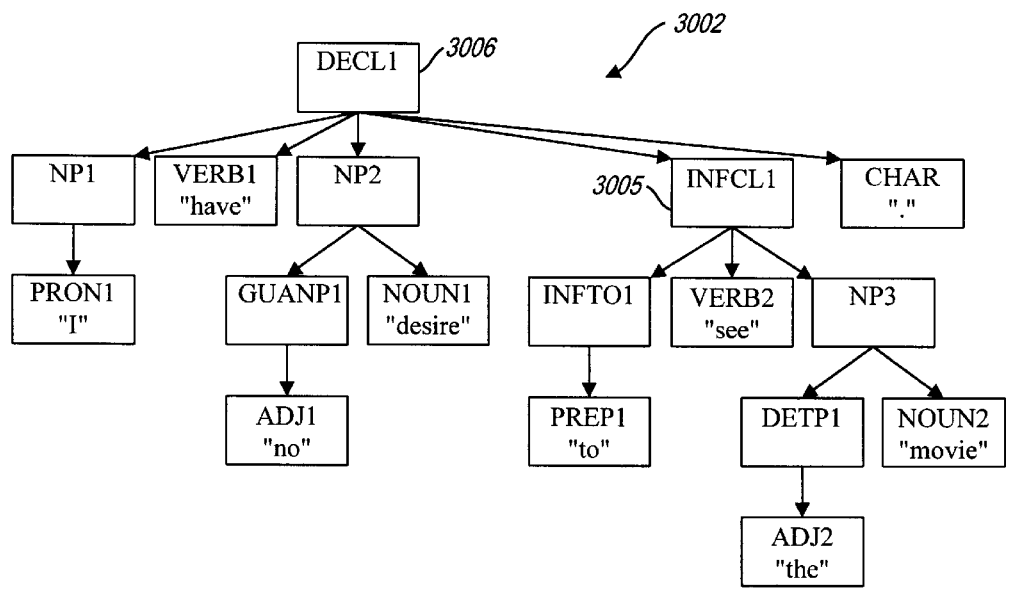
*Fig. 30C*

1. SynToSem1: creates semantic nodes and a basic semantic graph in es
2. SynToSem2: creates the top-level semantic node and graph for fitted parses
3. SynToSem3: creates semantic nodes for a special subclass of elements in fitted parses

*Fig. 33*

Rule SynToSem1

If
    the Syntax Record
        has a Head and
        there is no Subordinate Conjunction and
        there is no Correlative and
        there is no "It subject" and
        there is no "There subject" and
        there is no Ancestor of the Head for which it is true that that node
            is the Emphatic of its Parent and is not a fraction and the head node
            is not a verb and
        if the segment is the Relative Pronoun of its Parent,
            then there must not be a Nominal Relative on the Object of its Parent
            and for all of its Parents last records there must not be a VPDone attribute and
            if the lemma equals 'that'
            then there must not be an Extra Position on the Parent of the Parent and
        the node type is not "Auxiliary Phrase," "To Infinitive," "Determiner Phrase,"
            or "Tag" or
            there is a Possessive attribute or
            there is an EVR attribute or
            the Lemma equals "other" or
                there are Coordinates and for all of those coordinates there is either a
                Possessive attribute or an EVR attribute or the lemma is "other" and
        if the node type is "Adverb Phrase"
            then if the node type of Parent equals Prepositional Phrase
                then the segment must not be the first of the Premodifiers of its Parent
                and
            either the Lemma must not be equal to 'well' or there must not be any Degree
            attribute or there must not be any Weak Obligation on the Parent and
        If the node type of the Head is a Conjunction or a Preposition,
            then the segment node must not be a Conjunction of the Parent and the
            segment node must not be a Preposition of the Parent and
        If the node type is a Conjunctive Phrase
            then there must not be any Coordinates of the Parent or there must not be a
            Coordinate Conjunction attribute and
        If the node type is a Quantifier Phrase,
            then the Lemma of the Head must not be "no" and
        If the word could have been an Interjection
            then the node type must not be an Adverb Phrase or
            there must be Premodifiers or
            there must be no comma or
            the segment must be the Post Adverbial of the Parent or
            the number of Post Modifiers must be greater than one and
        If there is an Intensifier attribute
            then either the node type of Head of Parent is a "verb" or
            the node type of Parent equals "fitted" or
            there is an Adverbial Phrase attribute or
            there is a WH marker and a Nominal Relative on the Parent and
        If there is a Preposition attribute,
            then there must be an Object of the Prepositional Phrase or
            there is a Particle attribute on the Parent or
            the word also could have been an Adverb and

*Fig. 34A*

Rule SynToSem1

If the Lemma is "also," "so," or "too,"
    then there must not be a VPDone attribute on the Parent and
If the Lemma is "as" or "than"
    then there must not be a Comparative on the Parent and
If the Lemma equals "for"
    then there must not be a "for to" Preposition on the Parent and
If the Lemma equals "it"
    then if there is a Topic Clause on the Parent
        then the segment must be equal to the Subject of the Parent or
        the segment must be equal to the Object of the Parent and
If the Lemma equals "it"
    then the segment must not be in the Premodifiers of the Parent or
    If there is an Extra Position on the Predicate Adjective of the Parent
        then there must not be a Right Shift attribute on the Parent and
        if there is a WH Question attribute on the Parent
            then there is no "To Infinitive" attribute on the
            Predicate Compliment of the Parent and it's
            not the case that for any of the Post Modifiers of the
            Parent that there is a "For to" prepositional phrase
            on the first of the Premodifiers and
If the Lemma equals "let"
    then the node type is not equal to "Adverb Phrase" and
If the Lemma equals "not"
    then there must be a Coordinate Conjunction on the Parent and
If the Lemma equals "there"
    then there must not be any Skipover attribute and
    either there must not be any "Yes No" question on the parent or
        there must not be a Copulative on the Parent or
        there must be a T1 attribute on the Parent or
        the first token integer must be greater than the first token integer of
        the Subject of the Parent and
If the Lemma is "whether" or "whether or not"
    then the node type of the Nominative Relative must not be an
    Infinitive Clause" and
the Lemma must note be "etc," "etc.," "the," "hm," "mm," "uh," or "um"

Then

(If syntax node was kept, then create a corresponding semantic node.)
If the node type of the syntax node is a Noun Phrase and
    there are Bases on the syntax node and
    there is a Subject or an Object on the syntax node,
then make the Predicate equal to the Lemma of the first Basis of the syntax node
Else if there is a Proper Noun attribute on the syntax node and
    if there is a dictionary entry for that word,
then make the Predicate equal to that dictionary entry
Else set the Predicate equal to the Lemma of the syntax node
If the word could have been a Verb and has a Present Participle attribute and
    if for any of the Premodifiers of the syntax node there is a Possessive or
    if the Lemma of the Preposition of the first of the Postmodifiers of the syntax node is
    "by," "for," "of," or "to"

*Fig. 34B*

Rule SynToSem1 then make the Predicate equal to the Lemma of the Verb entry of the Part of Speech
Record
Copy the appropriate fields from syntax node to the semantic node.
Go through each of the Premodifiers of syntax record and examine each Premodifier
    For each record of Premodifiers of the syntax record
        if there is a semantic node on the record and
        if the semantic node of the record is not in the temporary modifiers attributes
        of this semantic record and there is no Skipover attribute on the record and
        the record is not equal to the Preposition of the Parent of the record and
        the record is either not in the Coordinates of syntax record or
        there is a Coordinate of the Prepositional Phrase on syntax record, or
        Coordinate Subordinate Clauses
        then add the Semantic node of the record to the Temporary Modifiers attribute
        on this semantic record
    For each record of the Postmodifiers of the syntax record
        if there is a semantic node on record and
        if the semantic node of record is not in the Temporary Modifiers attributes of
        this semantic record and there is no Skipover attribute on record and
        record is either not in the Coordinates of syntax record or there is a
        Coordinate of the Prepositional Phrase on syntax record or
        Coordinate Subordinate Clauses
        then add the Semantic node of the record to the Temporary Modifiers attribute
        on this semantic record
    If there are Coordinates of the syntax record and no Coordinates of the Prepositional
    Phrase on that syntax record and no Coordinate Subordinate Clauses
    then
        for each of the Coordinates of syntax record
            if there is a Semantic node on record,
            then add that Semantic node to Coordinates attribute on this new
            Semantic record.

*Fig. 34C*

Sentence represented by syntax parse tree: "The book was written by John."
Syntax tree prior to application of rule SynToSem1:
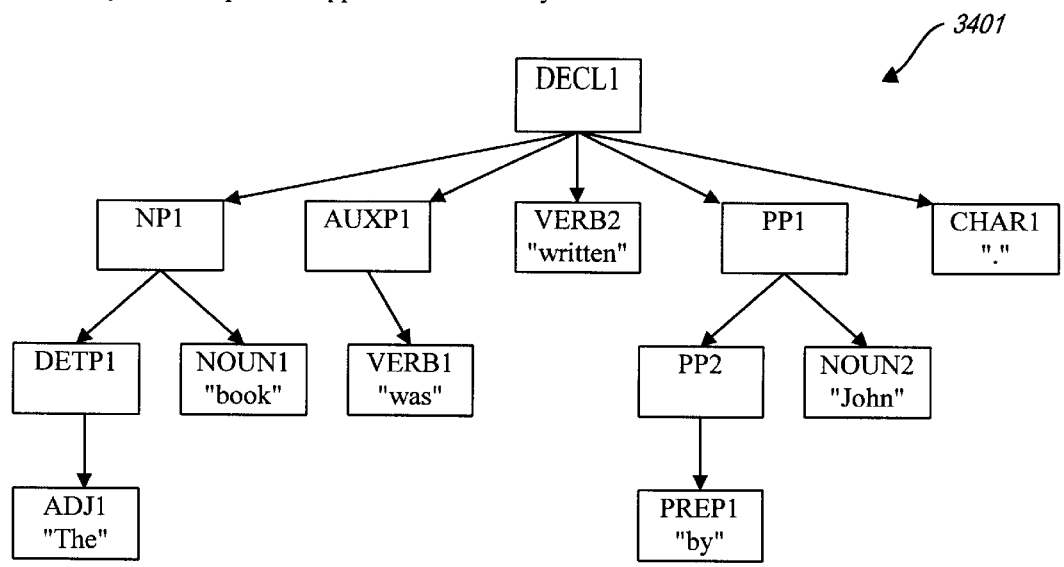
Rule SynToSem1:
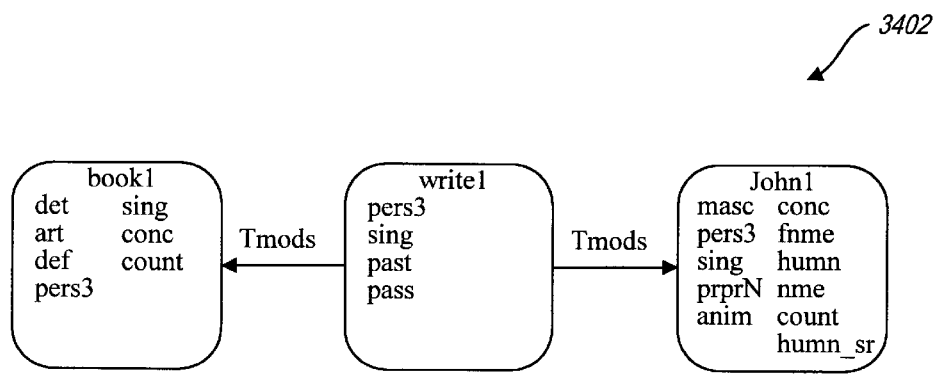
Fig. 34D 1. LF_Dsub1: creates the Dsub (deep subject) label for subjects of clauses in the active voice 2. LF_Dsub2: for passive-voice clauses, if there is a "by"-PP, identifies this PP as the Dsub of the action 3. LF_Dobj1: creates the Dobj (deep object) label for, e.g., direct objects of clauses in the active voice 4. LF_Dobj2: for passive clauses, identifies the syntactic subject as the deep object of the action 5. LF_Dobj3: for clauses like "The door opened," identifies "the door" as the logical object of the action 6. LF_Dobj4: for constructions like "the nomination of the candidate," identifies "the candidate" as the logical object of an action of nominating 7. LF_Dind1: creates the Dind (deep indirect object) label for, e.g., "Mary" in "John gave Mary the book"

8. LF_Dind2: identifies the deep indirect object ("Mary") in paraphrases like "John gave the book to Mary"

*Fig. 36*

9. LF_Dind3: chooses the right deep indirect object in trickier constructions like "The book was given her"; "She was given the book"

10. LF_Dnom: creates the Dnom (deep nominative) label for predicate nominative, e.g., "our friends" in "They are our friends"

11. LF_Dcmp1: identifies the complement ("president"; "italic") in, e.g., "elect Tom president"; "make the word italic"

12. LF_Dcmp2: identifies the complement in trickier constructions, e.g., in "He gave Tom a place to call his own," "his own" is the Dcmp of "call"

13. LF_Dadj: creates the Dadj label for predicate adjectives, e.g., "blue" in "The sky is blue"

14. LF_CausBy: creates a causative relation where appropriate, e.g., "why" in "Why did you say that?"

15. LF_LocAt: creates a locative relation where appropriate, e.g., "where" in "Where did you find that?"

16. LF_TmeAt: creates a temporal relation where appropriate, e.g., "what day" in "What day did you read that?"

17. LF_Manr: creates a manner relation where appropriate, e.g., "how" in "How did you do that?"

*Fig. 37*

18. LF_Ptcl: creates a Ptcl node to refer to particles in phrasal verb constructions 19. LF_PrpCnjs: creates temporary relations for PPs and subordinate clauses by naming these elations with the word that is the preposition or conjunction 20. LF_PrpCoord: handles cases of coordinated PPs or subordinate clauses 21. LF_Props: lists remaining clausal adjuncts for any given node 22. LF_Ops: identifies logical operators in noun phrases, e.g., "all" in "all my children"

23. LF_Nadj: lists remaining adjectives that premodify nouns

24. LF_Mods: lists remaining non-clausal modifiers for any given node

*Fig. 38*

Rule LF_Dobj2

If the Semantic Record
    doesn't already have a Deep Object,
    and has a Passive attribute,
    and has a Subject on its syntactic record (SynNode), and this Subject (which is a syntactic record) has a SemNode attribute (i.e., it has a corresponding semantic record)
    and there are no Coordinates
    and if there is a Predicate Complement attribute on its syntactic record, then the node type is not "COMPCL" (i.e., it is not a complement clause, as in: "some people were convinced <u>that he had written a book</u>"
        and if the SynNode record has either a D5, D6, ObjC, or Psych feature[2]
            then either the Object of the SynNode is not a noun phrase,
            or the SynNode has an X1[3] feature (as in: He was named Arles")
            or the Object of the SynNode has an Animate feature
            or there is a Case feature on the Object of the SynNode and its Lemma is not "it"

Then,
    give the Semantic record a Dobj attribute with, as its value, the semantic record corresponding to the Subject on the syntactic record
    and, remove what is now the value of Dobj attribute from the list of Tmods

---

[2] D5, and D6 are features from Longman's Dictionary of Contemporary English; ObjC is verb subcategory for verbs which show object control (e.g., I want Harry to wash the car) and Psych is a verb subcategory for verbs like "scare" "excite".

[3] X1 is a feature from Longman's Dictionary of Contemporary English.

*Fig. 39A*

Sentence represented by the logical form: "The book was written by John."
Logical form prior to application of rule LF_Dobj2:
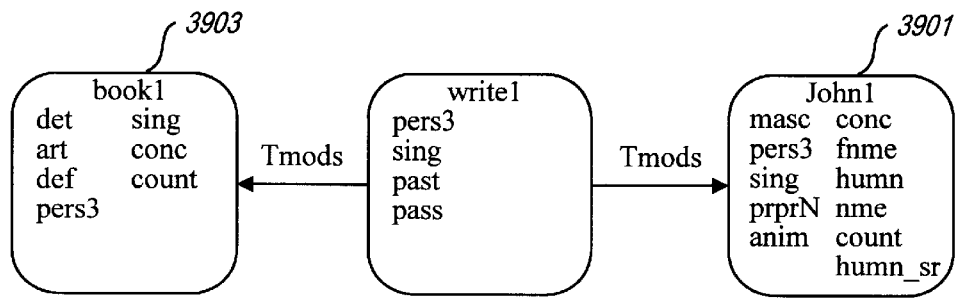
Rule LF_Dobj2:
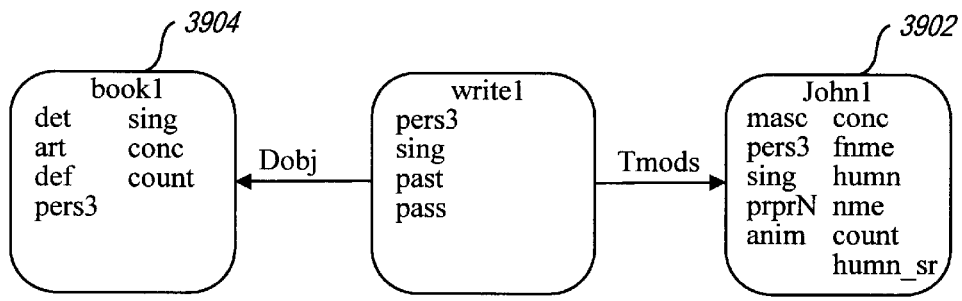
*Fig. 39B*

1. PsLF_RelPro: identifies proper referents for relative pronouns, e.g., "who" refers to "the man" in "the man who came to dinner"

2. PsLF_ReciprocalAnaphora: handles reciprocal pronouns like "each other" and "one another"

3. PsLF_ReflexiveAnaphora: handles reflexive pronouns like "myself, yourself, him/herself," etc.

4. PsLF_PronAnaphora: identifies possible NP referents for most pronouns

5. PsLF_ProtoAnaphora: handles special cases of pronouns which can agree with just about any NP 6. PsLF_NumberEllipsis: handles reference for number words, e.g., "A bird in the hand is worth two (birds) in the bush"

7. PsLF_FillInHead: adds "DUMMY" as a head word in special cases of unclear referents 8. PsLF_NumberCritique: takes note of pronouns that disagree in number with their referents 9. PsLF_FillDsub: fills in "x" as a placeholder for the deep subject in cases where that is missing, e.g., in passives like "The door was opened"

10. PsLF_UnifyProns: if two pronoun nodes refer to the same referent, this rule unifies them 11. PsLF_UnifyCopies1: unifies some nodes that should be identical 12. PsLF_UnifyCopies2: unifies other nodes that should be identical 13. PsLF_RaiseModality: deletes some verbs when they serve only an aspectual purpose, e.g., in "We used to go there," "used to" is deleted from the graph 14. PsLF_RaisePcs: makes fitted parses easier to read

*Fig. 40*

Rule PsLF_PronAnaphora

If the Semantic Record
> has a Pers3 attribute, i.e., it is not either first (e.g., I or we) or second person (e.g., you)
> and the node type of the head of its syntactic record is either "PRON" (pronoun) or the node type of the head of its syntactic record is "ADJ" (adjective) and it has a possessive attribute
> and is not Reflexive
> and none of the premodifiers of the Parent of its syntactic node has the Lemma "own"
> and the Pred of this semantic record is not "each other" or "one another"
> and does not have NonRef attribute (NonRef is an attribute set on words that cannot have a reference, such as true numbers, as in: One plus one is two.
> and does not have a Negation attribute
> and if it has an Indefinite attribute, then there must also be a Definite attribute
> and is not a Wh- word (it does not have a WH attribute)
> and is not a Relative
> and is not a Distal (Distl) or a Proxal (Proxl) determiner (e.g., "this" "that")

Then
> add a FindRef attribute to the semantic record
> for each of the records in the list of possible referents;[1]
> if
> the possible referent has a corresponding semantic record
> and the possible referent is not the same as this record (i.e., the antecedent of a noun phrase can
>> not be the noun phrase itself)
> and if the head of both the possible referent and of this record's SynNode are pronouns (i.e., have
>> the node type "PRON" as their head), then the possible referent must precede this record
>> (no forward reference to a pronoun; an example of forwards (cataphoric) reference is:
>> with his hat on, the teacher left the room, where "his" refers forward to "teacher"
> and if the possible referent is the ancestor of the syntactic record of this record, then that ancestor
>> must have a Prp attribute (i.e., must have a postmodifying Prepositional phrase), and its
>> preposition must be either "in", "to", "for", or "by"
> and there is no Time or Space feature on the possible referent
> and this record and the possible referent agree in number
> and this record and the possible referent agree in gender
> and if the Lemma of the SynNode is "they" and the possible referent can be a Mass noun (i.e., the
>> possible referent has a Mass feature),
>>> then the possible referent must also be a Count noun (i.e., it must also have a
>>> Count feature).
> and if the Lemma of the SynNode is "they" and the possible referent has a Sing feature (can be
>> Singular), and the possible referent does not have a Plur feature (i.e., it cannot be
>> Plural),
>>> then the possible referent is either a Count noun, or the possible referent is a
>>> Coordinated noun phrase, or it has a Universal feature, or the possible
>>> referent is indefinite and has no possessive, or the possible referent has
>>> a Proxal feature,

---

[1] this list is created in a PrLf rule, so, after syntactic processing but before most logical form processing (it is a list of syntactic records). This is a list of all the words in the sentence which can be referred to, i.e., most of the nouns and pronouns in the sentence

*Fig. 41A*

Rule PsLF_PronAnaphora and if there is an ancestor of the possible referent that has a Coords attribute
(i.e., has coordinate constituents) (but before there is an ancestor with
a Subject attribute) then this ancestor is the same as the ancestor of
this record that has a Coords attribute (but before there is an ancestor
with a Subject attribute)
then if this record is a possessive (e.g., "his" in "John saw his son")
add the possible referent to the list of possible referents (the value of the Refs attribute)
if:
the possible referent is a genitive
and node type of the head of the possible referent is not a Noun
and the possible referent precedes this record (i.e., the semantic record being
processed in this rule
or if:
the possible referent is not the first of this record's Parents
and the first of the Parents of the possible referent is not the first of this
record's Parents
and if the possible referent follows this record and if any of the possible
referent's ancestors have Coordinate constituents, then there should be
no ancestor of this record for which the Parent has Coordinate
constituents and for which the Parent is the same as the ancestor of the
possible referent that has Coordinate constituents (but before there is
ancestor whose node type is "NP")
or else if the node type of Parent of this record's syntactic record is "TAG" (i.e., if the pronoun is
in a tag question)
add the possible referent to the list of possible referents (the value of the Refs attribute)
if:
the possible referent is the Subject of the Parent of the Parent of this record
(e.g., "they" refers to "someone" in: Someone painted in here, didn't
they?)
or else:
if
this record is a prepositional phrase
and this record precedes the Subject of this record's Parent
and the possible referent is the Subject of this record's Parent
then add the possible referent to the list of possible referents (the value of the Refs
attribute);
else if
this record is not possessive
and this record precedes the possible referent
and node type of the head of the possible referent is "NOUN" and is not a
Dummy noun (i.e., one that cannot be a possible referent)
and if this record is not one of possible referent's ancestors
and if it is not the case that there is an ancestor of this record that has
Coordinate constituents and the Lemma of that ancestor is "but" and
that ancestor is also an ancestor of this record which has Coordinate
constituents
then add the possible referent to the list of possible referents (the value of the Refs
attribute)

*Fig. 41B*

Rule PsLF_PronAnaphora else if
- the possible referent is a Prepositional Phrase
- and the Parent of the possible referent is not the Parent of this record's syntactic record
- and if the Parent of the possible referent is an Adjective Phrase, then the Parent of the possible referent precedes this record then add the possible referent to the list of possible referents (the value of the Refs attribute)

else if
- there is no ancestor of the possible referent for which the Lemma is "be" (but before there is an ancestor with a Subject) that is the same as the ancestor of this record for which the Lemma is "be" (but before there is an ancestor with a Subject)
- and none of the Parents on the semantic record of the possible referent is the same as the possible referent
- and if this record precedes the possible referent, then the Head of the possible referent is not either a Noun or an Adjective then add the possible referent to the list of possible referents (the value of the Refs attribute)

if the possible referent was added to the list of possible referents (the value of the Refs attribute)
- then add of RefOf attribute to the possible referent and add this record to that list (provide cross pointers: this record gets a Ref attribute pointing to possible referents, and the possible referents each get a RefOf attribute, pointing back to this record.

*Fig. 41C*

Sentence represented by logical form: "Mary likes the man who came to dinner, and Joan likes him too."
Logical form prior to application of rule PsLF_PronAnaphora:
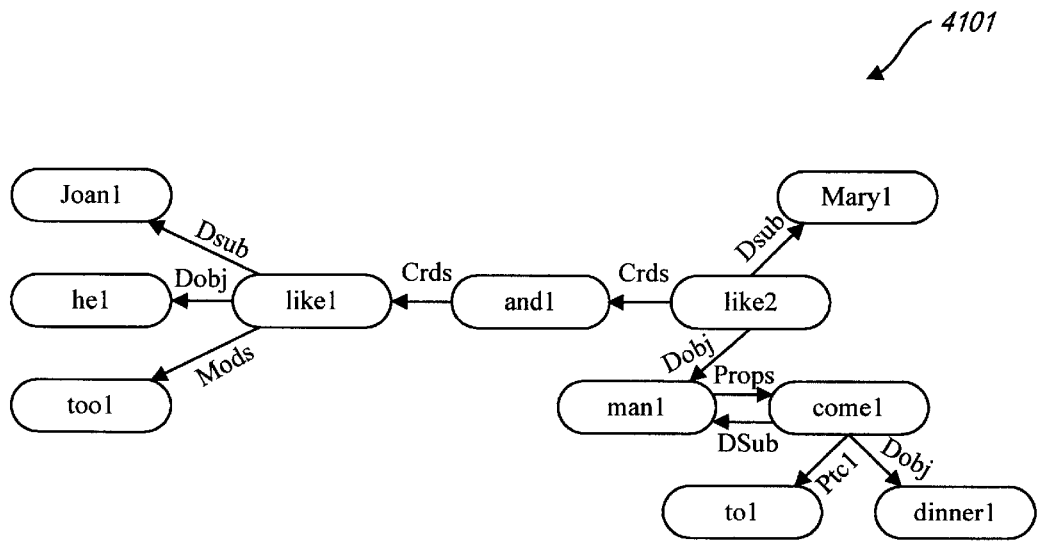
Rule PsLF_PronAnaphora:
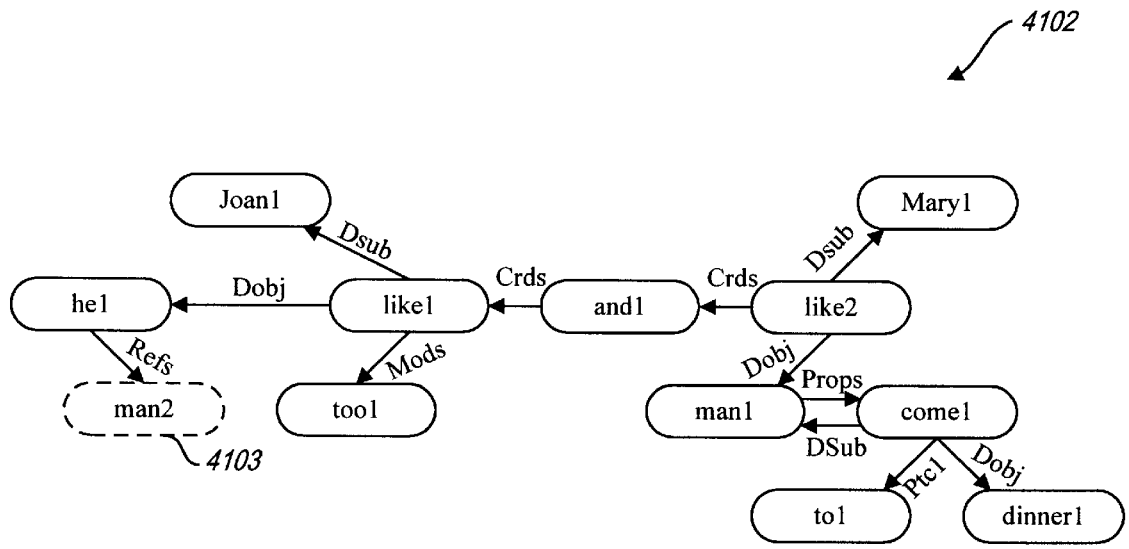
Fig. 41D

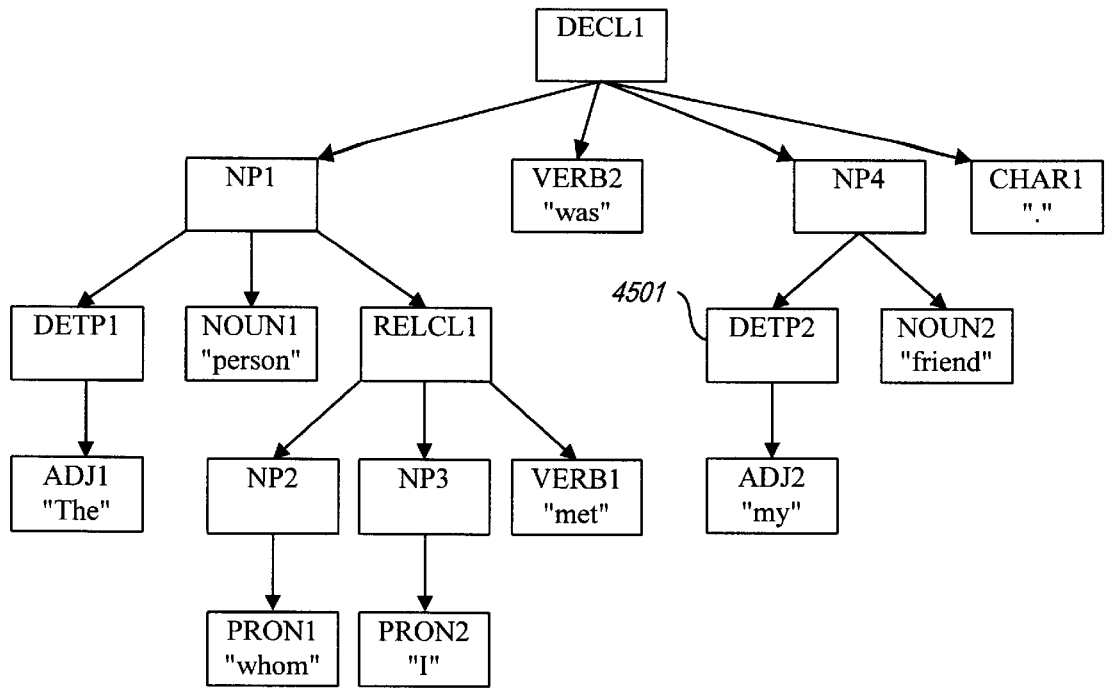
Rule: SynToSem1 produces logical form graph node from DETP2 ("my")
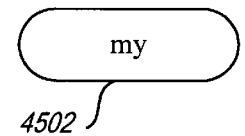
*Fig. 45*

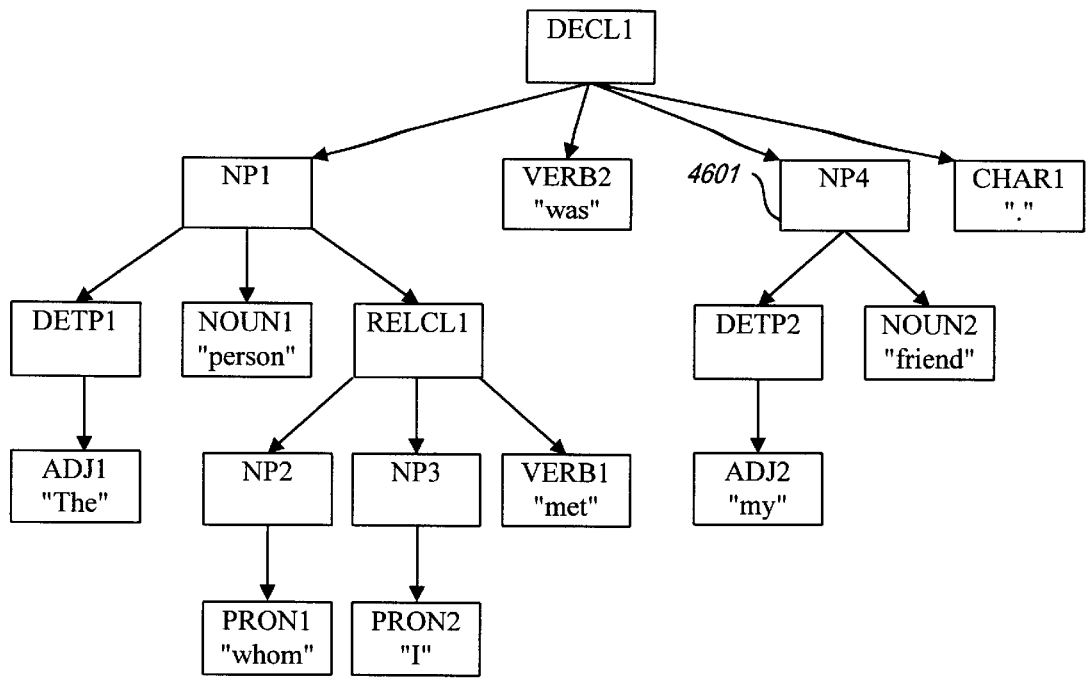
Rule: SynToSem1 produces logical form graph node "friend" from NP4 ("my friend")
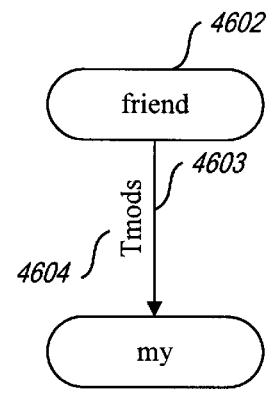
Fig. 46

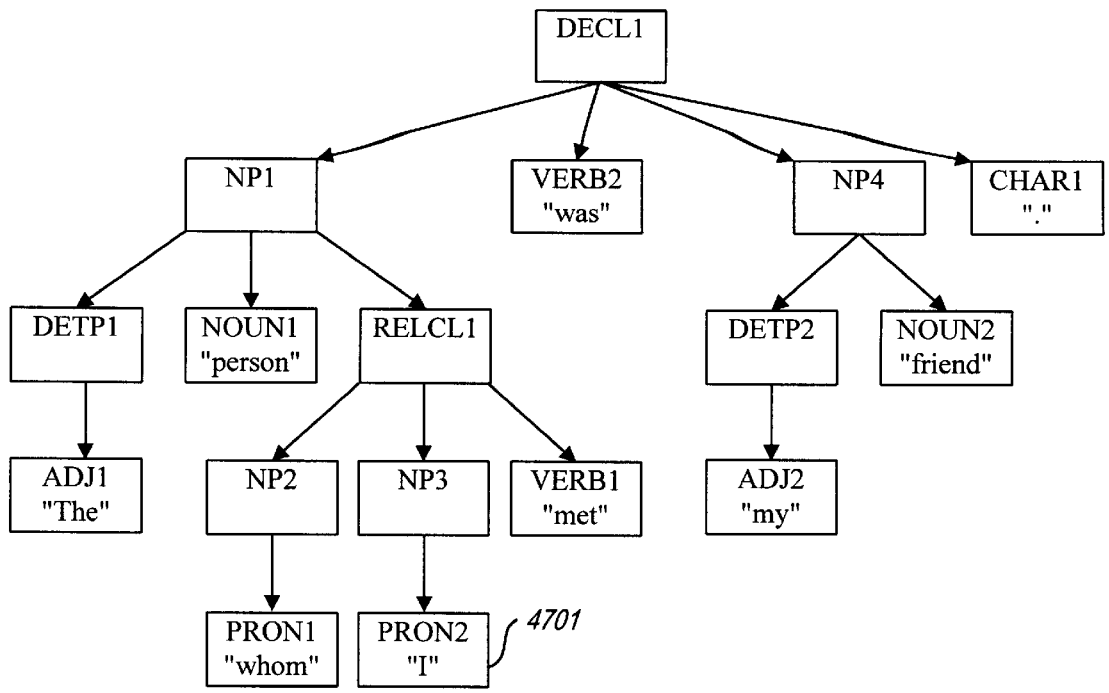
Rule: SynToSem1 produces logical form graph node "I" from NP3 ("I")
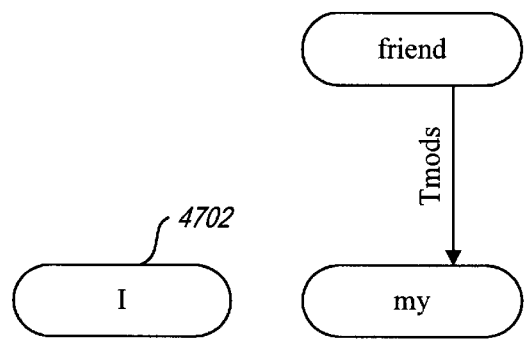
Fig. 47

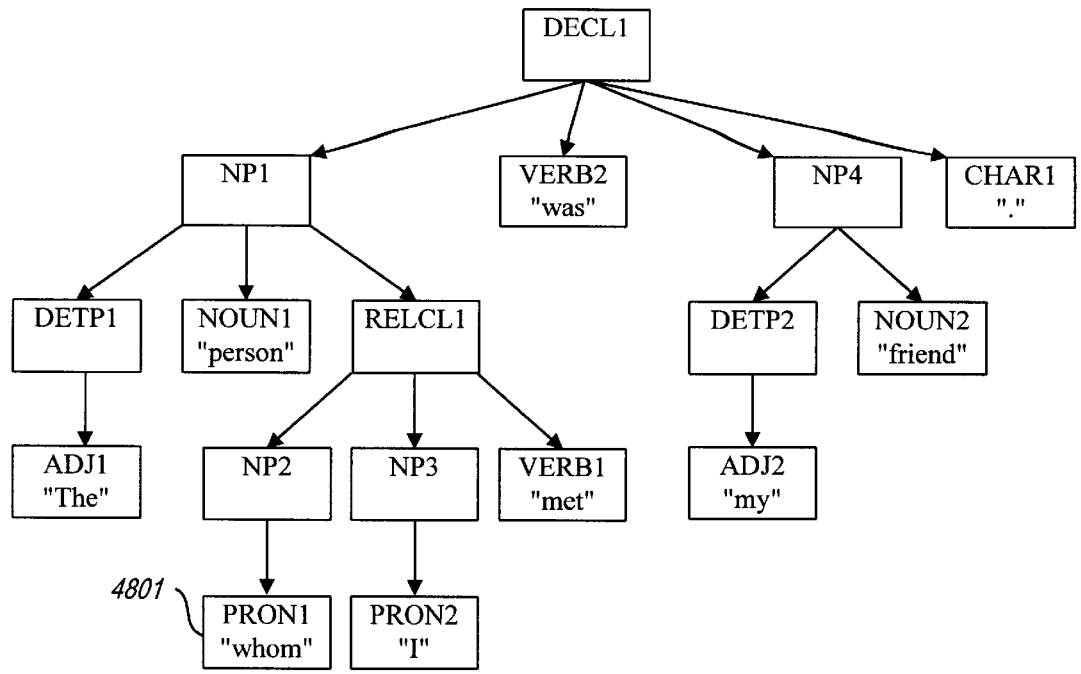
Rule: SynToSem1 produces logical form graph node "whom" from NP2 ("whom")
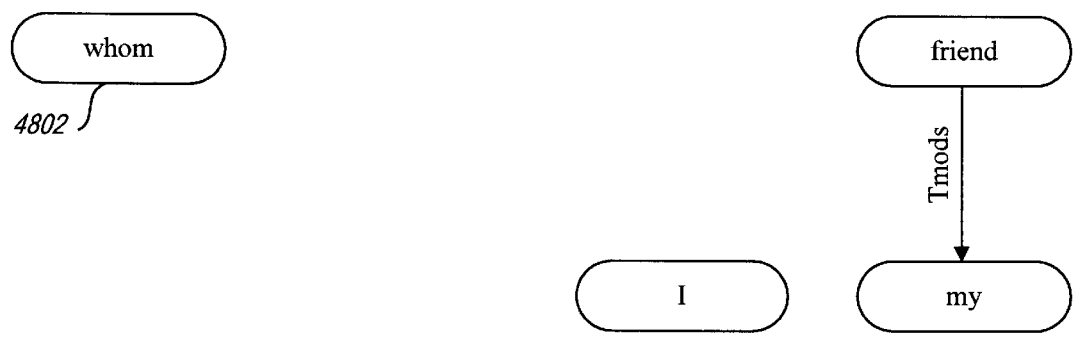
Fig. 48

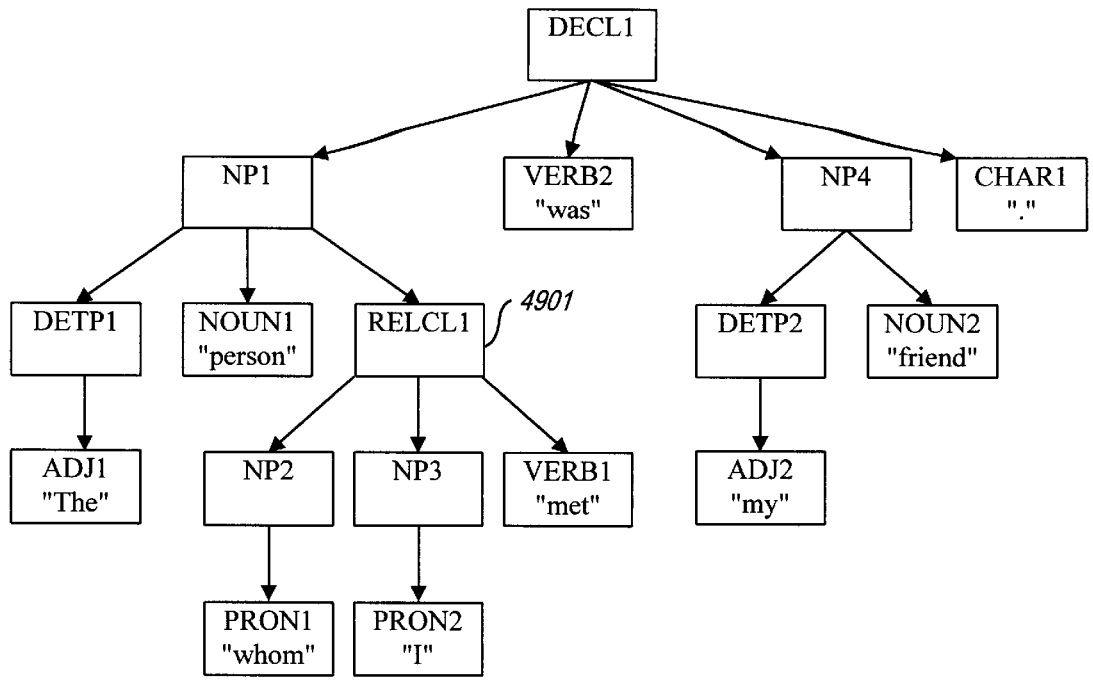
Rule: SynToSem1 produces logical form graph node "meet" from RELCL1 ("whom I met")
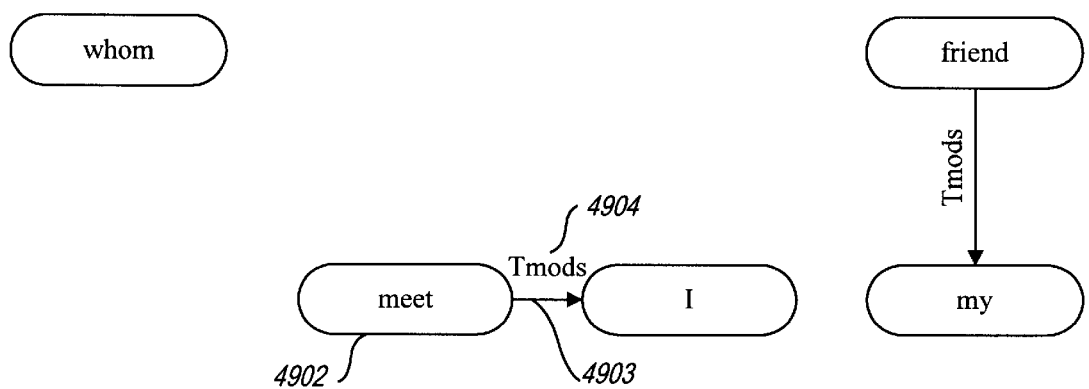
Fig. 49

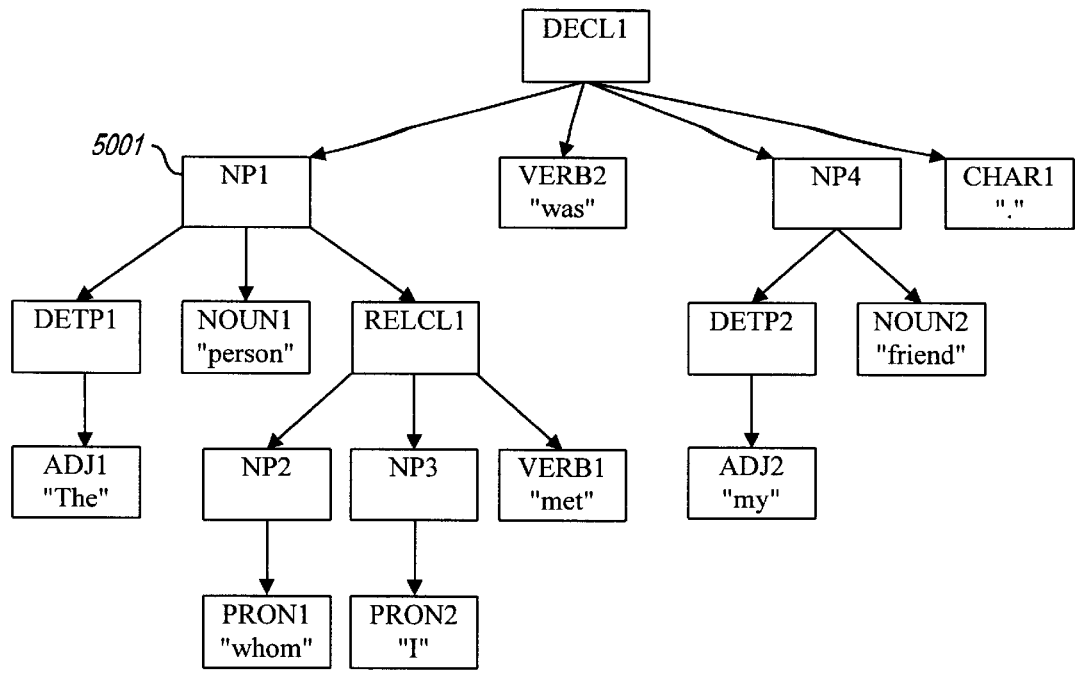
Rule: SynToSem1 produces logical form graph node "person" from NP1 ("The ... met")
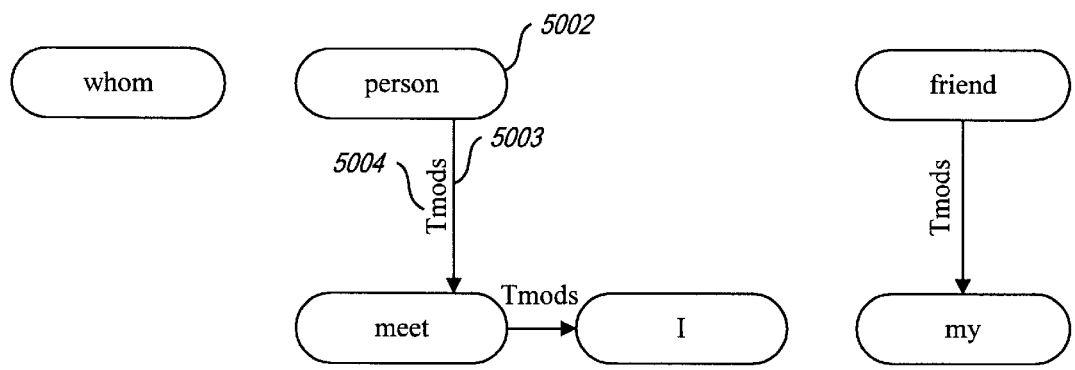
Fig. 50

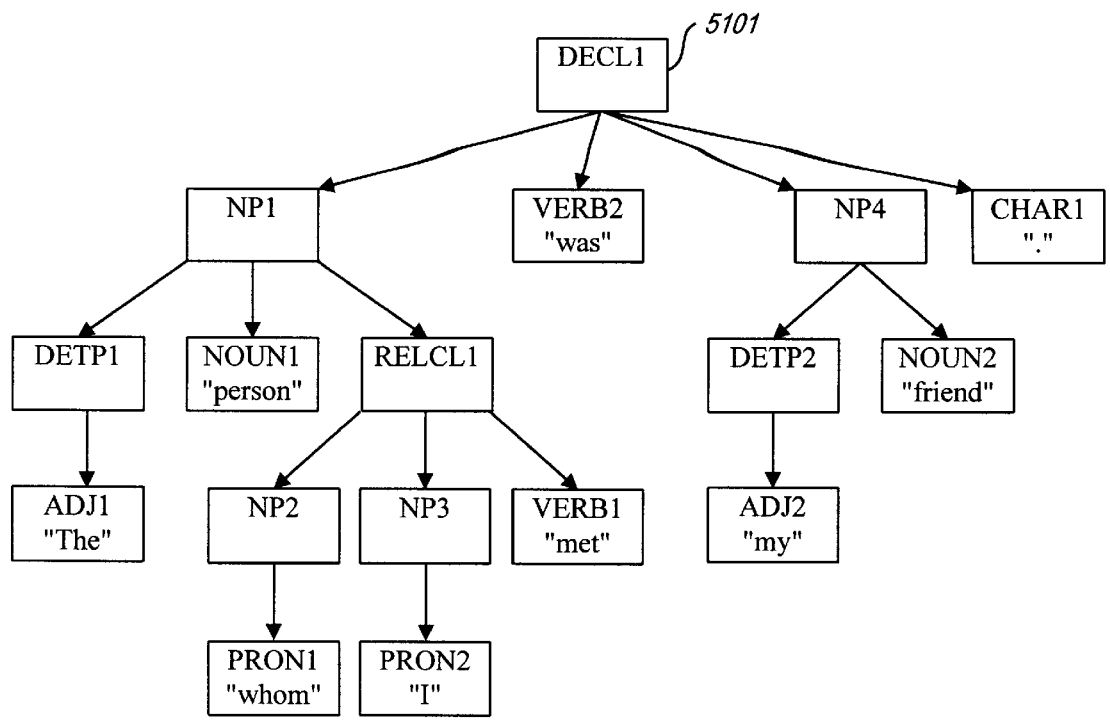
Rule: SynToSem1 produces logical form graph node "be" from DECL1
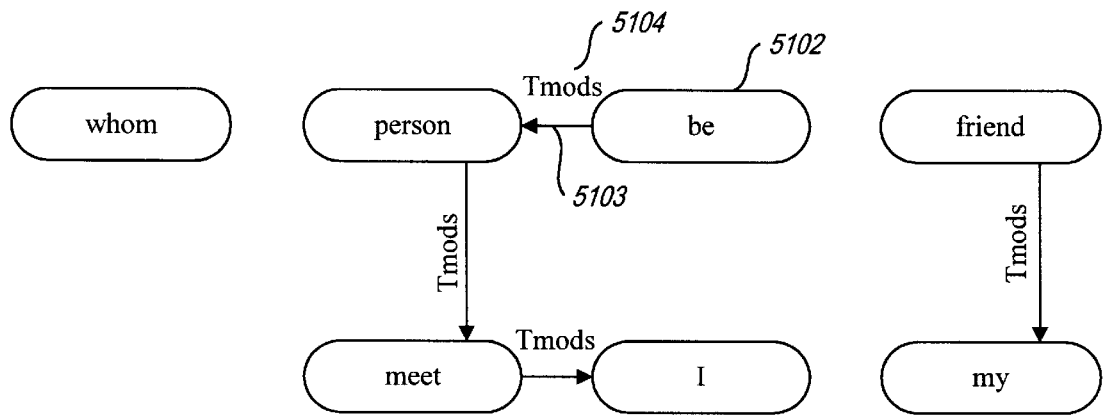
Fig. 51

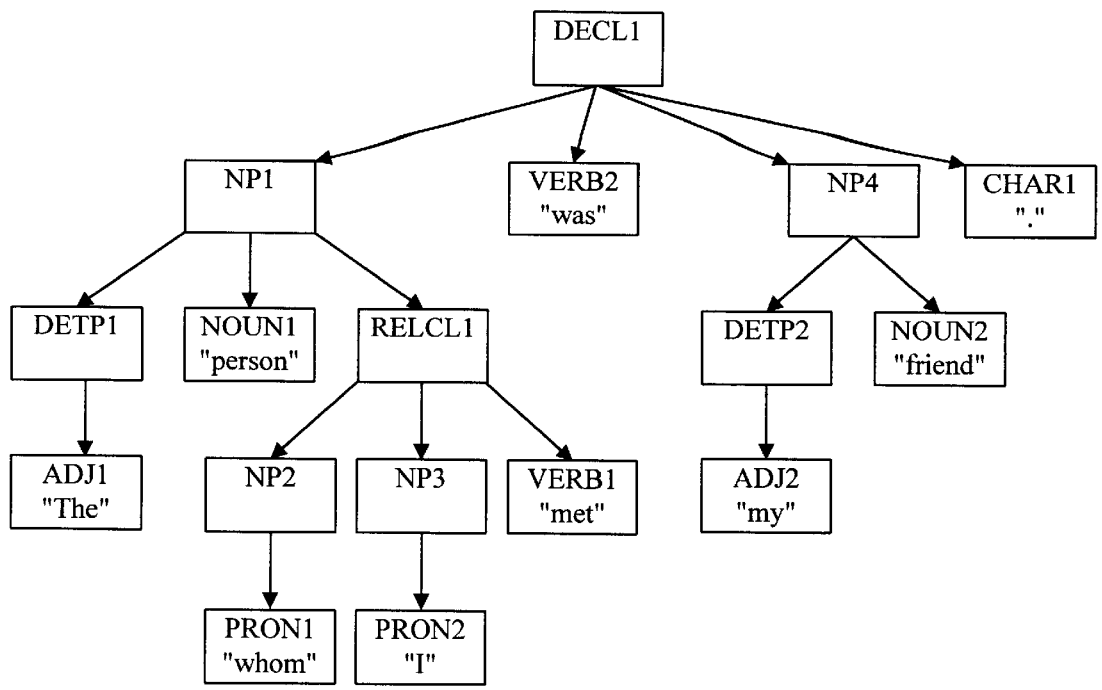
Rule: LF_Dsub1 with node "be" labels link and creates another link
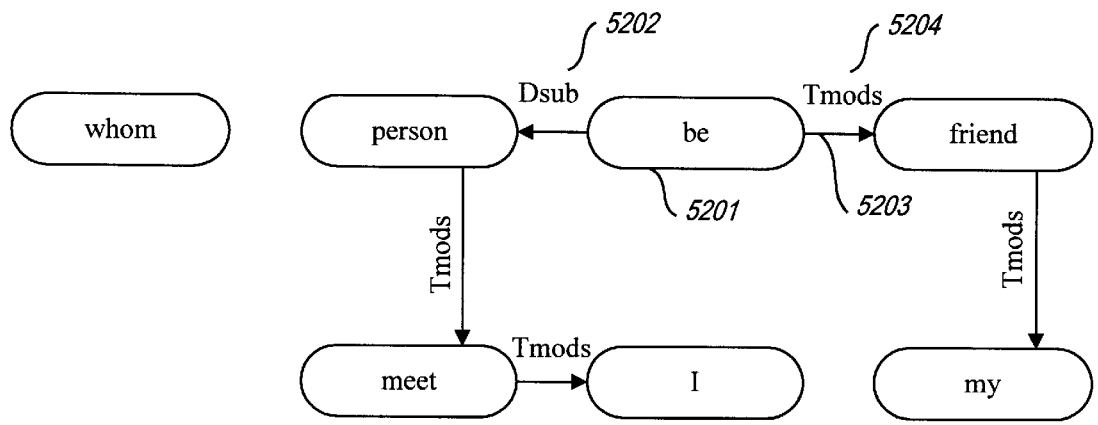
*Fig. 52*

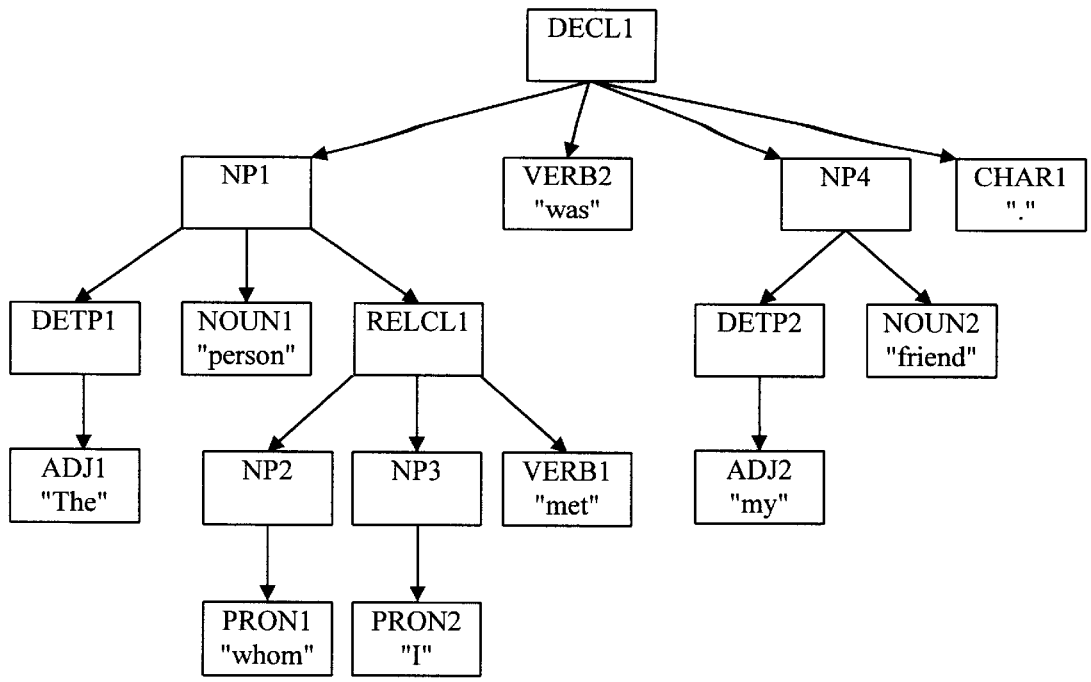
Rule: LF_Dnom with node "be" labels link
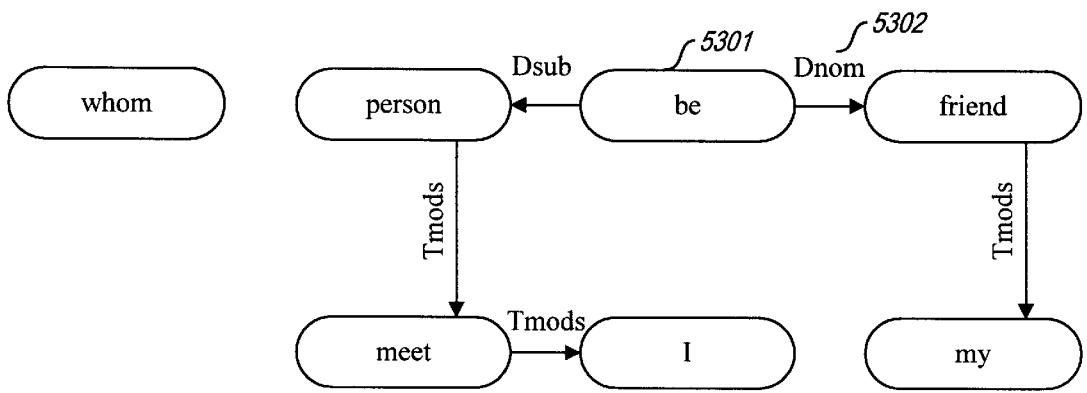
*Fig. 53*

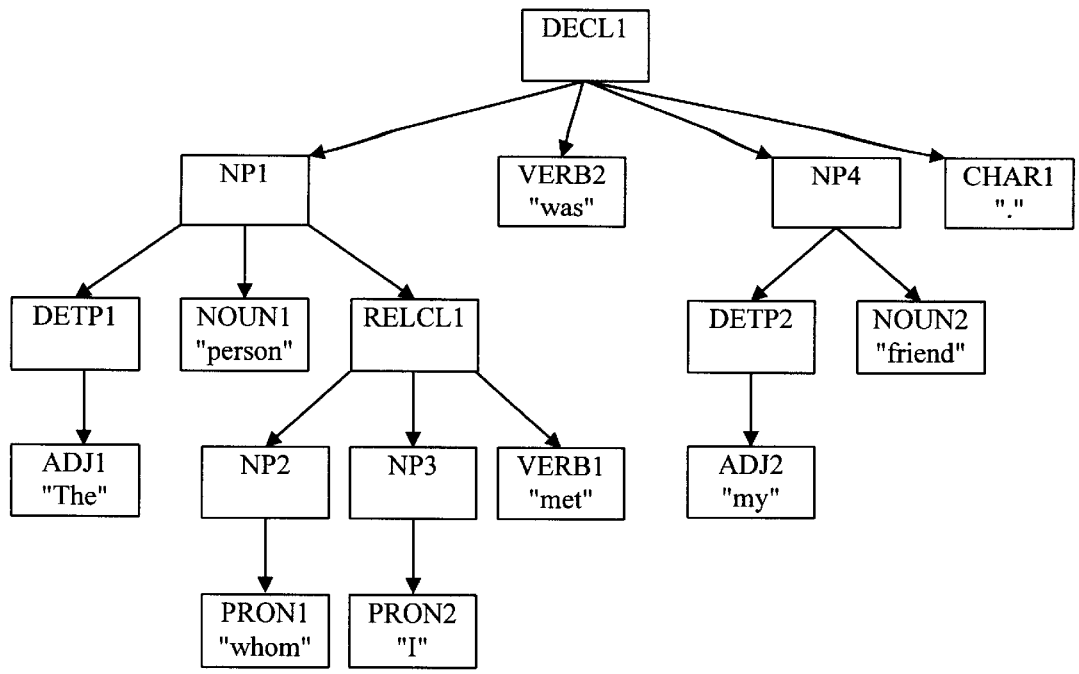
Rule: LF_Props with node "person" labels link
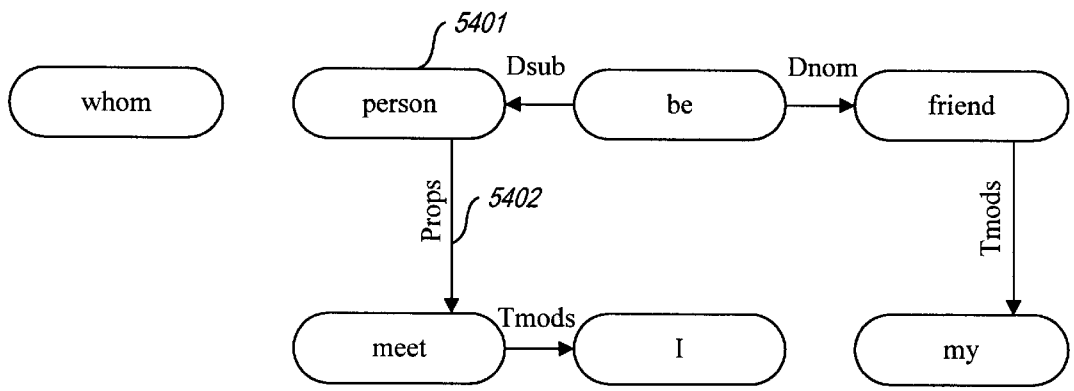
Fig. 54

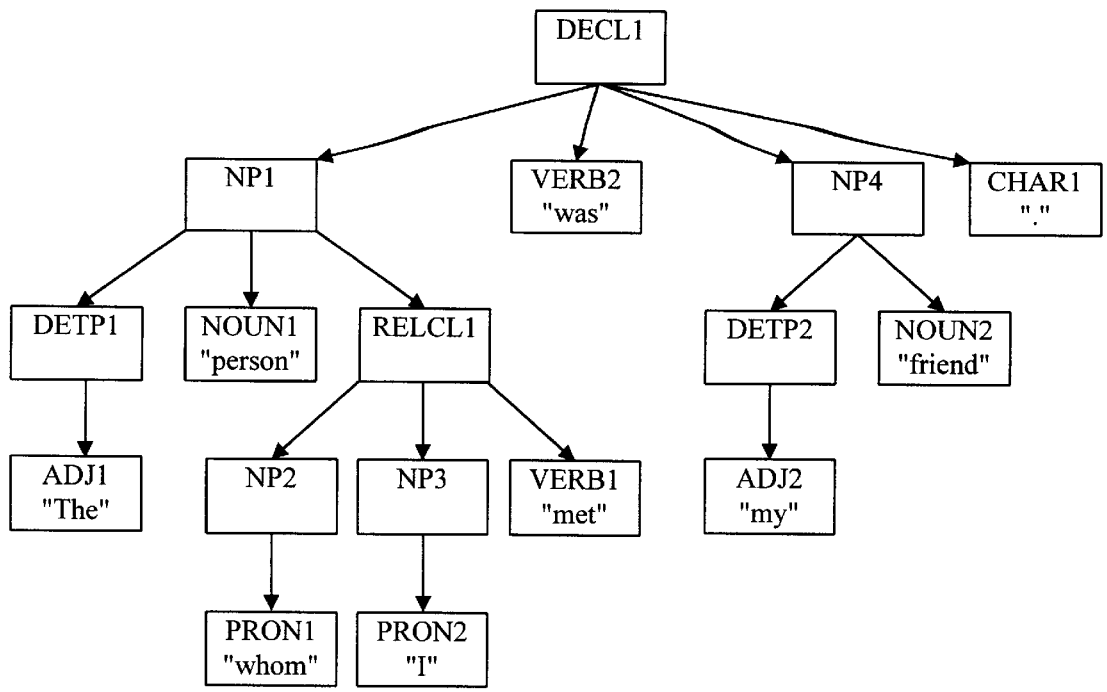
Rule: LF_Dsub1 with node "meet" labels link
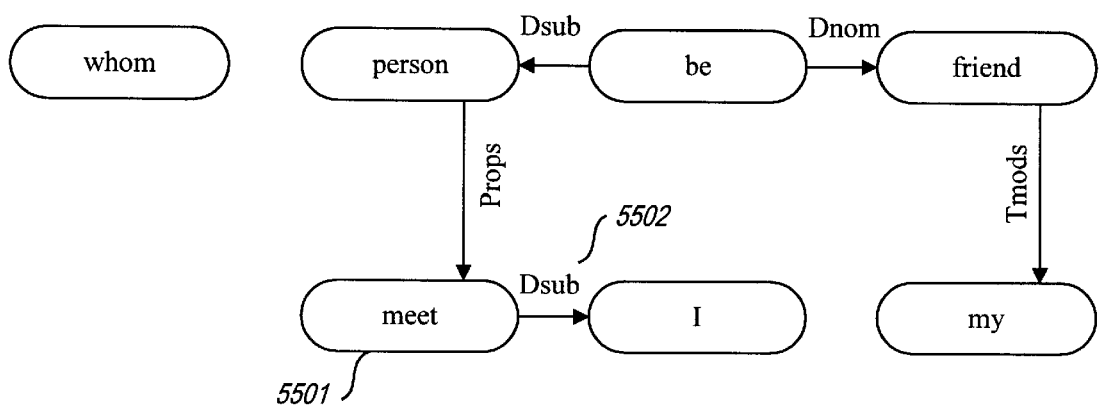
*Fig. 55*

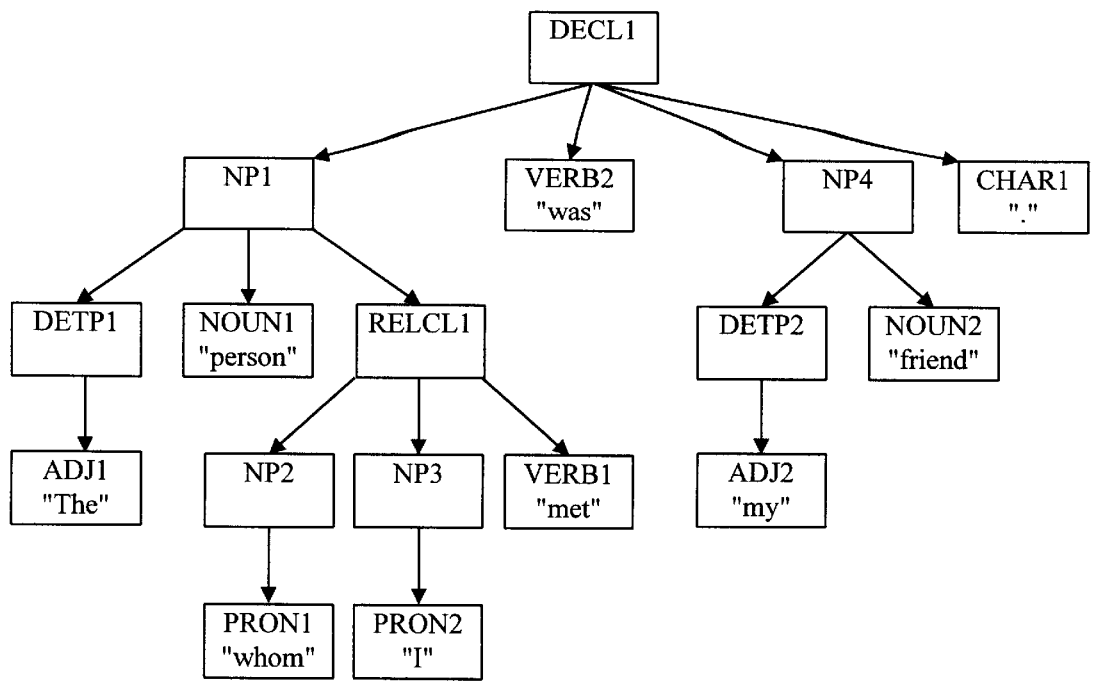
Rule: LF_Dobj1 with node "meet" adds link and labels it
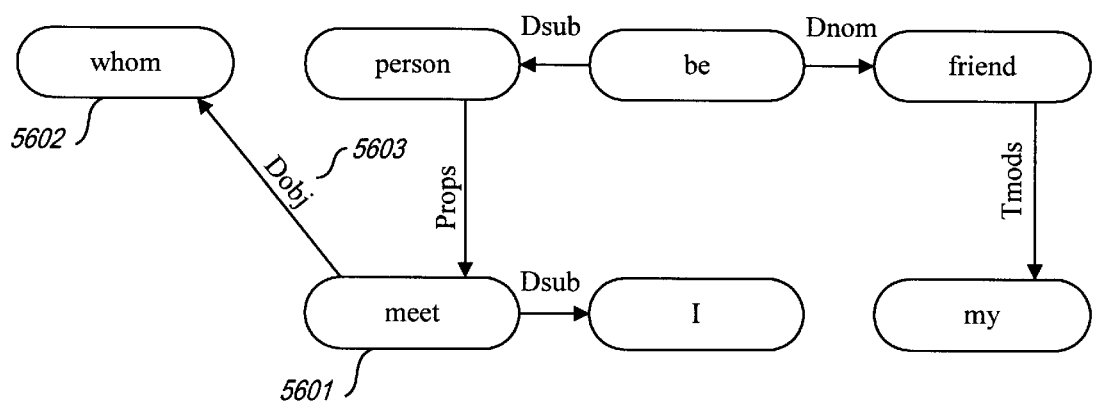
*Fig. 56*

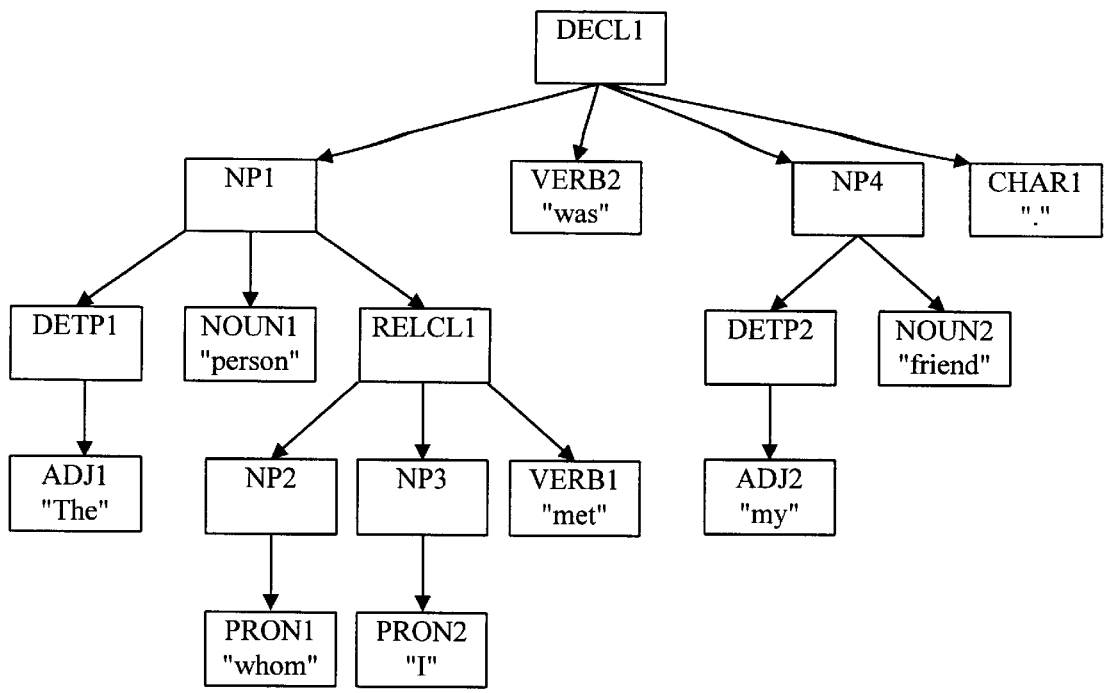
Rule: LF_Ops with node "friend" labels link
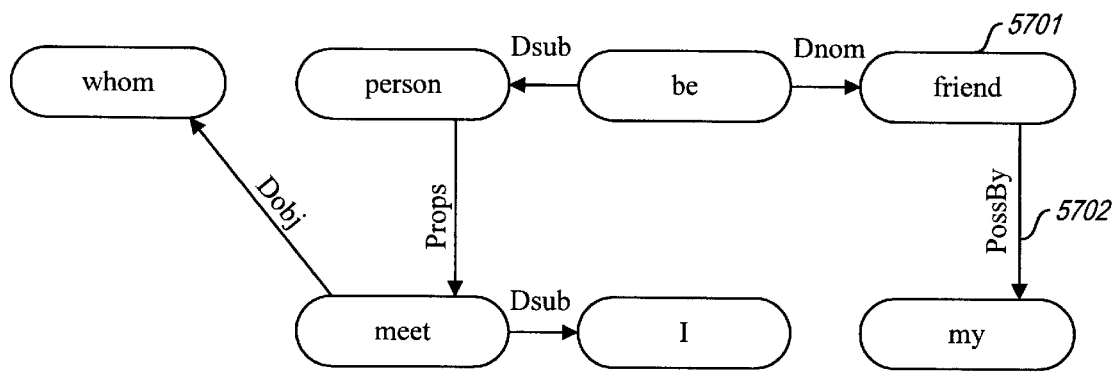
*Fig. 57*

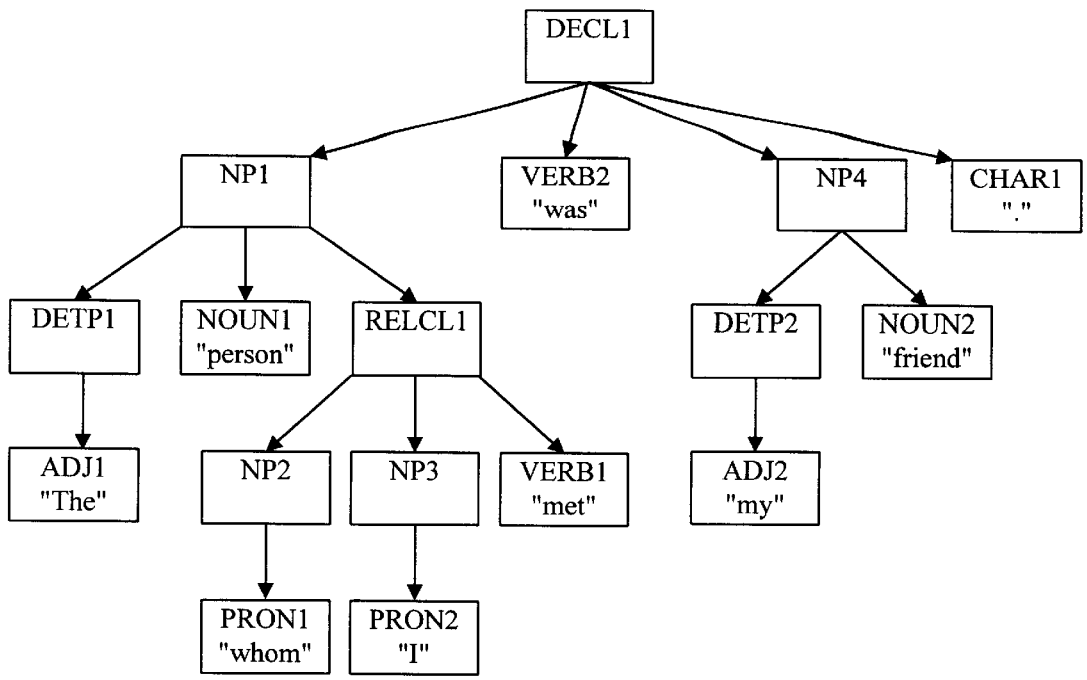
Rule: PsLF_RelPro with node "whom" removes node and adds link
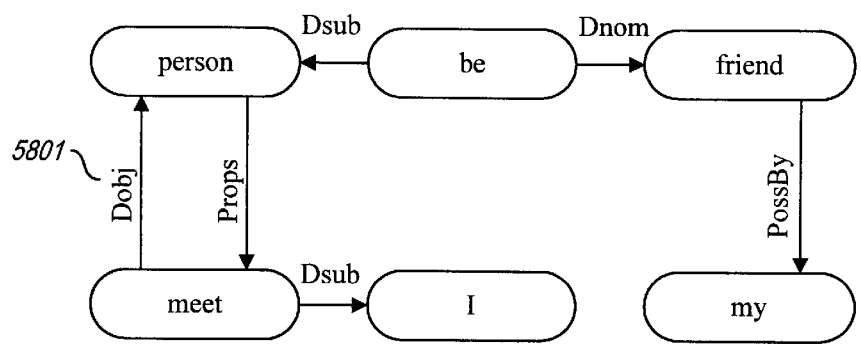
Fig. 58

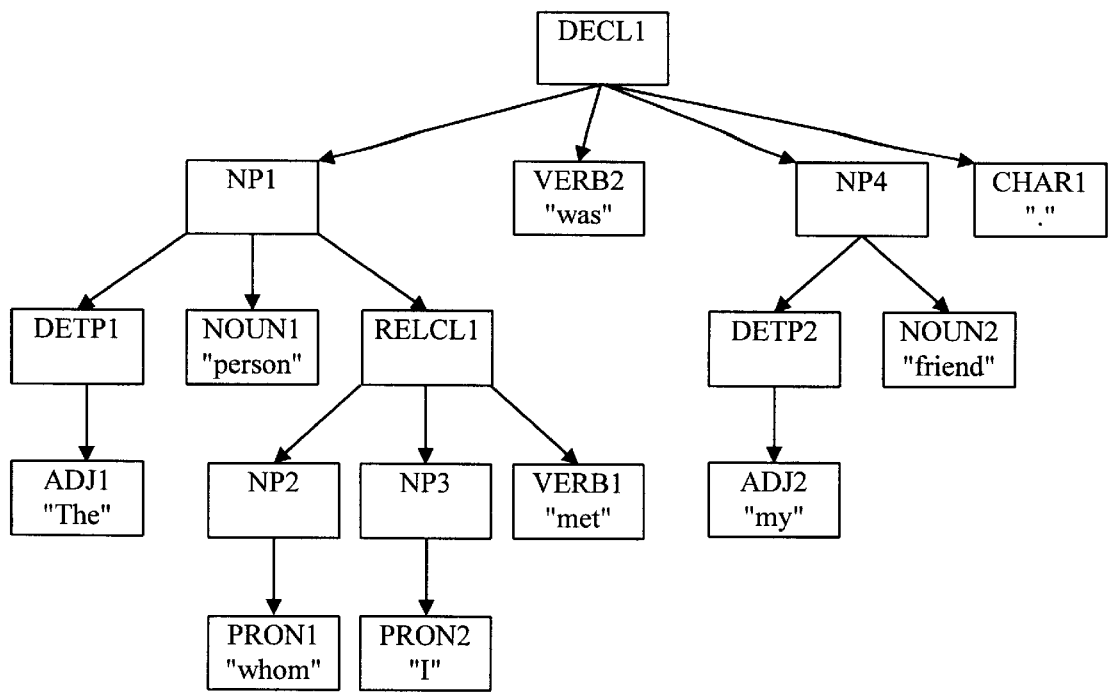
Rule: PsLF_UnifyProns consolidates nodes "I" and "my" into a single node
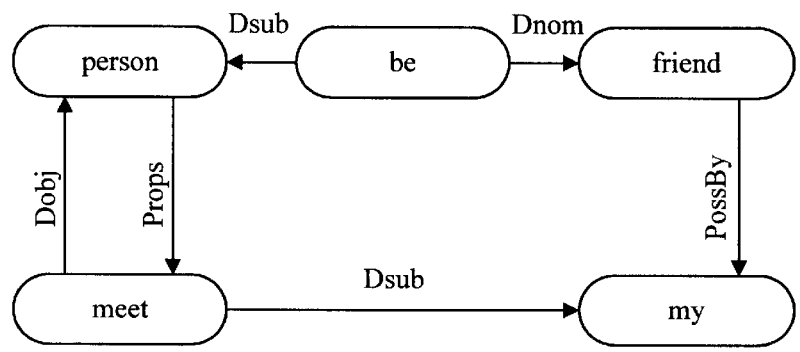
*Fig. 59*

METHOD AND SYSTEM FOR COMPUTING SEMANTIC LOGICAL FORMS FROM SYNTAX TREES

TECHNICAL FIELD

The present invention relates to the field of natural language processing ("NLP"), and more particularly, to a method and system for generating a logical form graph from a syntax tree.

BACKGROUND OF THE INVENTION

Computer systems for automatic natural language processing use a variety of subsystems, roughly corresponding to the linguistic fields of morphological, syntactic, and semantic analysis to analyze input text and achieve a level of machine understanding of natural language. Having understood the input text to some level, a computer system can, for example, suggest grammatical and stylistic changes to the input text, answer questions posed in the input text, or effectively store information represented by the input text.

Morphological analysis identifies input words and provides information for each word that a human speaker of the natural language could determine by using a dictionary. Such information might include the syntactic roles that a word can play (e.g., noun or verb) and ways that the word can be modified by adding prefixes or suffixes to generate different, related words. For example, in addition to the word "fish," the dictionary might also list a variety of words related to, and derived from, the word "fish," including "fishes," "fished," "fishing," "fisher," "fisherman," "fishable," "fishability," "fishbowl," "fisherwoman," "fishery," "fishhook," "fishnet," and "fishy."

Syntactic analysis analyzes each input sentence, using, as a starting point, the information provided by the morphological analysis of input words and the set of syntax rules that define the grammar of the language in which the input sentence was written. The following are sample syntax rules:

sentence=noun phrase+verb phrase noun phrase=adjective+noun verb phrase=adverb+verb Syntactic analysis attempts to find an ordered subset of syntax rules that, when applied to the words of the input sentence, combine groups of words into phrases, and then combine phrases into a complete sentence. For example, consider the input sentence: "Big dogs fiercely bite." Using the three simple rules listed above, syntactic analysis would identify the words "Big" and "dogs" as an adjective and noun, respectively, and apply the second rule to generate the noun phrase "Big dogs." Syntactic analysis would identify the words "fiercely" and "bite" as an adverb and verb, respectively, and apply the third rule to generate the verb phrase "fiercely bite." Finally, syntactic analysis would apply the first rule to form a complete sentence from the previously generated noun phrase and verb phrase. The result of syntactic analysis, often represented as an acyclic downward branching tree with nodes representing input words, punctuation symbols, phrases, and a root node representing an entire sentence, is called a parse.

Some sentences, however, can have several different parses. A classic example sentence for such multiple parses is: "Time flies lie an arrow." There are at least three possible parses corresponding to three possible meanings of this sentence. In the first parse, "time" is the subject of the sentence, "flies" is the verb, and "like an arrow" is a prepositional phrase modifying the verb "flies." However, there are at least two unexpected parses as well. In the second parse, "time" is an adjective modifying "flies," "like" is the verb, and "an arrow" is the object of the verb. This parse corresponds to the meaning that flies of a certain type, "time flies," like or are attracted to an arrow. In the third parse, "time" is an imperative verb, "flies" is the object, and "like an arrow" is a prepositional phrase modifying "time." This parse corresponds to a command to time flies as one would time an arrow, perhaps with a stopwatch.

Syntactic analysis is often accomplished by constructing one or more hierarchical trees called syntax parse trees. Each leaf node of the syntax parse tree generally represents one word or punctuation symbol of the input sentence. The application of a syntax rule generates an intermediate-level node linked from below to one, two, or occasionally more existing nodes. The existing nodes initially comprise only leaf nodes, but, as syntactic analysis applies syntax rules, the existing nodes comprise both leaf nodes as well as intermediate-level nodes. A single root node of a complete syntax parse tree represents an entire sentence.

Semantic analysis generates a logical form graph that describes the meaning of input text in a deeper way than can be described by a syntax parse tree alone. The logical form graph is a first attempt to understand the input text at a level analogous to that achieved by a human speaker of the language.

The logical form graph has nodes and links, but, unlike the syntax parse tree described above, is not hierarchically ordered. The links of the logical form graph are labeled to indicate the relationship between a pair of nodes. For example, semantic analysis may identify a certain noun in a sentence as the deep subject or deep object of a verb. The deep subject of a verb is the doer of the action and the deep object of a verb is the object of the action specified by the verb. The deep subject of an active voice verb may be the syntactic subject of the sentence, and the deep object of an active voice verb may be the syntactic object of the verb. However, the deep subject of a passive voice verb may be expressed in an agentive-by phrase, and the deep object of a passive voice verb may be the syntactic subject of the sentence. For example, consider the two sentences: (1) "Dogs bite people" and (2) "People are bitten by dogs." The first sentence has an active voice verb, and the second sentence has a passive voice verb. The syntactic subject of the first sentence is "Dogs" and the syntactic object of the verb "bite" is "people." By contrast, the syntactic subject of the second sentence is "People" and the verb phrase "are bitten" is modified by the agentive-by phrase "by dogs." For both sentences, "dogs" is the deep subject, and "people" is the deep object of the verb or verb phrase of the sentence. Although the syntax parse trees generated by syntactic analysis for sentences 1 and 2, above, will be different, the logical form graphs generated by semantic analysis will be the same, because the underlying meaning of the two sentences is the same.

Further semantic processing after generation of the logical form graph may draw on knowledge databases to relate analyzed text to real world concepts in order to achieve still deeper levels of understanding. An example knowledge base would be an on-line encyclopedia, from which more elaborate definitions and contextual information for particular words can be obtained.

In the following, the three NLP subsystems—morphological, syntactic, and semantic—are described in the context of processing the sample input text: "The person whom I met was my friend." FIG. 1 is a block diagram illustrating the flow of information between the NLP subsystems. The morphological subsystem 101 receives the input text and outputs an identification of the words and senses for each of the various parts of speech in which each word can be used. The syntactic subsystem 102 receives this information and generates a syntax parse tree by applying syntax rules. The semantic subsystem 103 receives the syntax parse tree and generates a logical form graph.

FIGS. 2–5 display the dictionary information stored on an electronic storage medium that is retrieved for the input words of the sample input text during morphological analysis. FIG. 2 displays the dictionary entries for the input words "the" 201 and "person" 202. Entry 201 comprises the key "the" 203 and a list of attribute/value pairs. The first attribute "Adj" 204 has, as its value, the symbols contained within the braces 205 and 206. These symbols comprise two further attribute/value pairs: (1) "Lemma"/"the" and (2) "Bits"/ "Sing Plur Wa6 Det Art B0 Def." A lemma is the basic, uninflected form of a word. The attribute "Lemma" therefore indicates that "the" is the basic, uninflected form of the word represented by this entry in the dictionary. The attribute "Bits" comprises a set of abbreviations representing certain morphological and syntactic information about a word. This information indicates that "the" is: (1) singular; (2) plural; (3) not inflectable; (4) a determiner; (5) an article; (6) an ordinary adjective; and (7) definite. Attribute 204 indicates that the word "the" can serve as an adjective. Attribute 212 indicates that the word "the" can serve as an adverb. Attribute "Senses" 207 represents the various meanings of the word as separate definitions and examples, a portion of which are included in the list of attribute/value pairs between braces 208-209 and between braces 210-211. Additional meanings actually contained in the entry for "the" have been omitted in FIG. 2, indicated by the parenthesized expression "(more sense records)" 213.

In the first step of natural language processing, the morphological subsystem recognizes each word and punctuation symbol of the input text as a separate token and constructs an attribute/value record for each part of speech of each token using the dictionary information. Attributes are fields within the records that can have one of various values defined for the particular attribute. These attribute/value records are then passed to the syntactic subsystem for further processing, where they are used as the leaf nodes of the syntax parse tree that the syntactic subsystem constructs. All of the nodes of the syntax parse tree and the logical form graph constructed by subsequent NLP subsystems are attribute/value records.

The syntactic subsystem applies syntax rules to the leaf nodes passed to the syntactic subsystem from the morphological subsystem to construct higher-level nodes of a possible syntax parse tree that represents the sample input text. A complete syntax parse tree includes a root node, intermediate-level nodes, and leaf nodes. The root node represents the syntactic construct (e.g., declarative sentence) for the sample input text. The intermediate-level nodes represent intermediate syntactic constructs (e.g., verb, noun, or prepositional phrases). The leaf nodes represent the initial set of attribute/value records.

In some NLP systems, syntax rules are applied in a top-down manner. The syntactic subsystem of the NLP system herein described applies syntax rules to the leaf nodes in a bottom-up manner. That is, the syntactic subsystem attempts to apply syntax rules one-at-a-time to single leaf nodes to pairs of leaf nodes, and, occasionally, to larger groups of leaf nodes. If the syntactic rule requires two leaf nodes upon which to operate, and a pair of leaf nodes both contain attributes that match the requirements specified in the rule, then the rule is applied to them to create a higher-level syntactic construct. For example, the words "my friend" could represent an adjective and a noun, respectively, which can be combined into the higher-level syntactic construct of a noun phrase. A syntax rule corresponding to the grammar rule, "noun phrase=adjective+ noun," would create an intennediate-level noun phrase node, and link the two leaf nodes representing "my" and "friend" to the newly created intermediate-level node. As each new intermediate-level node is created, it is linked to already-existing leaf nodes and intermediate-level nodes, and becomes part of the total set of nodes to which the syntax rules are applied. The process of applying syntax rules to the growing set of nodes continues until either a complete syntax parse tree is generated or until no more syntax rules can be applied. A complete syntax parse tree includes all of the words of the input sentence as leaf nodes and represents one possible parse of the sentence.

This bottom-up method of syntax parsing creates many intermediate-level nodes and sub-trees that may never be included in a final, complete syntax parse tree. Moreover, this method of parsing can simultaneously generate more than one complete syntax parse tree.

The syntactic subsystem can conduct an exhaustive search for all possible complete syntax parse trees by continuously applying the rules until no additional rules can be applied. The syntactic subsystem can also try various heuristic approaches to first generate the most probable nodes. After one or a few complete syntax parse trees are generated, the syntactic subsystem typically can terminate the search because the syntax parse tree most likely to be chosen as best representing the input sentence is probably one of the first generated syntax parse trees. If no complete syntax parse trees are generated after a reasonable search, then a fitted parse can be achieved by combining the most promising sub-trees together into a single tree using a root node that is generated by the application of a special aggregation rule.

FIG. 6 illustrates the initial leaf nodes created by the syntactic subsystem for the dictionary entries initially displayed in FIGS. 2–5. The leaf nodes include two special nodes, 601 and 614, that represent the beginning of the sentence and the period terminating the sentence, respectively. Each of the nodes 602–613 represent a single part of speech that an input word can represent in a sentence. These parts of speech are found as attribute/value pairs in the dictionary entries. For example, leaf nodes 602 and 603 represent the two possible parts of speech for the word "The," that are found as attributes 204 and 212 in FIG. 2.

FIG. 7–22 show the rule-by-rule construction of the final syntax parse tree by the syntactic subsystem. Each of the figures illustrates the application of a single syntax rule to generate an intermediate-level node that represents a syntactic structure. Only the rules that produce the intermediate-level nodes that comprise the final syntax tree are illustrated. The syntactic subsystem generates many intermediate-level nodes which do not end up included in the final syntax parse tree.

In FIGS. 7–14, the syntactic subsystem applies unary syntax rules that create intermediate-level nodes that represent simple verb, noun, and adjective phrases. Starting with FIG. 15, the syntactic subsystem begins to apply binary syntax rules that combine simple verb, noun, and adjective phrases into multiple-word syntactic constructs. The syntactic subsystem orders the rules by their likelihood of successful application, and then attempts to apply them one-by-one until it finds a rule that can be successfully applied to the existing nodes. For example, as shown in FIG. 15, the syntactic subsystem successfully applies a rule that creates a node representing a noun phrase from an adjective phrase and a noun phrase. The rule specifies the characteristics required of the adjective and noun phrases. In this example, the adjective phrase must be a determiner. By following the pointer from node 1501 back to node 1503, and then accessing morphological information included in node 1503, the syntactic subsystem determines that node 1501 does represent a determiner. Having located the two nodes 1501 and 1502 that meet the characteristics required by the rule, the syntactic subsystem then applies the rule to create from the two simple phrases 1501 and 1502 an intermediate-level node that represents the noun phrase "my friend." In FIG. 22, the syntactic subsystem generates the final, complete syntax parse tree representing the input sentence by applying a trinary rule that combines the special Begin1 leaf node 2201, the verb phrase "The person whom I met was my friend" 2202, and the leaf node 2203 that represents the final terminating period to form node 2204 representing the declarative sentence.

The semantic subsystem generates a logical form graph from a complete syntax parse tree. In some NLP systems, the logical form graph is constructed from the nodes of a syntax parse tree, adding to them attributes and new bi-directional links. The logical form graph is a labeled, directed graph. It is a semantic representation of an input sentence. The information obtained for each word by the morphological subsystem is still available through references to the leaf nodes of the syntax parse tree from within nodes of the logical form graph. Both the directions and labels of the links of the logical form graph represent semantic information, including the functional roles for the nodes of the logical form graph. During its analysis, the semantic subsystem adds links and nodes to represent (1) omitted, but implied, words; (2) missing or unclear arguments and adjuncts for verb phrases; and (3) the objects to which prepositional phrases refer.

FIG. 23 illustrates the complete logical form graph generated by the semantic subsystem for the example input sentence. Meaningful labels have been assigned to links 2301–2306 by the semantic subsystem as a product of the successful application of semantic rules. The six nodes 2307–2312, along with the links between them, represent the essential components of the semantic meaning of the sentence. In general, the logical form nodes roughly correspond to input words, but certain words that are unnecessary for conveying semantic meaning, such as "The" and "whom" do not appear in the logical form graph, and the input verbs "met" and "was" appear as their infinitive forms "meet" and "be." The nodes are represented in the computer system as records, and contain additional information not shown in FIG. 23. The fact that the verbs were input in singular past tense form is indicated by additional information within the logical form nodes corresponding to the meaning of the verbs, 2307 and 2310.

The differences between the syntax parse tree and the logical form graph are readily apparent from a comparison of FIG. 23 to FIG. 22. The syntax parse tree displayed in FIG. 22 includes 10 leaf nodes and 16 intermediate-level nodes linked together in a strict hierarchy, whereas the logical form displayed in FIG. 23 contains only 6 nodes. Unlike the syntax parse tree, the logical form graph is not hierarchically ordered, obvious from the two links having opposite directions between nodes 2307 and 2308. In addition, as noted above, the nodes no longer represent the exact form of the input words, but instead represent their meanings.

Further natural language processing steps occur after semantic analysis. They involve combining the logical form graph with additional information obtained from knowledge bases, analyzing groups of sentences, and generally attempting to assemble around each logical form graph a rich contextual environment approximating that in which humans process natural language.

Prior art methods for generating logical form graphs involve computationally complex adjustments to, and manipulations of the syntax parse tree. As a result, it becomes increasingly difficult to add new semantic rules to a NLP system. Addition of a new rule involves new procedural logic that may conflict with the procedural logic already programmed into the semantic subsystem. Furthermore, because nodes of the syntax parse tree are extended and reused as nodes for the logical form graph, prior art semantic subsystems produce large, cumbersome, and complicated data structures. The size and complexity of a logical form graph overlayed onto a syntax parse tree makes further use of the combined data structure error-prone and inefficient. Accordingly, it would be desirable to have a more easily extended and manageable semantic subsystem so that simple logical form graph data structures can be produced.

SUMMARY OF THE INVENTION

The present invention is directed to a method and system for performing semantic analysis of an input sentence within a NLP system. The semantic analysis subsystem receives a syntax parse tree generated by the morphological and syntactic subsystems. The semantic analysis subsystem applies two sets of semantic rules to make adjustments to the received syntax parse tree. The semantic analysis subsystem then applies a third set of semantic rules to create a skeletal logical form graph from the syntax parse tree. The semantic analysis subsystem finally applies two additional sets of semantic rules to the skeletal logical form graph to provide semantically meaningful labels for the links of the logical form graph, to create additional logical form graph nodes for missing nodes, and to unify redundant logical form graph nodes. The final logical form graph generated by the semantic analysis subsystem represents the complete semantic analysis of an input sentence.

BRIEF DESCRIPTION OF THE DRAWINGS

FIGS. 2–5 display the dictionary information stored on an electronic storage medium that is retrieved for each word of the example input sentence: "The person whom I met was my friend."

FIG. 27 displays the first set of semantic rules.

FIG. 28A displays a detailed description of the semantic rule PrLF__You from the first set of semantic rules.

FIG. 28B displays an example application of the semantic rule PrLF__You from the first set of semantic rules.

FIG. 29 displays the second set of semantic rules.

FIGS. 30A-30B display a detailed description of the semantic rule TrLF__MoveProp from the second set of semantic rules.

FIG. 30C displays an example application of the semantic rule TrLF__MoveProp from the second set of semantic rules.

FIG. 33 displays the third set of semantic rules.

FIGS. 34A–34C display a detailed description of the semantic rule SynToSem1 from the third set of semantic rules.

FIG. 34D displays an example application of the semantic rule SynToSem1 from the third set of semantic rules.

FIGS. 36–38 display the fourth set of semantic rules.

FIG. 39A displays a detailed description of the semantic rule LF__Dobj2 from the fourth set of semantic rules.

FIG. 39B displays an example application of the semantic rule LF__Dobj2 from the fourth set of semantic rules.

FIG. 40 displays the fifth set of semantic rules.

FIGS. 41A–41C display a detailed description of the semantic rule PsLF__PronAnaphora from the fifth set of semantic rules.

FIG. 41D displays an example application of the semantic rule PsLF__PronAnaphora from the fifth set of semantic rules.

FIGS. 44–59 display each successful rule application by the NSS as it processes the syntax parse tree generated for the example input sentence.

DETAILED DESCRIPTION OF THE INVENTION

The present invention provides a new semantic method and system for generating a logical form graph from a syntax tree. In a preferred embodiment, a new semantic subsystem (NSS) performs the semantic analysis in three phases: (1) filling in and adjusting the syntax parse tree, (2) generating an initial logical form graph, and (3) generating meaningful labels for links of the logical form graph and constructing a complete logical form graph. Each phase constitutes the application of one or two sets of rules to either a set of syntax tree nodes or to a set of logical form graph nodes.

The NSS addresses the recognized deficiencies in prior art semantic subsystems described above in the background section. Each phase of the NSS is a simple and extensible rule-based method. As additional linguistic phenomena are recognized, rules to handle them can be easily included into one of the rule sets employed by the NSS. In addition, the second phase of the NSS generates an entirely separate logical form graph, rather than overlaying the logical form graph onto an existing syntax parse tree. The logical form graph data structure generated by the NSS is therefore simple and space efficient by comparison with prior art logical form graph data structures.

Figure 24:
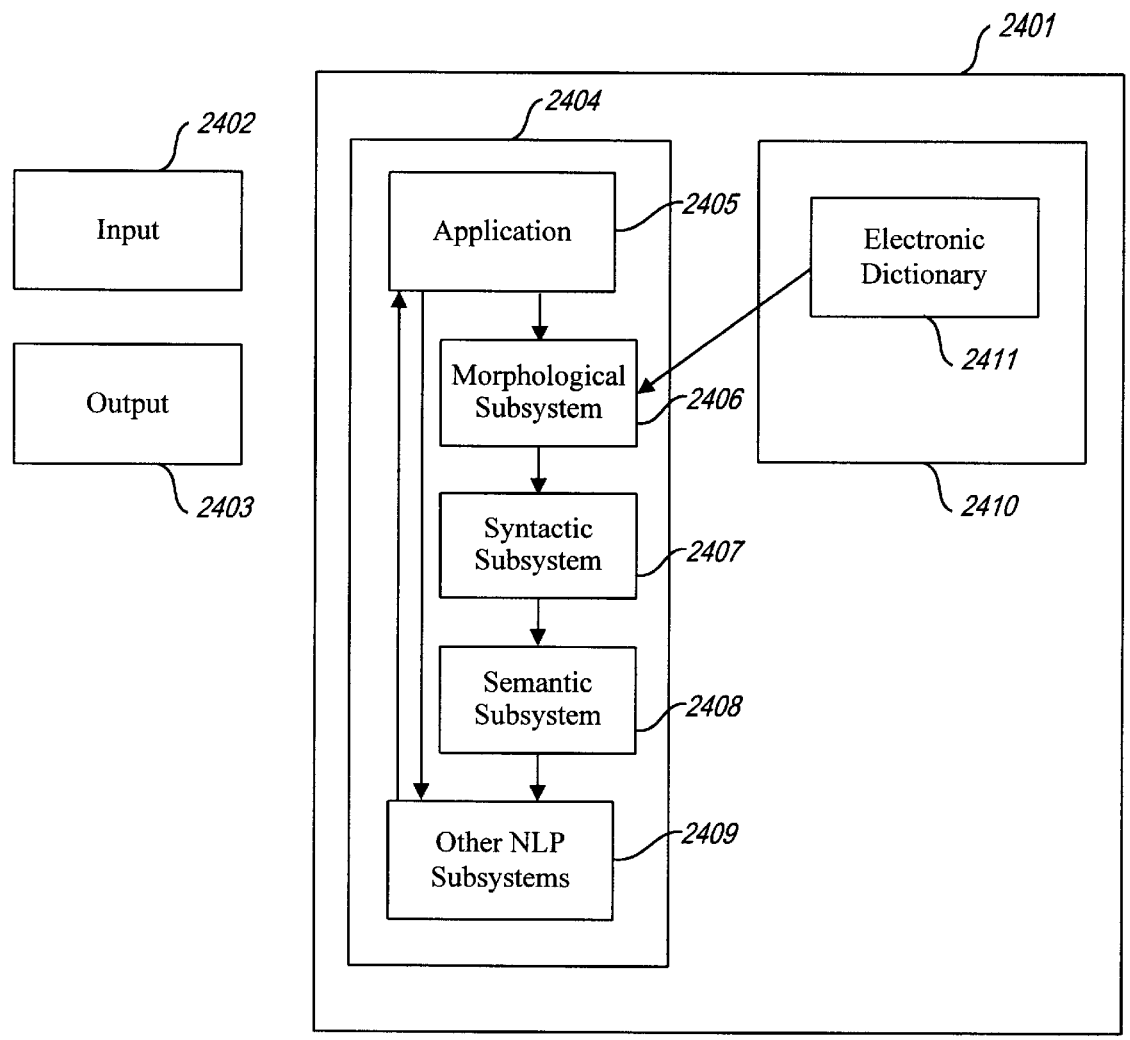
FIG. 24 shows a block diagram illustrating a preferred computer system for natural language processing.

FIG. 24 is a block diagram illustrating a preferred computer system for a NLP system. The computer system 2401 contains a central processing unit, a memory, a storage device, and input and output devices. The NLP subsystems 2406–2409 are typically loaded into memory 2404 from a computer-readable storage device such as a disk. An application program 2405 that uses the services provided by the NLP system is also typically loaded into memory. The electronic dictionary 2411 is stored on a storage device, such as a disk 2410, and entries are read into memory for use by the morphological subsystem. In one embodiment, a user typically responds to a prompt displayed on the output device 2403 by entering one or more natural language sentences on an input device 2404. The natural language sentences are received by the application, processed, and then passed to the NLP system by way of the morphological subsystem 2406. The morphological subsystem uses information from the electronic dictionary to construct records describing each input word, and passes those records to the syntactic subsystem 2407. The syntactic subsystem parses the input words to construct a syntax parse tree and passes the syntax parse tree to the semantic subsystem 2408. The semantic subsystem generates a logical form graph from the received syntax parse tree and passes that logical form graph to other NLP subsystems 2409. The application program then can send and receive information to the natural language subsystem 2409 in order to make use of the machine understanding of the input text achieved by the NLP system, and then finally output a response to the user on an output device 2403.

Figure 25:
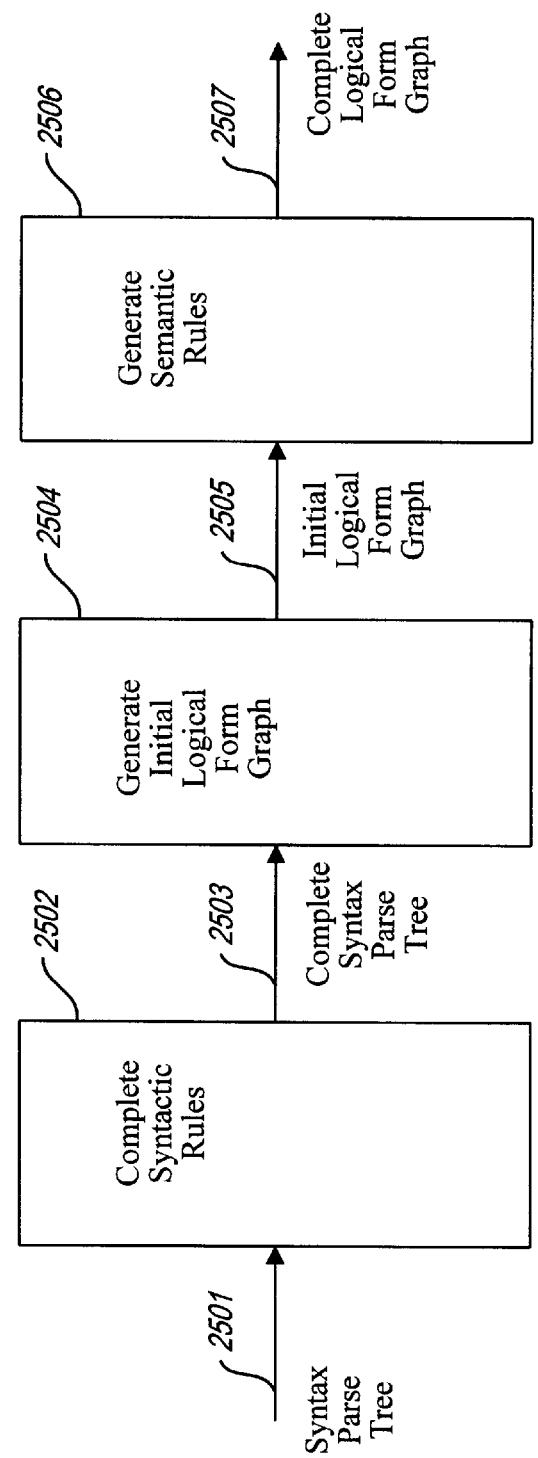
FIG. 25 illustrates the three phases of the preferred new semantical subsystem.

FIG. 25 illustrates the three phases of the preferred new semantic subsystem. Phases 1–3 of the NSS are shown as 2502, 2504, and 2506, respectively. The states of the relevant data structures input and output from each phase of the NSS are displayed in FIG. 25 as labels 2501, 2503, 2505, and 2507. The NSS receives a syntax parse tree 2501 generated by the syntactic subsystem. The first phase of the NSS 2502 completes the syntax parse tree using semantic rules, and passes the completed syntax parse tree 2503 to the second phase of the NSS 2504. The second phase of the NSS generates an initial logical form graph 2505 and passes that initial logical form graph to the third phase of the NSS 2506. The third phase of the NSS applies semantic rules to the initial logical form graph in order to add meaningful semantic labels to the links of the logical form graph, to add new links and nodes to fill out the semantic representation of the input sentence, and occasionally to remove redundant nodes. The complete logical form graph 2507 is then passed to other NLP subsystems for use in further interpreting the input sentence represented by the logical form graph or in answering questions or preparing data based on the input sentence.

Figure 26:
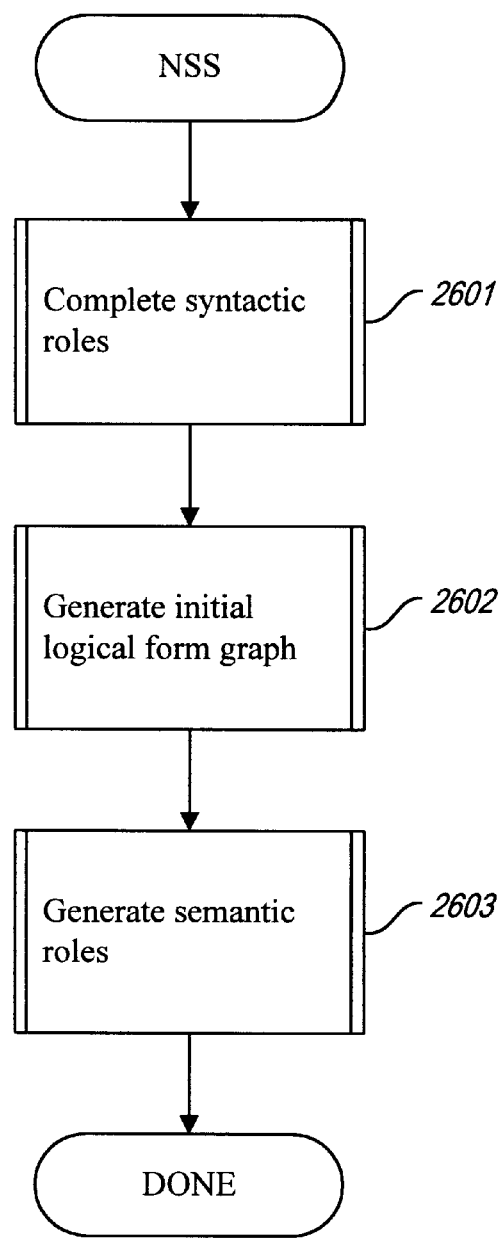
FIG. 26 is a flow diagram for the new semantic subsystem (NSS).

A flow diagram for the NSS is displayed in FIG. 26. The flow diagram shows successive invocation of the three phases of the NSS, 2601, 2602, and 2603. In the following, each phase of the NSS will be described in detail.

NSS Phase One—Completing Syntactic Roles of the Syntax Tree

In phase one of the NSS, the NSS modifies a syntax parse tree received from the syntactic subsystem by applying two different sets of semantic rules to the nodes of the syntax parse tree. These semantic rules can alter the linkage structure of the syntax tree or cause new nodes to be added.

The NSS applies a first set of semantic rules to resolve a variety of possible omissions and deficiencies that cannot be addressed by syntactical analysis. Application of these first set of semantic rules effect preliminary adjustments to the input syntax parse tree. The linguistic phenomena addressed by the first set of semantic rules include verbs omitted after the words "to" or "not," but understood to be implicit by a human listener, missing pronouns, such as "you" or "we" in imperative sentences, expansion of coordinate structures involving the words "and" or "or," and missing objects or elided verb phrases. FIG. 27 lists a preferred first set of semantic rules applied by the NSS in phase one. For each rule, the name of the rule followed by a concise description of the linguistic phenomenon that it addresses is shown. The general format of each semantic rule is a set of conditions which are applied to a syntax parse tree node or logical form graph node and a list of actions that are applied to the syntax parse tree or logical form graph. For example, the NSS applies the conditions of each rule of the first set of semantic rules to the list of syntax records that represents the syntax parse tree and, for each rule for which all the conditions of that rule are satisfied, the NSS performs the list of actions contained in the rule, resulting in specific changes to the syntax parse tree. Of course, the actual form of each semantic rule depends on the details of the representation of the syntax parse tree and logical form graph, for which many different representations are possible. In the following figures, a semantic rule is described by a conditional expression preceded by the word "If" in bold type, followed by a list of actions preceded by the word "Then" in bold type. The "If" part of the semantic rule represents the conditions that must be applied to a syntax parse tree node or logical form graph node and found to be true in order for the rule, as a whole, to be applied to the node, and the "Then" expression represents a list of actions to be performed on the syntax parse tree or logical form graph. The displayed expression closely corresponds to the computer source code expression for the semantic rule.

FIG. 28A displays an English-language representation of the semantic rule PrLF_You from the first set of semantic rules. As can be seen in FIG. 28A, the "If" expression concerns the values of various attributes of the syntax parse tree node to which the rule is applied, and the "Then" expression specifies the creation of a pronoun node for the lemma "you" and a noun phrase node parent for the pronoun node and the attachment of the created nodes to the syntax parse tree.

FIG. 28B shows an example of the application of the semantic rule PrLF_You to the syntax parse tree 2801 generated by the syntactic subsystem for the sentence "Please close the door." Application of PrLF_You results in the modified syntax parse tree 2802, with two new nodes 2803 and 2804 connected to the root node for the sentence. This semantic rule has the purpose of explicitly placing an understood "you" of an imperative sentence into the syntax parse tree.

After all semantic rules of the first set of semantic rule that can be applied to the input syntax parse tree have been applied, the NSS makes main adjustments to the preliminarily-adjusted syntax parse tree by applying to the nodes of the preliminarily-adjusted syntax parse tree a second set of semantic rules. This second set of rules include rules that serve to identify and resolve long-distance attachment phenomena, to transform verbal phrases into verbs with prepositional phrase objects, and to replace, in certain cases, the word "if" with an infinitive clause.

FIG. 29 lists a preferred second set of semantic rules applied by the NSS in phase one. For each rule, the name of the rule followed by a concise description of the linguistic phenomenon that it addresses is shown. FIGS. 30A-30B display an English-language representation of the semantic rule TrLF_MoveProp from the second set of semantic rules. As can be seen in FIGS. 30A-30B, the "If" expression concerns the values of various attributes of the syntax parse tree node to which the rule is applied and various related syntax parse tree nodes, and the "Then" expression specifies a rather complex rearrangement of the syntax parse tree.

FIG. 30C shows an example of the application of the semantic rule TrLF_MoveProp to the syntax parse tree 3001 generated by the syntactic subsystem for the sentence "I have no desire to see the man." Application of TrLF_MoveProp results in the modified syntax parse tree 3002. The infinitive clause represented by node 3003 in the original syntax parse tree has been moved from its position as a child of node 3004 to being a child 3005 of the root DECL1 node 3006 of the modified syntax parse tree. This semantic rule has the purpose of moving clauses like the infinitive clause 3003 from a lower level to a higher level in the syntax tree to facilitate the subsequent transition from the syntax parse tree to a logical form graph.

In the preferred embodiment of the present invention, semantic rules are statements in a programming language that, when executed, create a new tree or graph node from one, two, or occasionally more existing tree or graph nodes and create appropriate links between the newly created node and the existing tree or graph nodes. In the preferred embodiment, the left-hand portion of a semantic rule specifies characteristics that the existing node or nodes must have in order for the rule to be applied. The right-hand portion of the semantic rule specifies the type of new node to be created, and the values for the new node's attributes. The rules described in FIG. 28 and in FIG. 30 exemplify this form.

In the preferred embodiment of the present invention, each syntax parse tree and each logical form graph is represented as a list of nodes, with the links between the nodes represented by attribute values within the nodes. Each set of rules is also represented as a list. Application of set of rules to a syntax parse tree involves selecting successive nodes from the list of nodes and attempting to apply to each selected node each rule from the list of rules representing the set of rules. A particular rule can be successfully applied to a node if that node has the characteristics specified in the left-hand portion of the rule. Occasionally, a new node may be created as a result of a successful rule application, or an existing node may be marked for deletion.

Figure 31:
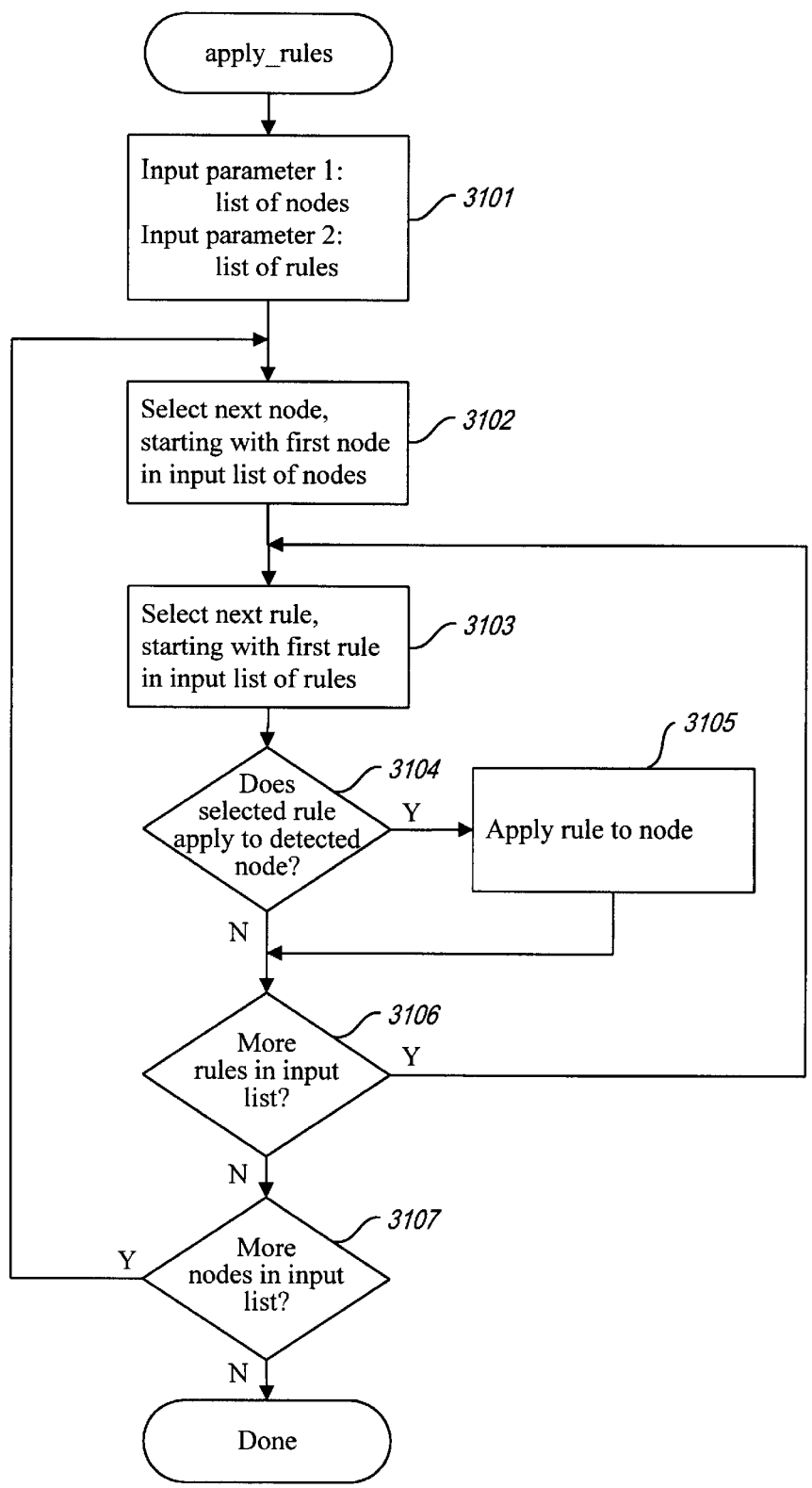
FIG. 31 displays a flow diagram for apply__rules.

A flow diagram for the subroutine "apply_rules" which applies a set of rules to a list of nodes representing a syntax parse tree or logical form graph is displayed in FIG. 31. The subroutine "apply_rules" is called by the NSS to apply each set of rules during each of the three phases of the NSS. In step 3101, apply_rules receives a list of nodes as its first argument and a list of rules as its second argument. Steps 3102 through 3107 represent an outer loop, each iteration of which attempts to apply all of the input rules from the input list of rules to successive nodes selected from the input list. Steps 3103 through 3106 represent an inner loop, each iteration of which attempts to apply a rule selected from the list of input rules to a node selected from the input list of nodes. In step 3102, apply_rules selects the next node from the input list of nodes, starting with the first. In step 3103, apply_rules selects the next rule from the input list of rules, starting with the first. In step 3104, apply_rules determines whether the selected node has the characteristics specified in the left-hand part of the selected rule. If the node has the specified characteristics, then apply_rules applies in step 3105 the selected rule to the selected of node. If apply_rules determines in step 3106 that there are more rules to attempt to apply to the selected node, apply_rules returns to step 3103 to select the next rule. If apply_rules determines in step 3107 that there are more nodes to attempt to apply the rules of the input rule list, apply_rules returns to step 3102 to select the next node.

Figure 32:
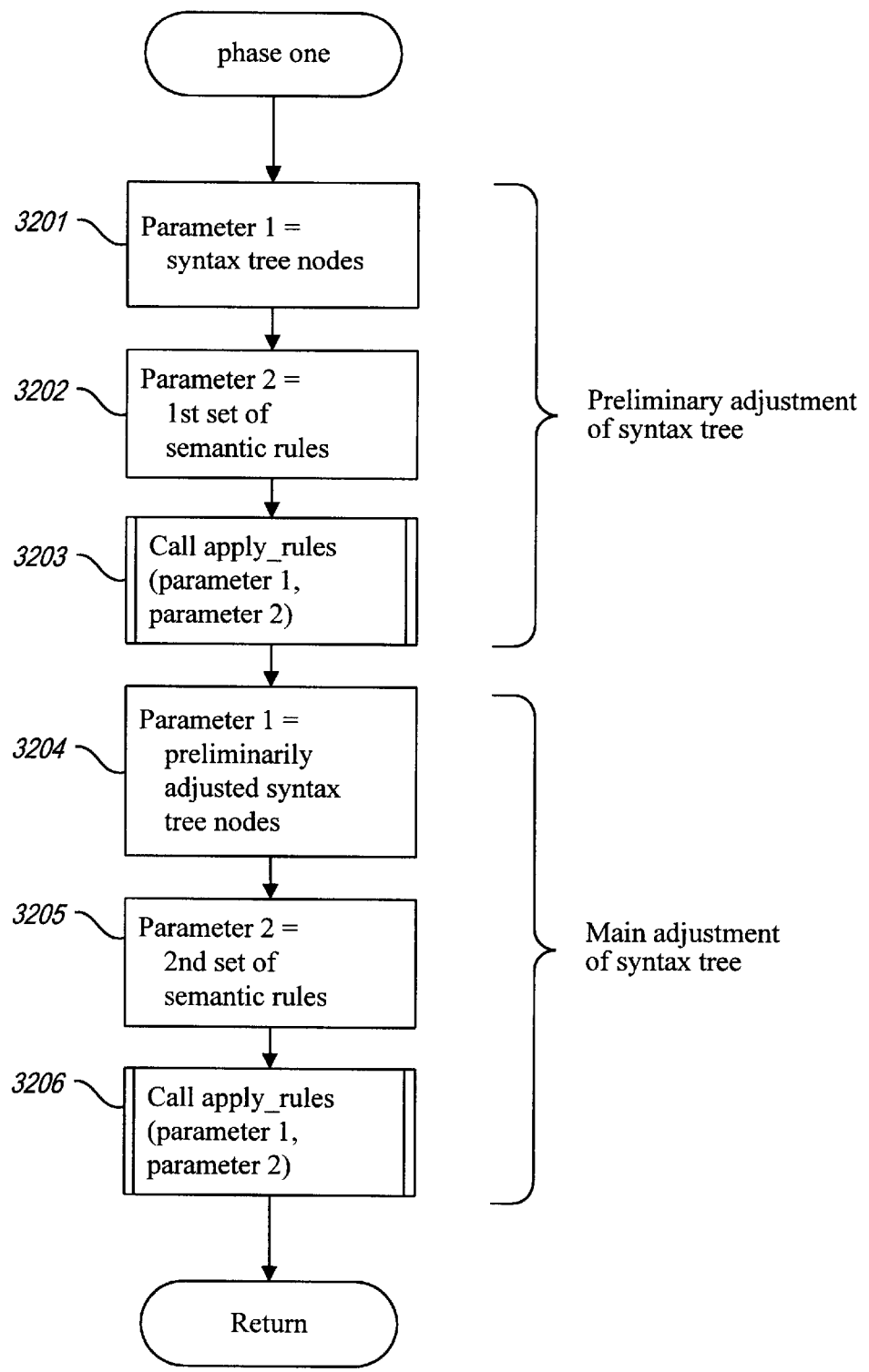
FIG. 32 displays a flow diagram for phase one of the NSS.

A flow diagram for the processing done in the first phase of the NSS is displayed in FIG. 32. In step 3201, the variable "parameter1" is assigned to be the list of syntax parse tree nodes that comprise the syntax parse tree generated by the syntactic subsystem and input into the NSS. In step 3202, the variable "parameter2" is assigned to be a list of the first set of semantic rules displayed in FIG. 27. In step 3203, the NSS invokes the subroutine "apply_rules," passing to the subroutine the variables "parameter1" and "parameter2." The subroutine "apply_rules" applies the first set of semantic rules to the syntax parse tree to effect preliminary adjustments. In step 3204, the variable "parameter1" is assigned to be the list of syntax parse tree nodes that comprise the preliminarily-adjusted syntax parse tree. In step 3205, the variable "parameter2" is assigned to be a list of the second set of semantic rules displayed in FIG. 29. In step 3206, the NSS invokes the subroutine "apply_rules," passing to the subroutine the variables "parameter1" and "parameter2." The subroutine "apply_rules" applies the second set of semantic rules to the syntax parse tree to effect main adjustments.

NSS Phase Two—Generating an Initial Logical Form Graph

In phase two of the NSS, the NSS applies a third set of semantic rules to the nodes of the adjusted syntax tree. Each successful rule application in phase two creates a new logical form graph node. By applying this third set of rules, the NSS creates a new logical form graph. The nodes of the logical form graph consist of only semantically meaningful attributes and a pointer back to the corresponding syntax tree node. Unlike in prior art semantic subsystems, the logical form graph nodes created by the NSS in phase two are completely separate and distinct from the syntax parse tree nodes. The NSS constructs a skeleton of the logical form graph that comprises links, stored as attributes within the nodes, that interconnect the nodes of the logical form graph.

In FIG. 33, a list of the third set of semantic rules applied by the NSS in phase two is displayed. For each rule, FIG. 33 displays the name of the rule followed by a concise description of the linguistic phenomenon that it addresses. There are only three rules in this third set of rules, and only the first rule, SynToSem1, is commonly used. The second and third rules apply only to special situations when a fitted parse was generated by the syntactic subsystem, and the adjusted syntax parse tree therefore contains a fitted parse node.

FIGS. 34A–34C display an English-language representation of the semantic rule SynToSem1 from the third set of semantic rules. As can be seen in FIGS. 34A–34C, the "If" expression concerns the values of various attributes for the syntax parse tree node to which the rule is applied and various related syntax parse tree nodes, and the "Then" expression specifies the creation of a logical form graph node and placement of the new node within the incipient logical form graph.

FIG. 34D shows an example of the application of the semantic rule SynToSem1 to the syntax parse tree 3401 generated by the syntactic subsystem for the sentence "The book was written by John." Application of SynToSem1 results in the skeletal logical form graph 3402. The skeletal logical form graph has three nodes with temporary modifiers labeling the links. Attributes have been assigned to the new nodes, based on the syntactic attributes of the syntax parse tree nodes from which they were created. There are far fewer nodes in the logical form graph than in the corresponding syntax parse tree, because the logical form graph represents the semantic meaning of the sentence. The linguistic significance of the words "the," "was," and "by" in the original sentence is or will be incorporated into the attributes and labels of the logical form graph, and the complex node hierarchies which emanated from their presence as leaf nodes in the syntax parse tree are not necessary in the logical form graph.

Figure 35:
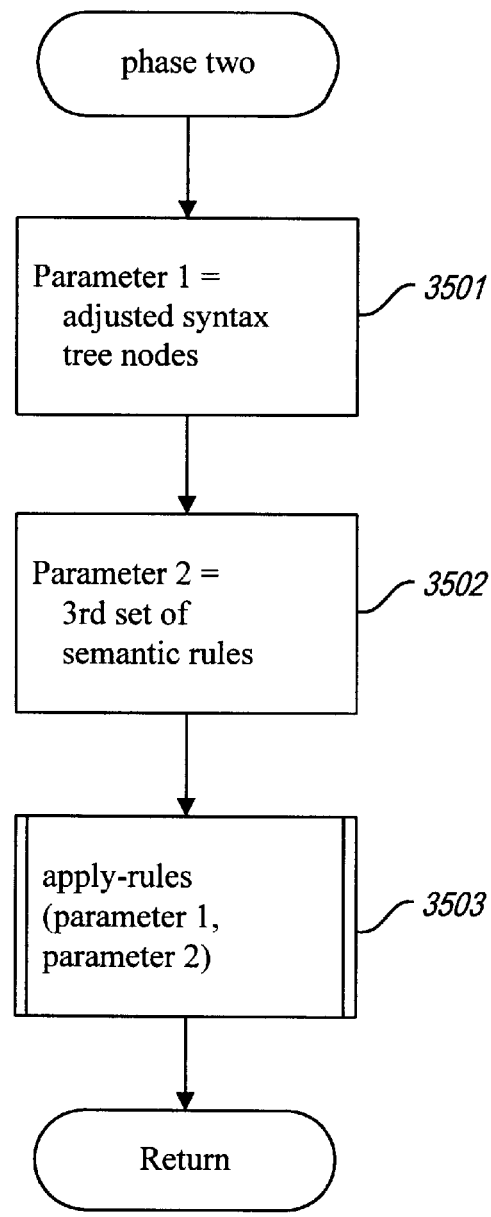
FIG. 35 displays a flow diagram for phase two of the NSS.

FIG. 35 displays a flow diagram for phase two of the NSS. In step 3501, the variable "parameter1" is assigned the list of nodes representing the adjusted syntax parse tree. In step 3502, the variable "parameter2" is assigned to be a list of the third set of semantic rules displayed in FIG. 33. In step 3503, the NSS invokes subroutine "apply_rules" to apply the third set of semantic rules to the nodes of the adjusted syntax parse tree, thereby creating a new logical form graph corresponding to the adjusted syntax parse tree.

NSS Phase Three—Completing the Logical Form Graph

In phase three of the NSS, the NSS applies a fourth set of semantic rules to the skeletal logical form graph to add semantically meaningful labels to the links of the logical form graph. These new labels include "deep subject" ("Dsub"), "deep object" ("Dobj"), "deep indirect object" ("Dind"), "deep predicate nominative" ("Dnom"), "deep complement" ("Dcmp"), and "deep predicate adjective" ("Dadj"). In FIGS. 36–38, a list of the fourth set of semantic rules applied by the NSS in phase three is displayed. For each rule, FIGS. 36–38 display the name of the rule followed by a concise description of the linguistic phenomenon that it addresses.

FIG. 39A displays an English-language representation of the semantic rule LF_Dobj2 from the fourth set of semantic rules. As can be seen in FIG. 39A, the "If" expression concerns the values of various attributes of the logical form graph node to which the rule is applied, and the "Then" expression specifies the labeling of a link in the logical form graph.

FIG. 39B shows an example of the application of the semantic rule LF_Dobj2 to the logical form graph 3901 generated by the NSS for the sentence "The book was written by John." Application of LF_Dobj2 to a logical form graph containing a passive clause identifies the syntactic subject as the deep object of the action. This is accomplished, in FIG. 39B, by relabeling link 3903 from a temporary modifier to the label 3904 indicating a deep object relationship.

As the final step in phase three, the NSS makes final adjustments to the logical form graph by applying a fifth set of semantic rules. This set of rules include rules that serve to unify a relative pronoun with its antecedent, find and explicitly include missing pronouns, resolve number ellipsis, provide missing deep subjects, unify redundant instances of personal pronouns, and contract coordinate structures expanded in the first sub-step of semantic analysis. These rules also deal with the problem of taking a pronoun (or "proform") and identifying the noun phrase to which it refers. In many cases, it is not possible to identify the correct noun phrase referent with the level of information that the logical form graph provides. In these cases, a list of the most likely candidates is created, and further processing is postponed until later steps of the NLP system that employ more global information. In FIG. 40, a list of the fifth set of semantic rules applied by the NSS in phase three is displayed. For each rule, FIG. 40 displays the name of the rule followed by a concise description of the linguistic phenomenon that it addresses.

FIGS. 41A–41C display an English-language representation of the semantic rule PsLF_PronAnaphora from the fifth set of semantic rules. As can be seen in FIGS. 41A–41C, the "If" expression concerns the values of various attributes of the logical form graph node to which the rule is applied, and of related logical form graph nodes, and the "Then" expression specifies the addition of a logical form graph node representing an omitted referent of a pronoun.

FIG. 41D shows an example of the application of the semantic rule PsLF_PronAnaphora to the logical form graph 4101 generated by the NSS for the sentence "Mary likes the man who came to dinner, and Joan likes him too." Application of PsLF_PronAnaphora to a logical form graph containing a pronoun node with a referent in a different part of the logical form graph adds a new node to which the pronoun node is directly linked. In FIG. 41D, the new node 4103 has been added by application of PsLF_PronAnaphora to indicate that the node "he1" refers to "man."

Figure 42:
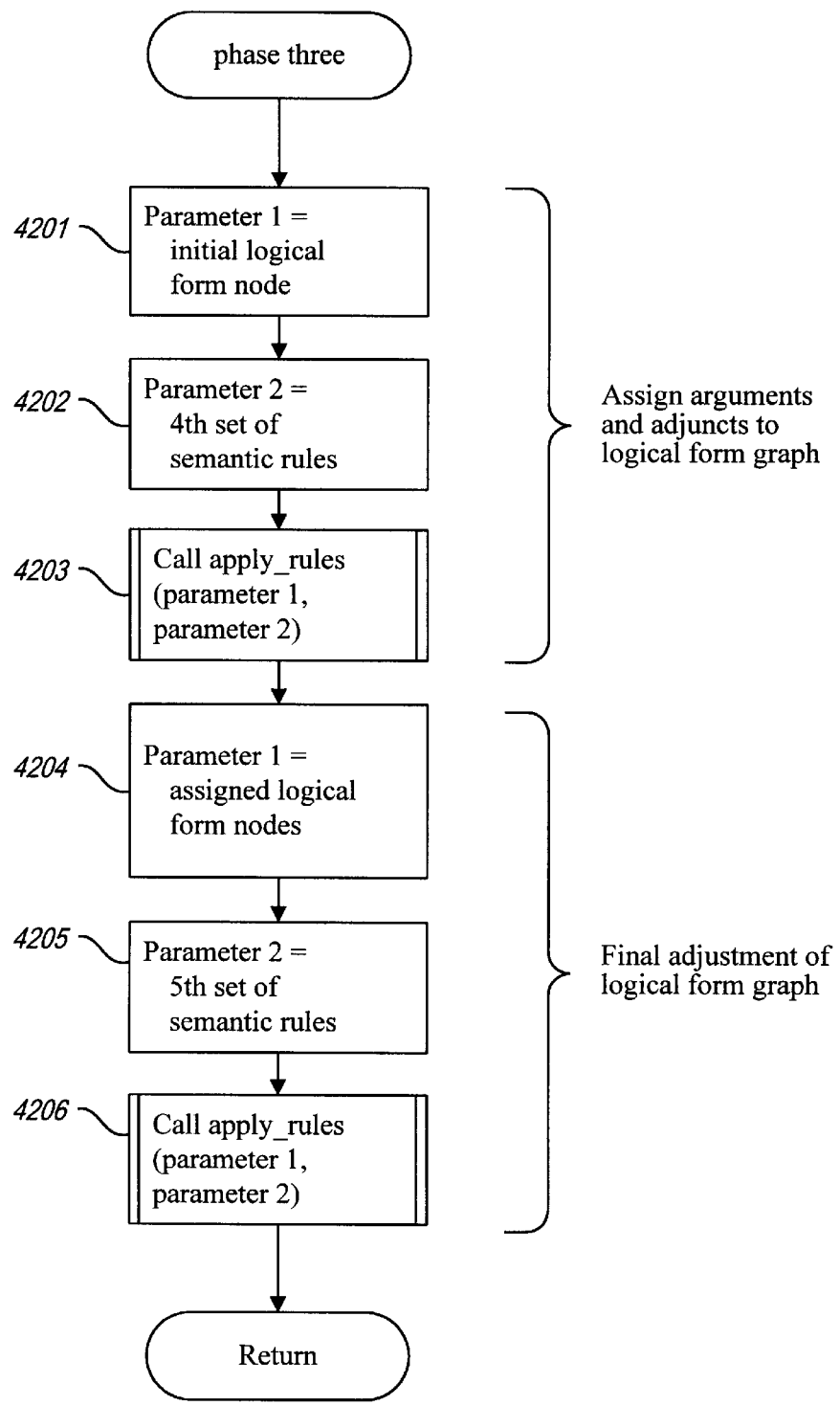
FIG. 42 displays a flow diagram for phase three of the NSS.

A flow diagram for the processing done in phase three of the NSS is displayed in FIG. 42. In step 4201, the variable "parameter1" is assigned to be the list of logical form graph nodes that comprise the logical form graph generated during phase two of the NSS. In step 4202, the variable "parameter2" is assigned to be a list of the fourth set of semantic rules displayed in FIGS. 36–38. In step 4203, the NSS invokes the subroutine "apply_rules," passing to the subroutine the variables "parameter1" and "parameter2." The subroutine "apply_rules" applies the fourth set of semantic rules to the logical form graph to add semantically meaningful labels to the links of the logical form graph. In step 4204, the variable "parameter1" is assigned to be the list of the logical form graph nodes that comprise the meaningfully-labeled logical form graph generated in step 4203. In step 4205, the variable "parameter2" is assigned to be a list of the fifth set of semantic rules displayed in FIG. 40. In step 4206, the NSS invokes the subroutine "apply_rules," passing to the subroutine the variables "parameter1" and "parameter2." The subroutine "apply_rules" applies the fifth set of semantic rules to the logical form graph to effect final adjustments.

Figure 43:
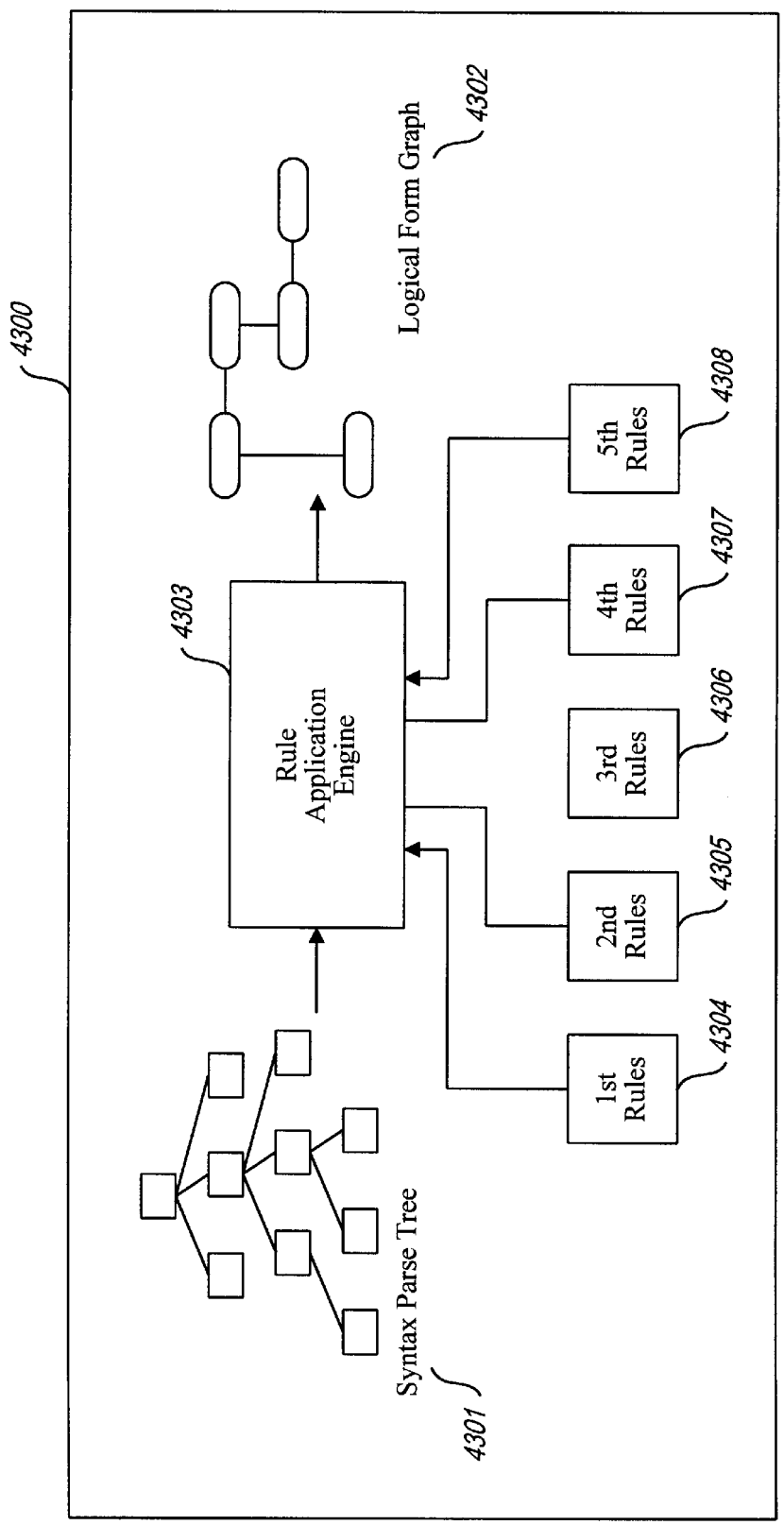
FIG. 43 is a block diagram of a computer system for the NSS.

FIG. 43 is a block diagram of a computer system for the NSS. The computer 4300 contains memory with the semantic rules 4304–4308 and rule application engine 4303. The rule application engine, under control of a central processing unit, applies the five sets of rules to the syntax parse tree 4301 to generate a corresponding logical form graph 4302. The syntax parse tree is preferably generated by the morphological and syntactic subsystems, which are not shown. The syntax tree and logical form graph can also be used to accomplish a subsequent task requiring information analogous to that which a human reader would obtain from the input sentences. For example, a grammar checker program might suggest a new phrasing for the input sentence that more accurately or concisely states what was stated in the input sentence. As another example, a computer operating system might perform computational tasks described by the input sentence. As still another example, information contained in the input sentence might be categorized and stored away for later retrieval by a database management system.

Semantic Processing of the Example Input Sentence

The following discussion and FIGS. 44–59 describe the complete NSS processing of the example sentence "The person whom I met was my friend." Each semantic rule that is applied by the NSS will be described, along with a representation of the results of the rule application.

Figure 1:
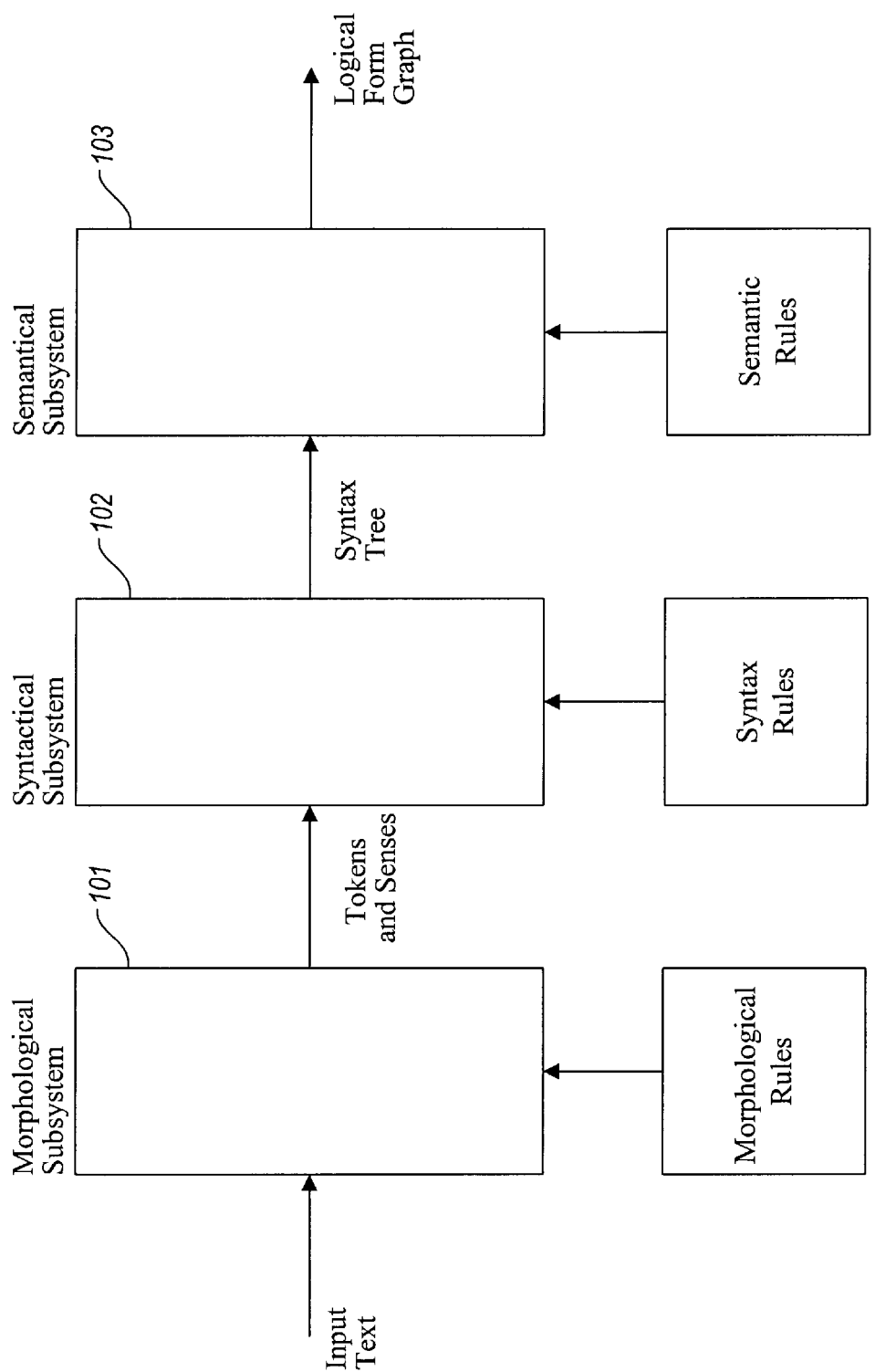
FIG. 1 is a block diagram illustrating the flow of information between the subsystems of a NLP system.
Figure 6:
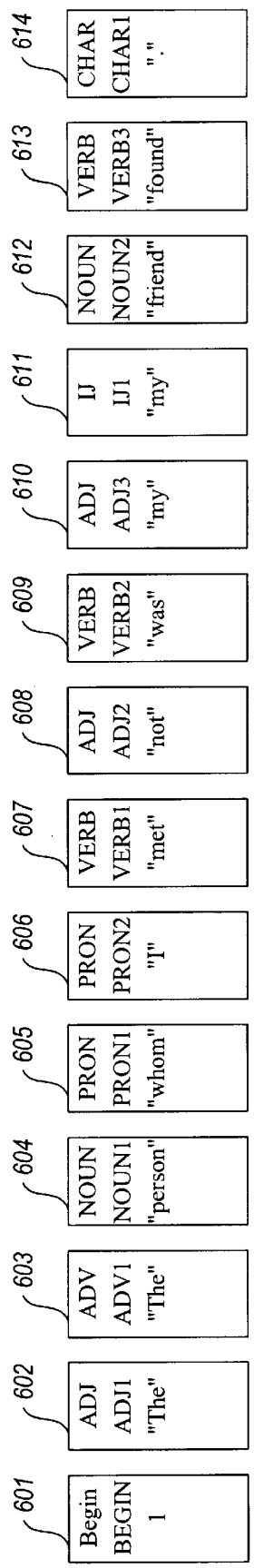
FIG. 6 displays the leaf nodes generated by the syntactic subsystem as the first step in parsing the input sentence.
Figure 7:
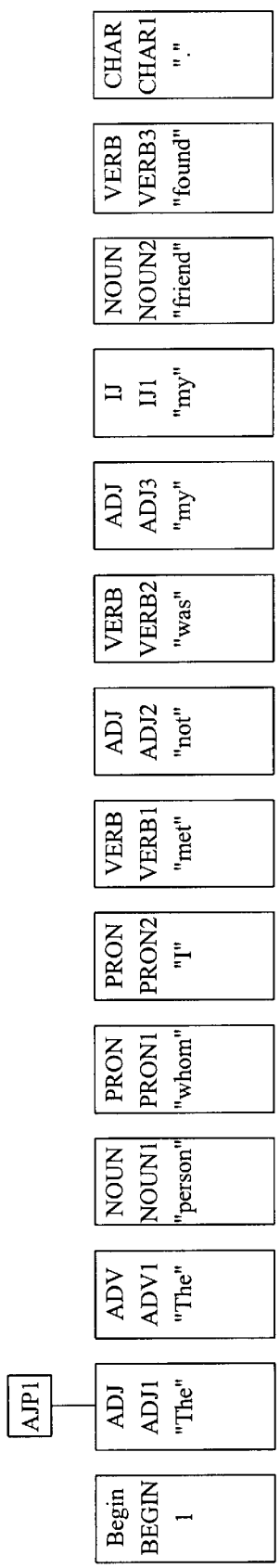
FIGS. 7–22 display the successive application of syntax rules by the syntactic subsystem to parse of the input sentence and produce a syntax parse tree.
Figure 8:
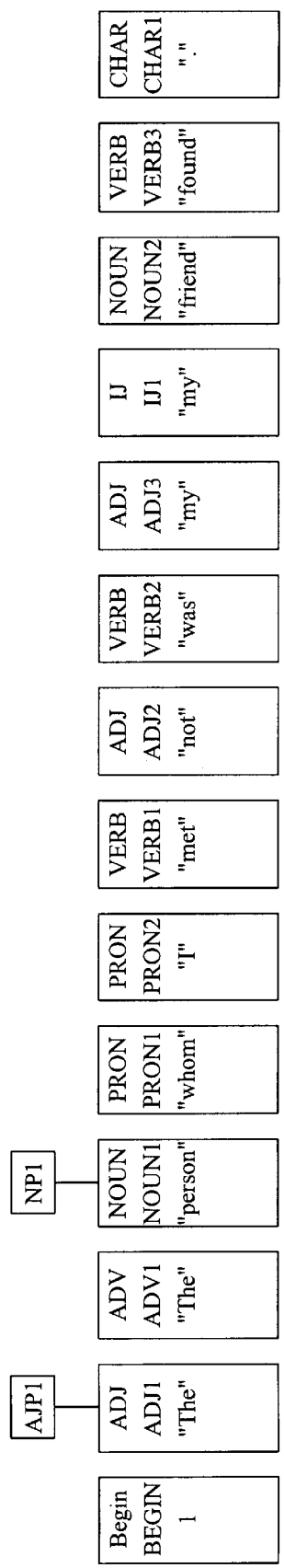
Figure 9:
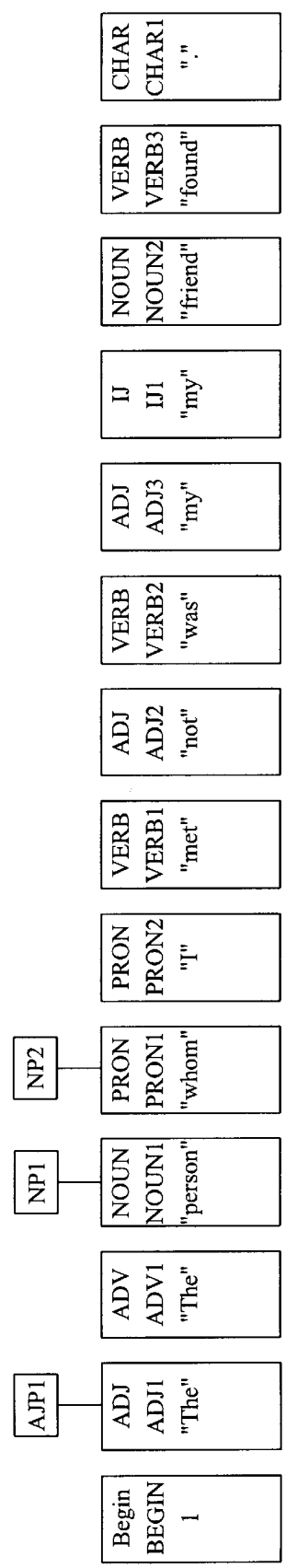
Figure 10:
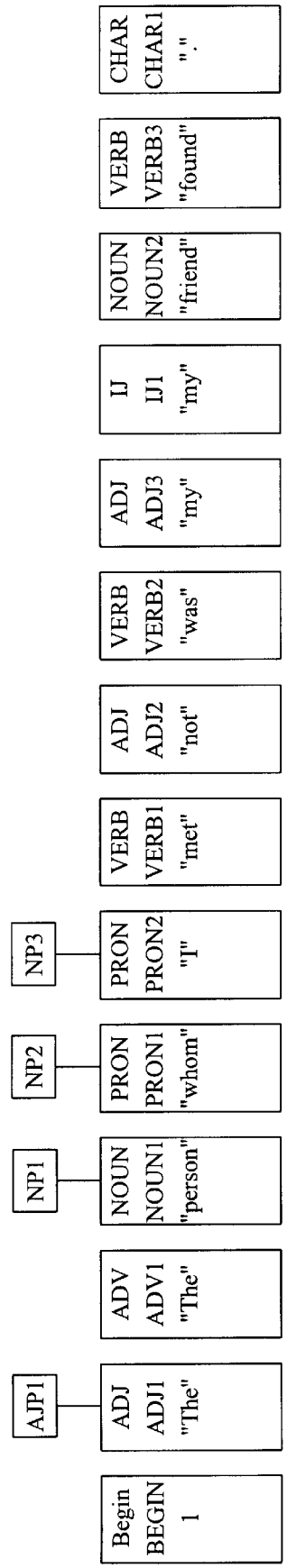
Figure 11:
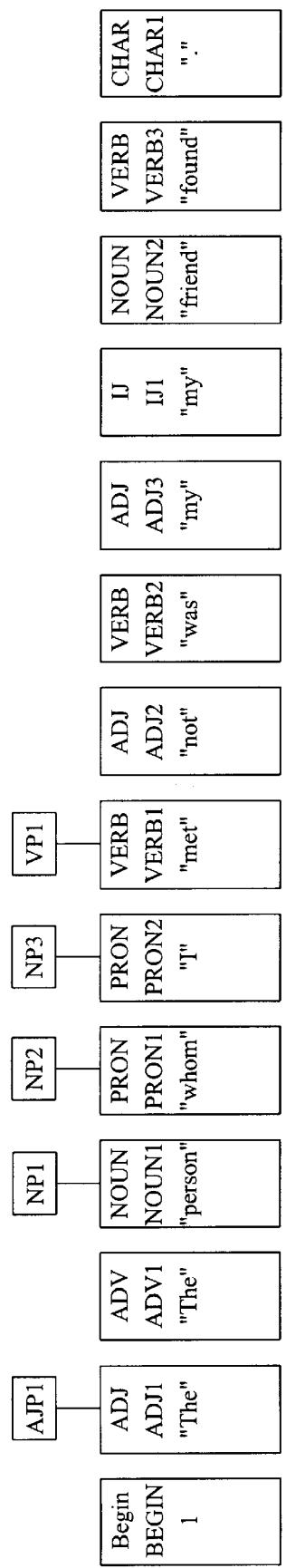
Figure 12:
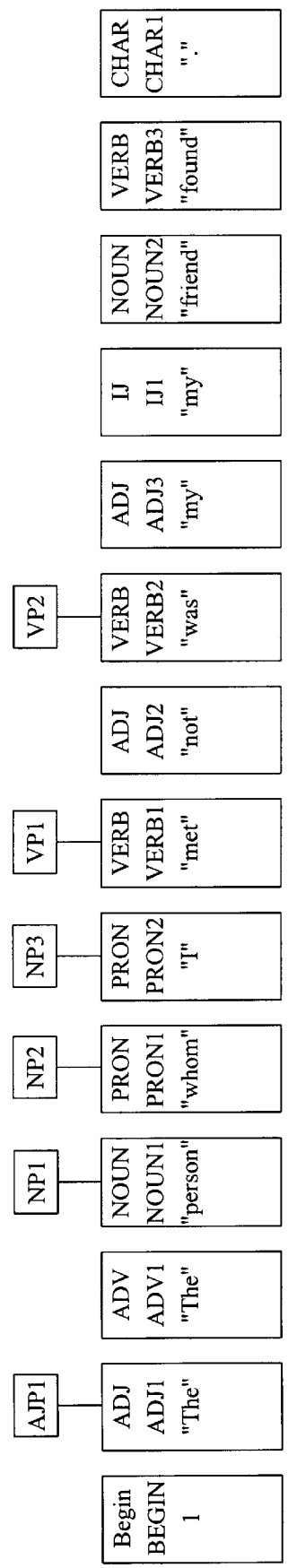
Figure 13:
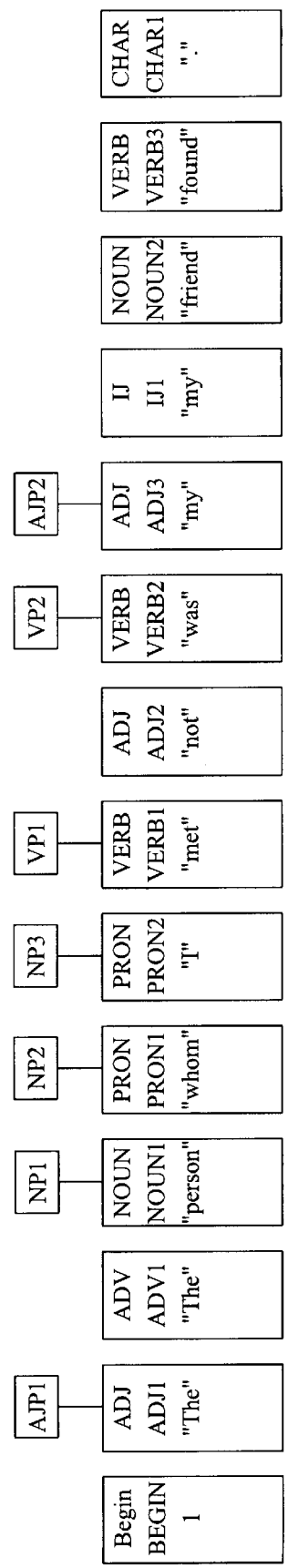
Figure 14:
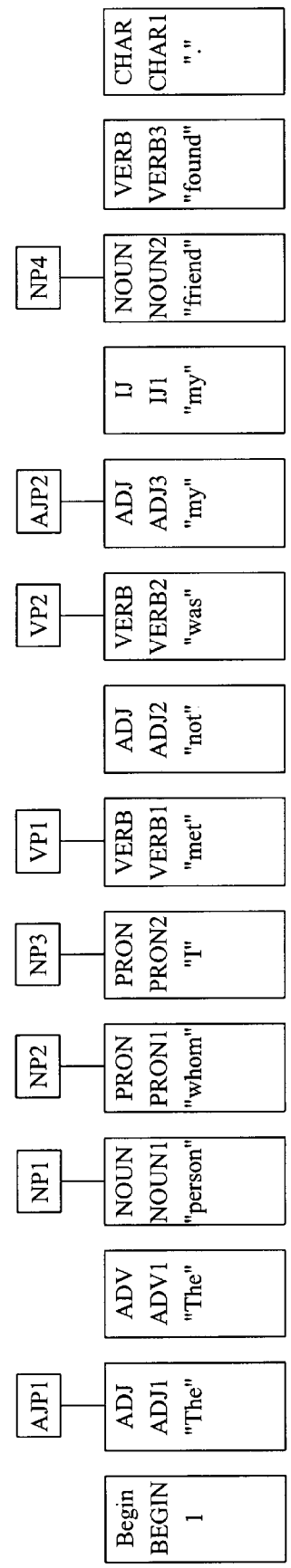
Figure 15:
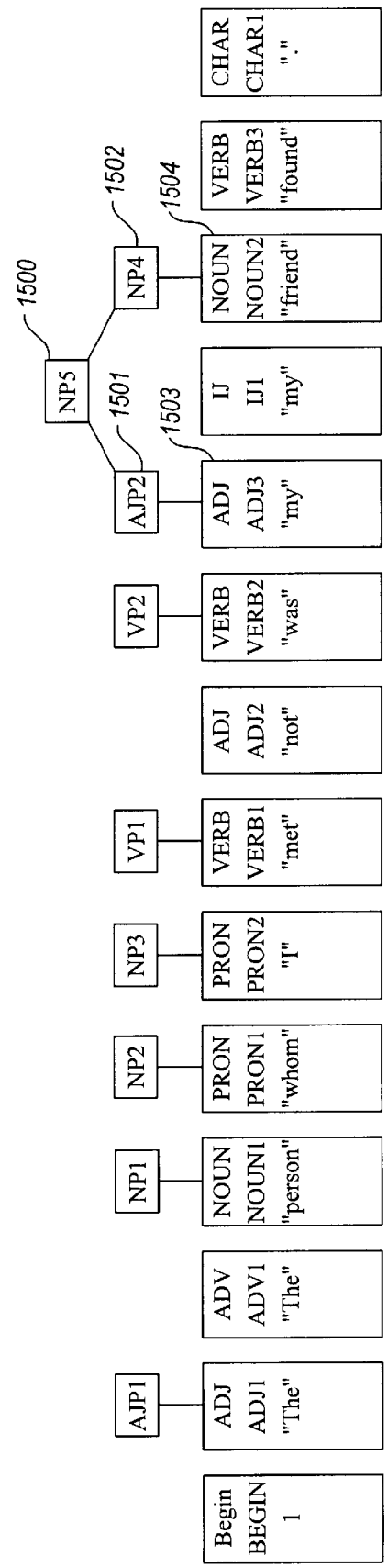
Figure 16:
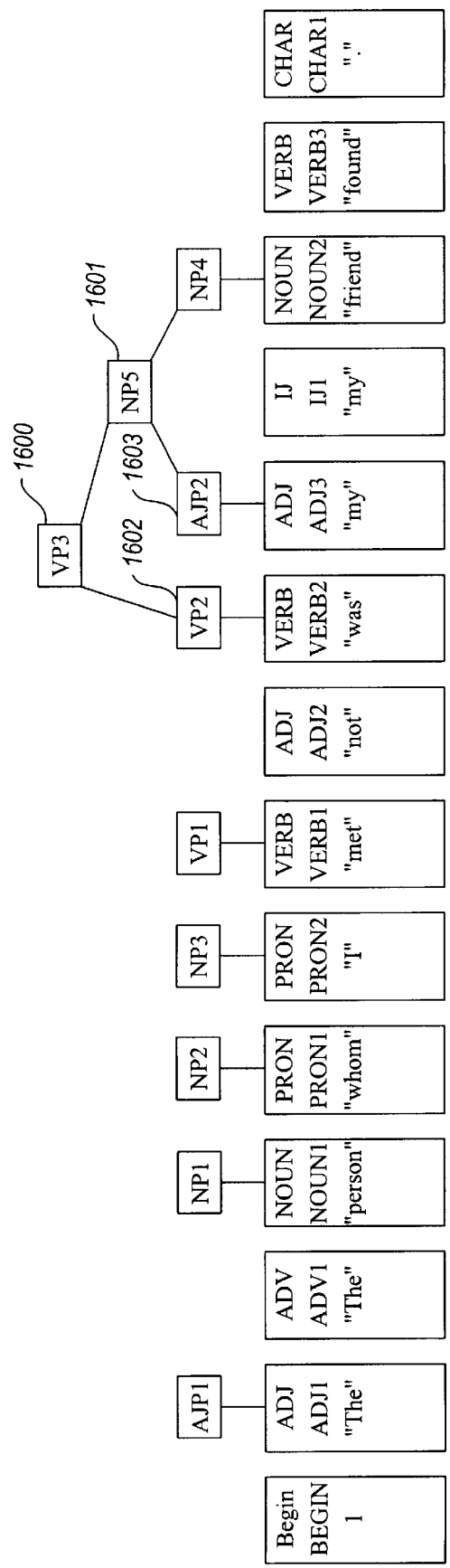
Figure 17:
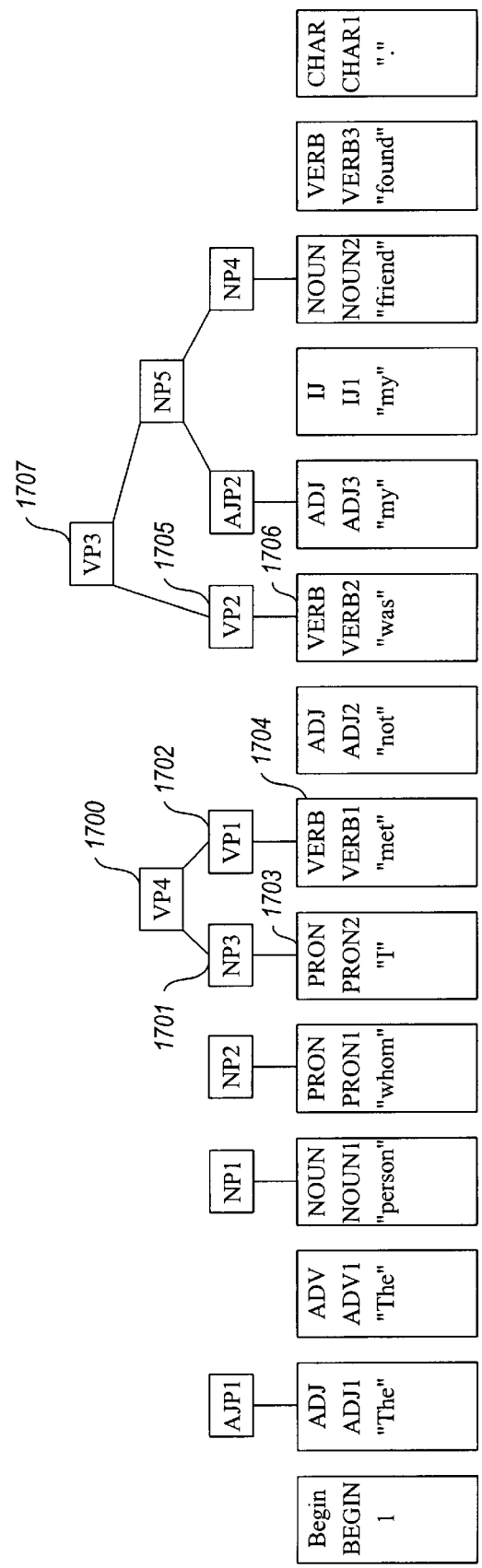
Figure 18:
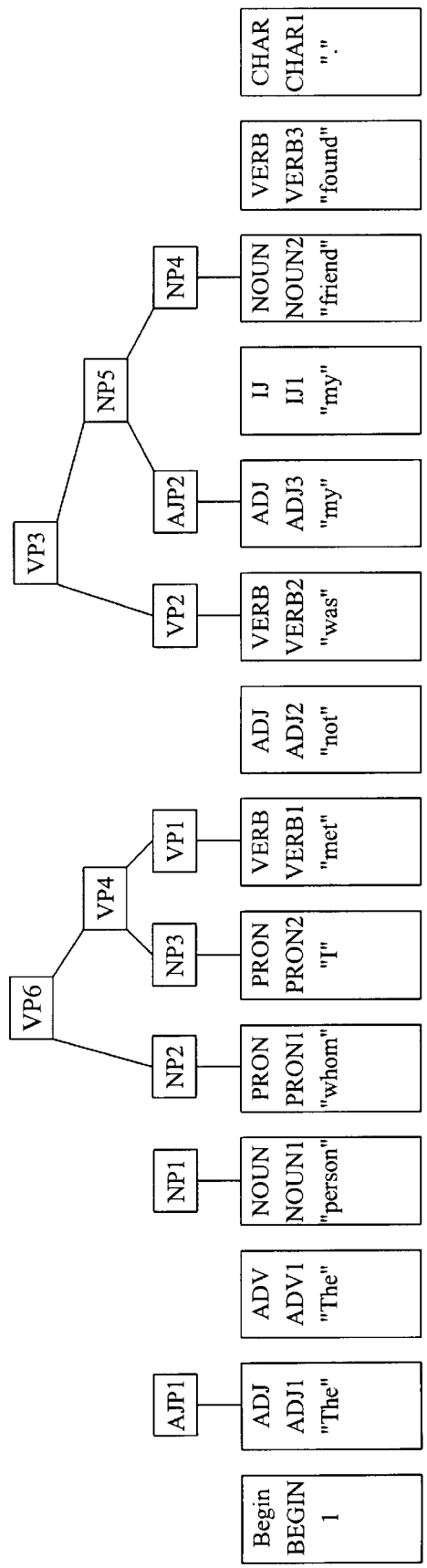
Figure 19:
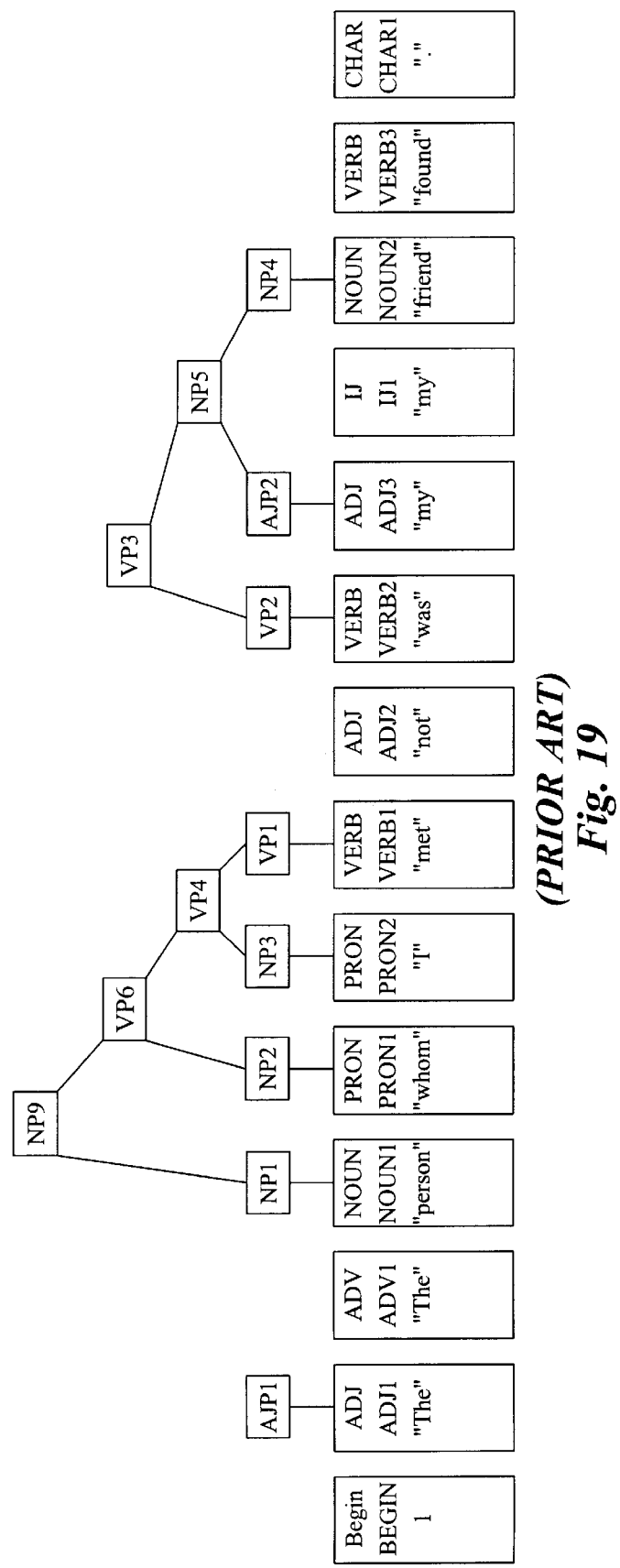
Figure 20:
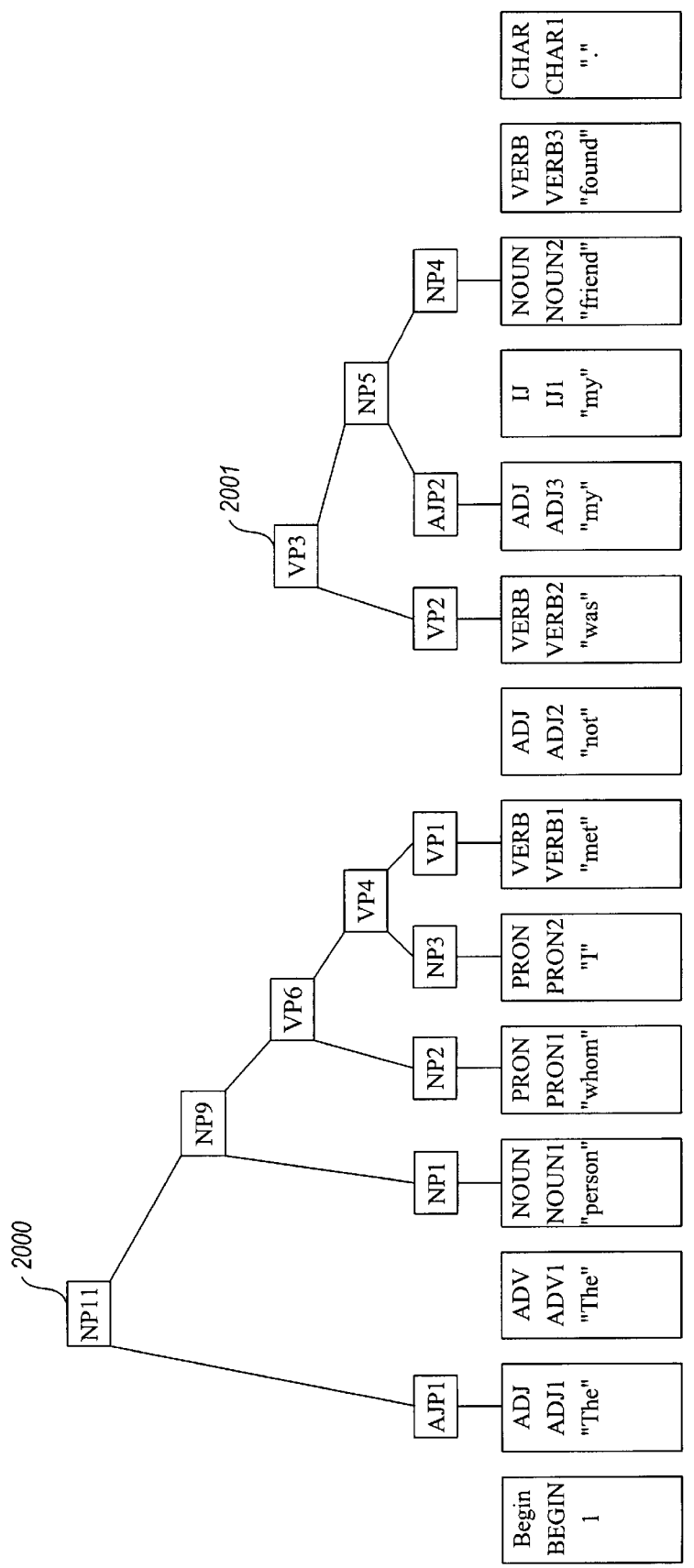
Figure 21:
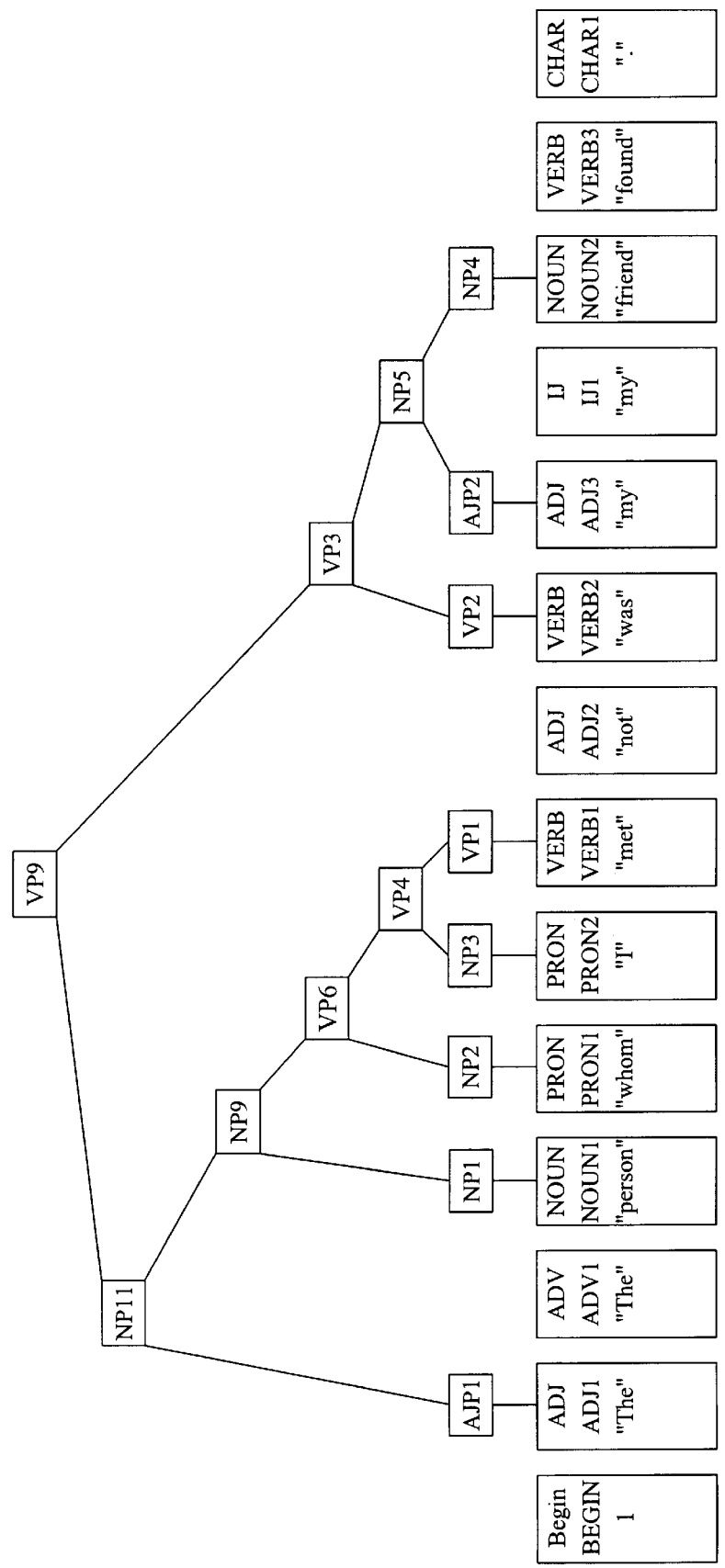
Figure 22:
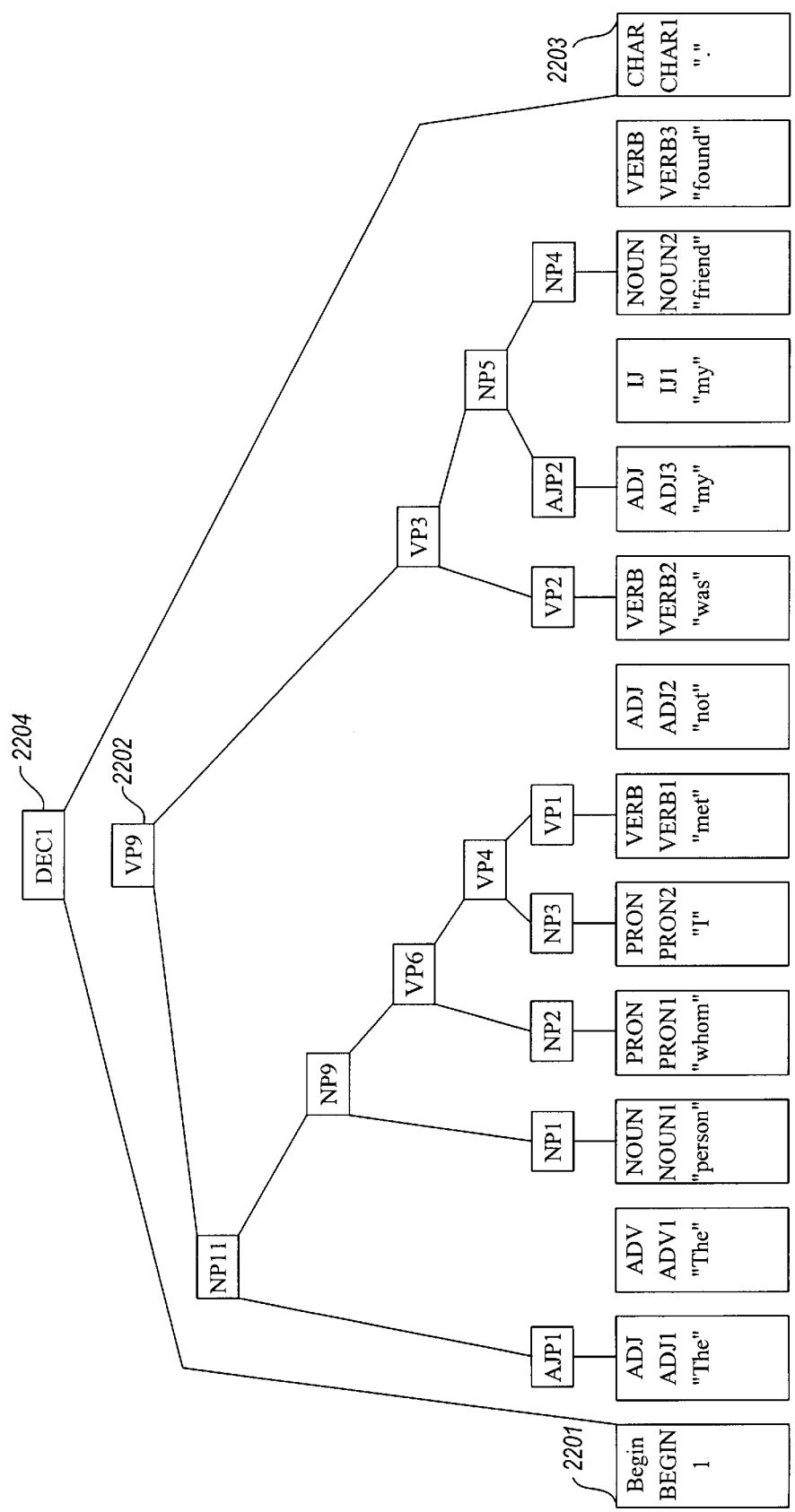
Figure 23:
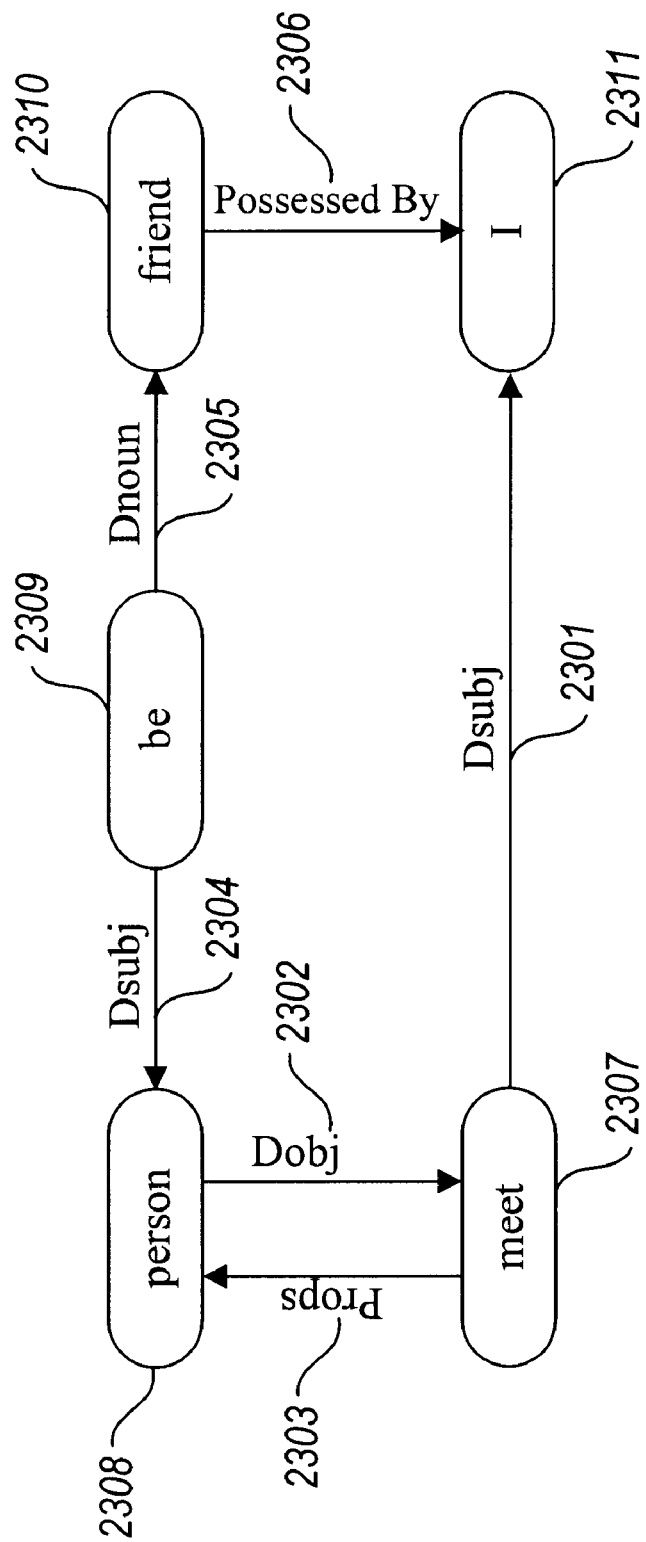
FIG. 23 illustrates the logical form graph generated by the semantic subsystem to represent the meaning of the input sentence.
Figure 44:
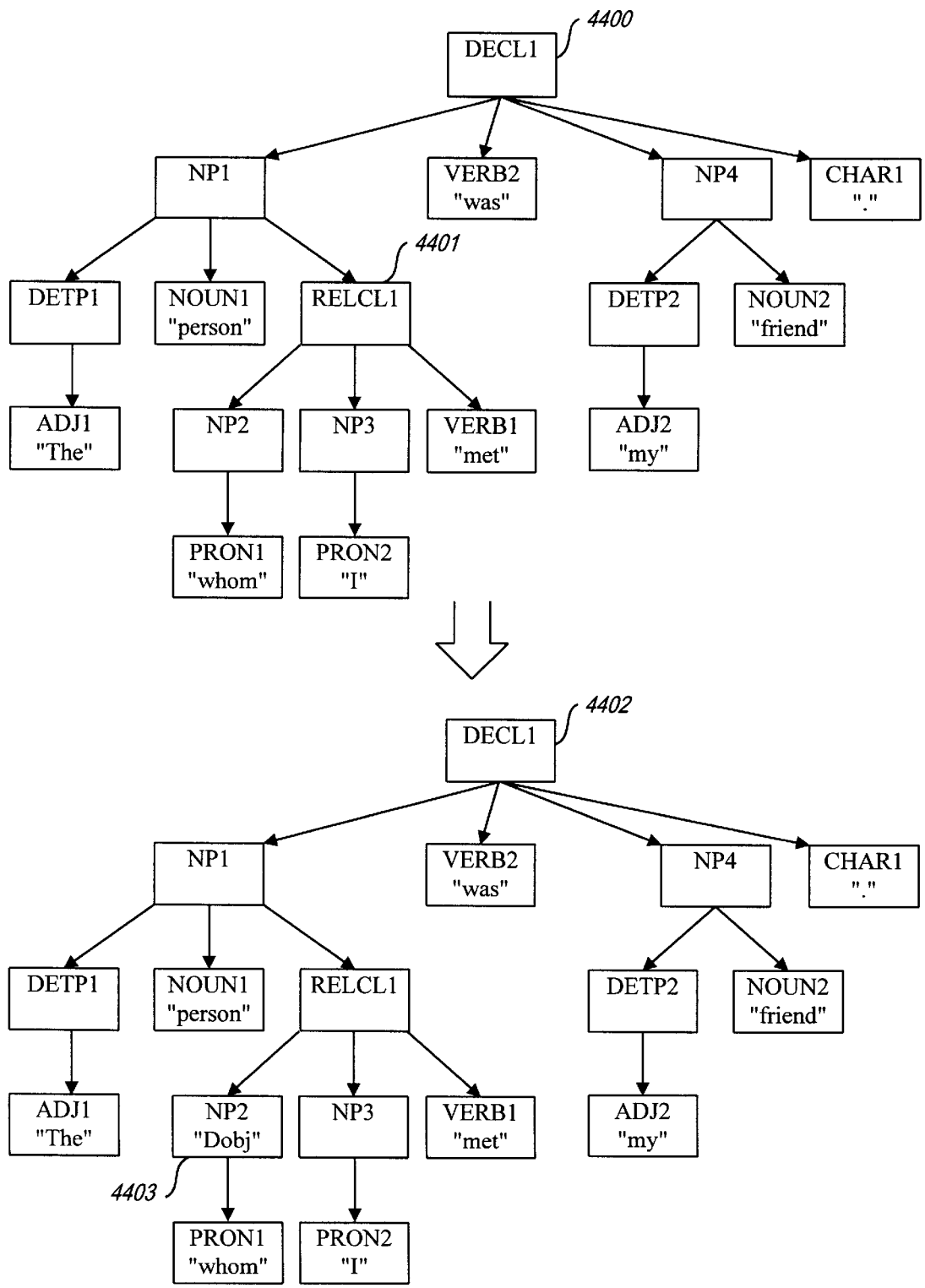

No preliminary adjustment rules from the first set of semantic rules are successfully applied to the syntax parse tree input into the NSS from the syntactic subsystem during phase one. One main adjustment rule from the second set of semantic rules is applied to the input syntax parse tree. FIG. 44 displays the syntax parse tree 4400 in the form it is input. Note that it is represented in FIG. 44 slightly more simply than in FIG. 22. The NSS successfully applies the semantic rule TrLF_LongDist1, displayed in FIG. 29 as rule 1, to the relative clause node RELCL1, 4401, of the syntax parse tree 4400 to generate the adjusted syntax parse tree 4402. The effect of applying rule TrLF_LongDist1 is the introduction of a direct object attribute in the noun phrase node 4403 to indicate that the word "whom" is the direct object of the phrase "I met." Normally, in English, the direct object of a verb follows the verb. Because "whom" does not follow "I met" in the sentence that was parsed to produce the syntax tree 4400, the fact that "whom" is the direct object of "I met" was not identified by the application of syntactic rules.

Seven rules from the third set of semantic rules are successfully applied in phase two of the NSS. In FIG. 45, the NSS successfully applies the semantic rule SynToSem1, displayed in FIG. 33 as rule 1, to the determinate pronoun node DEPT2, 4501, of the syntax parse tree to generate the logical form graph node "my" 4502. In FIG. 46, the NSS successfully applies the semantic rule SynToSem1 to the noun phrase node NP4, 4601, of the syntax parse tree to generate the logical form graph node "friend" 4602 and the link 4603 with the temporary semantic label "Tmods" 4604. In FIG. 47, the NSS successfully applies the semantic rule SynToSem1 to the noun phrase node NP3, 4701, of the syntax parse tree to generate the logical form graph node "I" 4702. In FIG. 48, the NSS successfully applies the semantic rule SynToSem1 to the noun phrase node NP2, 4801, of the syntax parse tree to generate the logical form graph node "whom" 4802. In FIG. 49, the NSS successfully applies the semantic rule SynToSem1 to the relative clause node RELCL1, 4901, of the syntax parse tree to generate the logical form graph node "meet" 4902 and the link 4903 with the temporary semantic label "Tmods" 4904. In FIG. 50, the NSS successfully applies the semantic rule SynToSem1 to the noun phrase node NP1, 5001, of the syntax parse tree to generate the logical form graph node "person" 5002 and the link 5003 with the temporary semantic label "Tmods" 5004. In FIG. 51, the NSS successfully applies the semantic rule SynToSem1 to the declarative sentence node DECL1, 5101, of the syntax parse tree to generate the logical form graph node "be" 5102 and the link 5103 with the temporary semantic label "Tmods" 5104. Thus, with the completion of phase two of the NSS, a skeletal logical form graph has been created.

Six rules from the fourth set of semantic rules are successfully applied in phase three of the NSS. In FIG. 52, the NSS successfully applies the semantic rule LF_Dusb1, displayed in FIG. 36 as rule 1, to the logical form graph node "be" 5201 to generate the link label "Dsub" 5202 and the link 5203 with the temporary semantic label "Tmods" 5204. In FIG. 53, the NSS successfully applies the semantic rule LF_Dnom, displayed in FIG. 36 as rule 10, to the logical form graph node "be" 5301 to generate the link label "Dnom" 5302. In FIG. 54, the NSS successfully applies the semantic rule LF_Props, displayed in FIG. 38 as rule 21, to the logical form graph node "person" 5401 to generate the link label "Props" 5402. In FIG. 55, the NSS successfully applies the semantic rule LF_Dusb1, displayed in FIG. 36 as rule 1, to the logical form graph node "meet" 5501 to generate the link label "Dsub" 5502. In FIG. 56, the NSS successfully applies the semantic rule LF_Dobj1, displayed in FIG. 36 as rule 3, to the logical form graph node "meet" 5601 to generate the link labeled "Dobj" 5603 to link the node "meet" to the node "whom" 5602. In FIG. 57, the NSS successfully applies the semantic rule LF_Ops, displayed in FIG. 38 as rule 22, to the logical form graph node "friend" 5701 to generate the link label "PossBy" 5702.

One rule from the fifth set of semantic rules is successfully applied in phase three of the NSS. In FIG. 58, the NSS successfully applies the semantic rule PsLF_RelPro, displayed in FIG. 40 as rule 1, to the logical form graph node "whom," displayed as 5602 in FIG. 56, to generate the link labeled "Dobj" 5801 and to remove the node "whom." In FIG. 59, the NSS successfully applies the semantic rule PsLF_UnifyPron, displayed in FIG. 40 as rule 10, to the logical form graph to consolidate the nodes "I" and "my" into a single node. This is the last rule applied successfully by the NSS. FIG. 59 thus displays the final, complete logical form graph generated by the NSS for the input sentence "The person whom I met was my friend."

Although the present invention has been described in terms of a preferred embodiment, it is not intended that the invention be limited to this embodiment. Modifications within the spirit of the invention will be apparent to those skilled in the art. The scope of the present invention is defined by the claims that follow.

We claim:

1. A method in a computer system for generating a logical form graph for a phrase of words specified in a natural language, the natural language having a grammar specifying syntax of the natural language, the computer system having a memory the method comprising:

generating in the memory all initial syntax parse tree of the phrase based on the grammar of the natural language, the initial syntax parse tree containing nodes representing syntactic construct of the words of the phrase;

adjusting the initial syntax parse tree to complete syntactic analysis for syntactic constructs that arc implicit in the phrase;

generating in the memory a skeletal logical form graph for the adjusted syntax parse tree, the skeletal logical form graph being represented in a data structure that is independent of a data structure of the syntax parse tree; and adjusting the skeletal logical form graph to identify semantic constructs to complete the logical form graph.

2. The method of claim 1 wherein the step of adjusting the initial syntax parse tree includes adding syntactic roles to the syntax parse tree for any syntactic constructs that are implicit in the phrase.

3. The method of claim 1 wherein the step of adjusting the skeletal logical form graph includes adding semantic labels to the generated skeletal logical form graph.

4. A computer-readable medium containing instructions for causing a computer system to generate a logical form graph for a sentence specified in a natural language, the natural language having a grammar specifying syntax of the natural language, the computer system having an initial syntax parse tree of the sentence that represents a parse of the sentence based on the grammar of the natural language, the initial syntax parse tree containing nodes representing syntactic construct of words of the sentence, the initial syntax parse tree being stored in memory of the computer system by:

adjusting the initial syntax parse tree to complete syntactic analysis for syntactic constructs that are implicit in the sentence;

generating in memory of The computer system a skeletal logical form graph for the adjusted syntax parse tree, the skeletal logical form graph being represented in a data structure that is independent of a data structure of the syntax parse tree; and adjusting the skelctal logical form graph to identify semantic constructs to complete the logical form graph for the sentence.

5. The computer-readable medium of claim 4 wherein the adjusting of the initial syntax parse tree includes adding syntactic roles to the syntax parse tree for any syntactic constructs that are implicit in the sentence.

6. The computer-readable medium of claim 4 wherein adjusting of the skeletal logical form graph includes adding semantic labels to the generated skeletal logical form graph.

7. A method in a computer system for processing input text representing a phrase or sentence of a natural language in order to represent in the computer system at least one meaning of the input text that a human speaker of the natural language would understand the input text to represent, the method comprising the steps of:

generating in memory of the computer system a first data structure for a syntax parse tree from the input text to represent a syntactic analysis of the input text; and generating in memory of the computer system a second data structure for a logical form graph to represent a semantic analysis of the input text, the second data structure being generated from the syntax parse tree but being a separate data structure from the first data structure.

8. A computer system for processing input text representing a phrase or sentence of a natural language in order to represent in the computer system at least one meaning of the input text that a human speaker of the natural language would understand the input text to represent, the system comprising:

a component that generates in memory of the computer system a syntax parse tree from the input text to represent a syntactic analysis of the input text; and a component that generates in memory of the computer system a logical form graph to represent a semantic analysis of the input text, the logical form graph being stored in a data structure that is separate from a data structure in which the generated syntax parse tree is stored, the logical form graph being generated based in part on the generated syntax parse tree.

9. The system of claim 8 wherein the component that generates a separate logical form graph comprises the following sub-components:

a first sub-component that generates an initial skeletal logical form graph; and a second sub-component that identifies semantic roles for the nodes of the skeletal logical form graph and labels the directed links of the skeletal logical form graph to produce a final, complete logical form graph.

\* \* \* \* \*

UNITED STATES PATENT AND TRADEMARK OFFICE
CERTIFICATE OF CORRECTION

PATENT NO. : 5,966,686
DATED : October 12, 1999
INVENTOR(S) : George Heidorn et al.

Page 1 of 2

It is certified that error appears in the above-identified patent and that said Letters Patent is hereby corrected as shown below:

```
Column 1, line 42, a new paragraph should have
  been started with "Syntactic".
Column 9, line 64, "if" should be --it--.

Column 14, line 32, "DEPT2" should be --DETP2--.
Column 14, line 62, "LF__Dusbl" should be --
  LF__Dsubl--.
Column 15, line 6, "LF__Dusbl" should be --
  LF__Dsubl--.
Column 15, line 23, "PsLF_UnifyPron" should be --
  PsLF_UnifyProns __ .
```

UNITED STATES PATENT AND TRADEMARK OFFICE
CERTIFICATE OF CORRECTION

PATENT NO. : 5,966,686
DATED : October 12, 1999
INVENTOR(S) : George Heidorn et al.

It is certified that error appears in the above-identified patent and that said Letters Patent is hereby corrected as shown below:

Claims:

Claim 1, Column 15, line 41, "all" should be --an--.

Claim 4, Column 16, line 11, "The" should be --the--.

Signed and Sealed this

Second Day of January, 2001

Attest:

Q. TODD DICKINSON

*Attesting Officer*   *Commissioner of Patents and Trademarks*